(12) United States Patent
Taniyama et al.

(10) Patent No.: US 12,323,081 B1
(45) Date of Patent: Jun. 3, 2025

(54) DRIVE DEVICE, FLUID UTILIZATION DEVICE, AND AIR CONDITIONER

(71) Applicant: Mitsubishi Electric Corporation, Tokyo (JP)

(72) Inventors: Yuki Taniyama, Tokyo (JP); Kenji Takahashi, Tokyo (JP); Yuichi Shimizu, Tokyo (JP); Yasuhiko Wada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/613,495

(22) PCT Filed: Jul. 9, 2019

(86) PCT No.: PCT/JP2019/027196
§ 371 (c)(1),
(2) Date: May 9, 2022

(87) PCT Pub. No.: WO2021/005725
PCT Pub. Date: Jan. 14, 2021

(51) Int. Cl.
*H02P 1/54* (2006.01)
*F24F 11/88* (2018.01)
(Continued)

(52) U.S. Cl.
CPC ............. *H02P 5/50* (2013.01); *F24F 11/88* (2018.01); *H02P 21/18* (2016.02); *H02P 21/22* (2016.02)

(58) Field of Classification Search
CPC .. H02P 5/50; H02P 21/18; H02P 21/22; F24F 11/88
(Continued)

(56) References Cited

U.S. PATENT DOCUMENTS 7,443,130 B2 * 10/2008 Takao ...................... H02P 21/14
700/298
11,063,547 B2 * 7/2021 Miyashita ............... H02P 25/22
(Continued)

FOREIGN PATENT DOCUMENTS

EP    3742598 A1    11/2020

OTHER PUBLICATIONS

Extended European search report issued on Jun. 15, 2022, in corresponding European patent Application No. 19937089.1, 11 pages.
(Continued)

Primary Examiner — Erick D Glass
(74) Attorney, Agent, or Firm — XSENSUS LLP

(57) ABSTRACT

A drive device includes a power converter, a first magnetic pole position identification unit, a second magnetic pole position identification unit, a subtractor, and a current control unit. The power converter supplies power to a main-side synchronous motor and a sub-side synchronous motor connected in parallel. The subtractor obtains an angular difference using the magnetic pole position of the rotor of the main-side synchronous motor identified by the first magnetic pole position identification unit and the magnetic pole position of the rotor of the sub-side synchronous motor identified by the second magnetic pole position identification unit. A magnetic flux current command compensation unit adjusts the absolute value of a magnetic flux current command based on the angular difference. The current control unit controls the power converter using a torque current command and the magnetic flux current command with the absolute value adjusted by the magnetic flux current command compensation unit.

12 Claims, 31 Drawing Sheets

FIG.2

(51) Int. Cl.
  *H02P 5/00*    (2016.01)
  *H02P 5/46*    (2006.01)
  *H02P 5/50*    (2016.01)
  *H02P 21/18*   (2016.01)
  *H02P 21/22*   (2016.01)

(58) Field of Classification Search
  USPC .......................................................... 318/41
  See application file for complete search history.

(56)              References Cited

U.S. PATENT DOCUMENTS

| 2014/0111130 | A1* | 4/2014 | Yamada | B60L 50/51 |
| | | | | 318/400.32 |
| 2015/0229245 | A1 | 8/2015 | Cho et al. | |
| 2021/0067066 | A1 | 3/2021 | Takahashi et al. | |

OTHER PUBLICATIONS

International Search Report and Written Opinion mailed on Sep. 24, 2019, received for PCT Application PCT/JP2019/027196, Filed on Jul. 9, 2019, 6 pages including English Translation.
Lee et al., "Analysis and Control of Mono Inverter Dual Parallel SPMSM Drive System", IEEE, 2014, pp. 4843-4849.
Lee et al., "Control Method for Mono Inverter Dual Parallel Surface-Mounted Permanent-Magnet Synchronous Machine Drive System", IEEE Transactions on Industrial Electronics, vol. 62, No. 10, Oct. 2015, pp. 6096-6107.

\* cited by examiner

FIG.11

|  | MAIN-SIDE d-AXIS CURRENT $i_{dm}$ | |
|---|---|---|
|  | INCREASE | DECREASE |
| SIGN OF ANGULAR DIFFERENCE $\lambda$ — POSITIVE | SUB-SIDE TORQUE DECREASE FIG.6 | SUB-SIDE TORQUE INCREASE FIG.7 |
| SIGN OF ANGULAR DIFFERENCE $\lambda$ — NEGATIVE | SUB-SIDE TORQUE INCREASE FIG.9 | SUB-SIDE TORQUE DECREASE FIG.10 |

DRIVE DEVICE, FLUID UTILIZATION DEVICE, AND AIR CONDITIONER

CROSS-REFERENCE TO RELATED APPLICATION

The present application is based on PCT filing PCT/JP2019/027196, filed Jul. 9, 2019 the entire contents of which are incorporated herein by reference.

FIELD

The present invention relates to a drive device that drives two synchronous motors connected in parallel to one power converter, a fluid utilization device including the drive device, and an air conditioner including the fluid utilization device.

BACKGROUND

Synchronous motors are liable to fail to generate appropriate torque and thus fall out of step (i.e., causing step-out) or stop operating, without application of an appropriate voltage that depends on the rotational position of the rotor using information on the rotational position of the rotor. Therefore, conventional methods of driving a plurality of synchronous motors involve the same number of power converters as the number of synchronous motors in order to apply a voltage that depends on the rotational position of the rotor of each synchronous motor. However, in the case of using the same number of power converters as the number of synchronous motors, the number of power converters increases as the number of synchronous motors increases, which is disadvantageous in terms of increase in cost. In recent years, therefore, attempts have been made to drive two synchronous motors with one power converter along with the advancement of synchronous motor control technology.

Patent Literature 1 discloses a control method for two synchronous motors connected to one power converter: one is a main-side synchronous motor and the other is a sub-side synchronous motor, in which a drive device controls the two synchronous motors using the rotational speed of the two synchronous motors. In the method described in Patent Literature 1, the drive device vector-controls the main-side synchronous motor, and determines a d-axis current command for the main-side synchronous motor using the difference in rotational speed and the difference in rotational position between the two synchronous motors, thereby stably driving the sub-side synchronous motor. Vector control is a control method in which the current flowing through the synchronous motor is decomposed into a current component that generates torque and a current component that generates magnetic flux, and each current component is independently controlled.

CITATION LIST

Patent Literature

Patent Literature 1: US 2015/0229245 A

Non Patent Literature

Non Patent Literature 1: Yongjae Lee, Jung-Ik Ha, "Analysis and Control of Mono Inverter Dual Parallel SPMSM Drive System", 2014, IEEE Non Patent Literature 2: Yongjae Lee, Jung-Ik Ha, "Control Method for Mono Inverter Dual Parallel Surface-Mounted Permanent-Magnet Synchronous Machine Drive System", 2015, IEEE

SUMMARY

Technical Problem

Patent Literature 1 shows that the method described in Patent Literature 1 is also applicable to position sensorless control that does not use sensors such as a speed detection means and a position detection means. In addition, Non Patent Literature 1 and Non Patent Literature 2 disclose the results of verification tests of position sensorless control using the technique of Patent Literature 1. Position sensorless control generally has a problem in operation stability in the low-speed range. This is because the speed electromotive force of the motor decreases in the low-rotation range, and the influence of output voltage errors in the power converter becomes relatively large. Even in the case of driving one synchronous motor with one power converter, operation stability in the low-speed range is problematic. Therefore, in the case of driving in parallel two synchronous motors with one power converter, it is even more difficult to ensure operation stability in the low-speed range. In particular, it is difficult to ensure operation stability in the low-speed range, for example, in the presence of large errors in the resistance value, inductance, and induced voltage constant of the synchronous motors or in the current detectors that detect the current flowing through the synchronous motors. However, Patent Literature 1, Non Patent Literature 1, and Non Patent Literature 2 do not specify a method of driving in the low-speed range. In addition, in the case of control with a sensor such as a speed detection means or a position detection means, it may also be difficult to ensure operation stability in the low-speed range due to a detection error in the speed detection means, a detection error in the position detection means, or the like.

The present invention has been made in view of the above, and an object thereof is to obtain a drive device capable of driving two synchronous motors using one power converter while preventing unstable rotation in the low-speed range.

Solution to Problem

In order to solve the above-described problems and achieve the object, a drive device according to the present invention includes a power converter, a first current detector, a second current detector, a first magnetic pole position identification unit, a second magnetic pole position identification unit, a subtractor, a magnetic flux current command determination unit, a magnetic flux current command compensation unit, and a control unit. The power converter supplies power to a first synchronous motor and a second synchronous motor connected in parallel. The first current detector detects a first current flowing through the first synchronous motor. The second current detector detects a second current flowing through the second synchronous motor. The first magnetic pole position identification unit identifies a first magnetic pole position of a rotor of the first synchronous motor. The second magnetic pole position identification unit identifies a second magnetic pole position of a rotor of the second synchronous motor. The subtractor obtains an angular difference using the first magnetic pole position and the second magnetic pole position, the angular difference being a difference between the magnetic pole positions of the rotors of the first synchronous motor and the second synchronous motor. The magnetic flux current command determination unit determines a magnetic flux current command based on the second current detected by the second current detector. The magnetic flux current command compensation unit adjusts an absolute value of the magnetic flux current command based on the angular difference. The control unit controls the power converter using a torque current command, the magnetic flux current command with the absolute value adjusted by the magnetic flux current command compensation unit, the first current, and the first magnetic pole position.

Advantageous Effects of Invention

The present invention can achieve the effect of driving two synchronous motors using one power converter while preventing unstable rotation in the low-speed range.

BRIEF DESCRIPTION OF DRAWINGS

FIG. 11 is a diagram illustrating the main-side d-axis current, the sign of the angular difference, and the state of the torque of the sub-side synchronous motor illustrated in FIGS. 6, 7, 9, and 10 in association with one another.

DESCRIPTION OF EMBODIMENTS

Hereinafter, a drive device, a fluid utilization device, and an air conditioner according to embodiments of the present invention will be described in detail based on the drawings. The present invention is not limited to the embodiments.

First Embodiment

Figure 1:
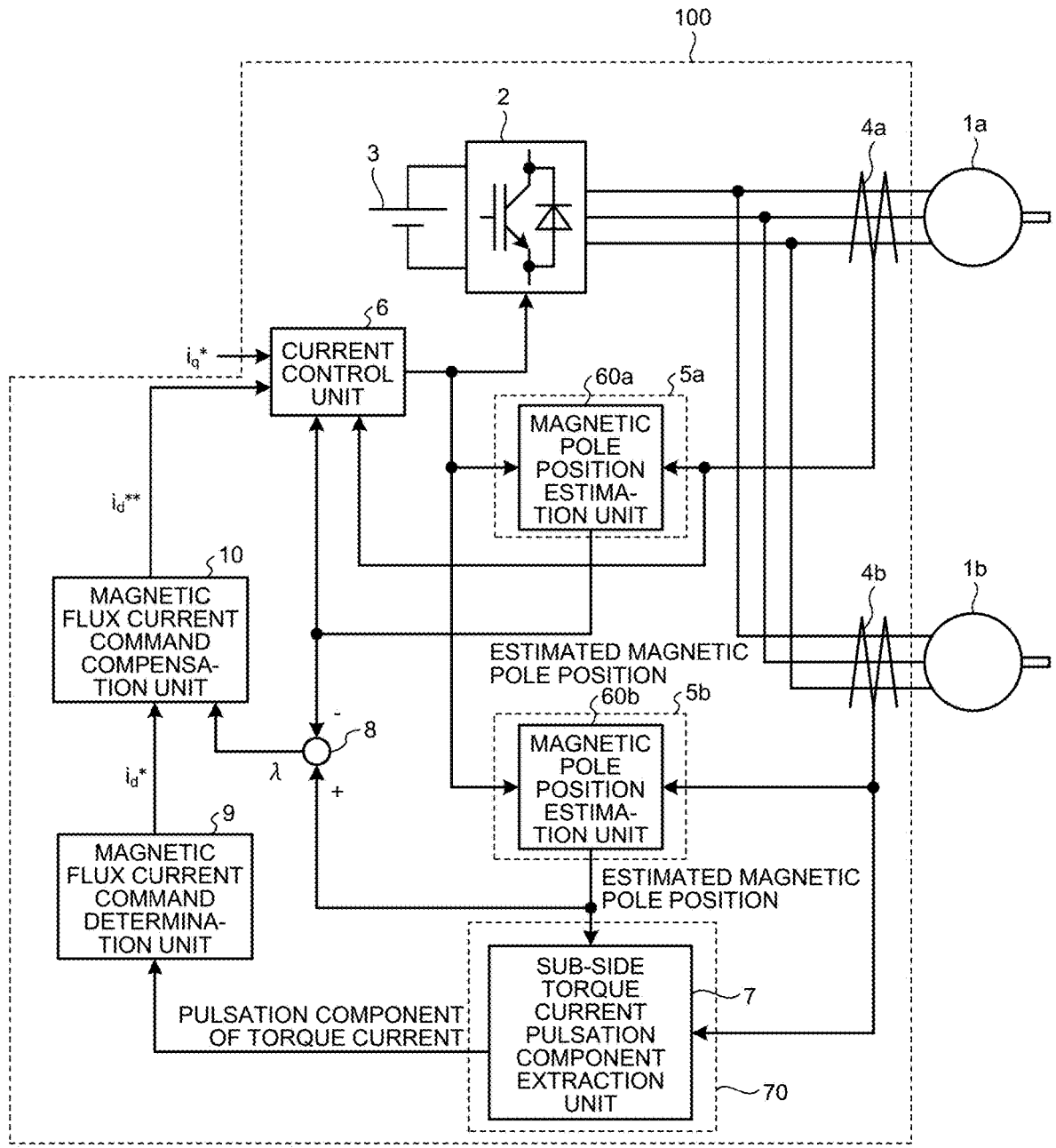
FIG. 1 is a diagram illustrating an exemplary configuration of a drive device according to a first embodiment of the present invention.

FIG. 1 is a diagram illustrating an exemplary configuration of a drive device according to a first embodiment of the present invention. Synchronous motors are roughly divided into permanent magnet field type synchronous motors in which a permanent magnet is provided on the rotor, wound field type synchronous motors in which a field winding is wound around the rotor, and reluctance type synchronous motors that obtain rotational torque using the saliency of the rotor. Among these types of synchronous motors, two synchronous motors of the same type, for example, permanent magnet field type synchronous motors, are connected in parallel to a drive device 100 according to the first embodiment. In the first embodiment, one of the two synchronous motors is referred to as a main-side synchronous motor 1a, and the other is referred to as a sub-side synchronous motor 1b. The main-side synchronous motor 1a is a first synchronous motor, and the sub-side synchronous motor 1b is a second synchronous motor.

Note that in the first embodiment, three-phase permanent magnet field type synchronous motors are used. However, the two synchronous motors only need to have substantially equal motor constants, and synchronous motors of different types from permanent magnet field type may be used, or synchronous motors having a different number of phases from three such as two or five may be used.

The drive device 100 includes a power converter 2 that supplies power to the main-side synchronous motor 1a and the sub-side synchronous motor 1b connected in parallel, a current detection unit 4a that detects a first current flowing through the main-side synchronous motor 1a, a current detection unit 4b that detects a second current flowing through the sub-side synchronous motor 1b, and a magnetic pole position identification unit 5a that is a first magnetic pole position identification unit. The drive device 100 also includes a magnetic pole position identification unit 5b that is a second magnetic pole position identification unit, a current control unit 6 that is a control unit which outputs a voltage command and controls the power converter 2, a pulsation component extraction unit 70, a subtractor 8, a magnetic flux current command determination unit 9, and a magnetic flux current command compensation unit 10. The pulsation component extraction unit 70 includes a sub-side torque current pulsation component extraction unit 7 that extracts, based on the second current detected by the current detection unit 4b, a torque current pulsation component, i.e. a pulsation component included in the torque current flowing through the sub-side synchronous motor 1b. Hereinafter, the sub-side torque current pulsation component extraction unit 7 may be simply referred to as the "pulsation component extraction unit 7".

The power converter 2 converts DC power supplied from a DC voltage source 3 into AC power for output to the main-side synchronous motor 1a and the sub-side synchronous motor 1b. In the first embodiment, a voltage-source inverter is used as the power converter 2. The voltage-source inverter is a device that switches the DC voltage supplied from the DC voltage source 3 for conversion into AC voltage. Note that the power converter 2 only needs to output AC power for driving the main-side synchronous motor 1a and the sub-side synchronous motor 1b, and is not necessarily a voltage-source inverter; instead, another circuit may be used, such as a current-source inverter, a matrix converter that converts AC power into AC power having a different amplitude and a different frequency, or a multi-level converter in which the outputs of a plurality of converters are connected in series or in parallel.

The current detection unit 4a, which is a first current detector, detects phase currents flowing from the power converter 2 to the main-side synchronous motor 1a, and outputs current information indicating the value of the detected phase currents. The current detection unit 4b, which is a second current detector, detects phase currents flowing from the power converter 2 to the sub-side synchronous motor 1b, and outputs current information indicating the value of the detected phase currents.

The current detection units 4a and 4b may be current sensors that use an instrument current transformer called a current transformer (CT), or may be current sensors that use a shunt resistor. Alternatively, the current detection units 4a and 4b may be a combination thereof. In the drive device 100 according to the first embodiment, the current is detected by the current detection units 4a and 4b provided near the synchronous motors. In the example illustrated in FIG. 1, phase currents flowing through the synchronous motors are directly detected. However, any current detection method other than direct detection may be used in which currents flowing through the synchronous motors can be computed according to Kirchhoff's current law. For example, phase currents flowing through the synchronous motors may be detected using one-shunt current detection that uses a shunt resistor provided on the negative DC bus of the power converter 2, lower-arm shunt current detection that uses a shunt resistor connected in series to the lower arm of the power converter 2, or the like. Note that in the case of the three-phase power converter 2, lower-arm shunt current detection is also referred to as three-shunt current detection because shunt resistors are connected in series to the three lower arms on a one-to-one basis. However, in one-shunt current detection or three-shunt current detection, in which only the total value of the currents flowing through the main-side synchronous motor 1*a* and the sub-side synchronous motor 1*b* is measured, it is necessary to provide a current sensor near either the main-side synchronous motor 1*a* or the sub-side synchronous motor 1*b*. Needless to say, in the case of a three-phase synchronous motor, if current sensors are provided on any two out of the three-phase wirings connected to the synchronous motor, the current of the remaining one phase can be calculated according to Kirchhoff's current law, and thus it is not necessary to provide current sensors on all the three-phase wirings. Various configurations and arrangements are conceivable for the current detection unit 4*a* and the current detection unit 4*b*, any of which may be used basically.

The magnetic pole position identification unit 5*a* identifies a first magnetic pole position of the main-side synchronous motor 1*a*. The magnetic pole position identification unit 5*a* includes a magnetic pole position estimation unit 60*a* that estimates the first magnetic pole position of the main-side synchronous motor 1*a* using the first current detected by the current detection unit 4*a*, that is, phase currents flowing through the main-side synchronous motor 1*a*, and the voltage command output from the current control unit 6. The magnetic pole position identification unit 5*a* identifies the first magnetic pole position by means of estimation in the magnetic pole position estimation unit 60*a*.

The magnetic pole position identification unit 5*b* estimates a second magnetic pole position of the sub-side synchronous motor 1*b*. The magnetic pole position identification unit 5*b* includes a magnetic pole position estimation unit 60*b* that estimates the second magnetic pole position of the sub-side synchronous motor 1*b* using the second current detected by the current detection unit 4*b*, that is, phase currents flowing through the sub-side synchronous motor 1*b*, and the voltage command output from the current control unit 6. The magnetic pole position identification unit 5*b* identifies the second magnetic pole position by means of estimation in the magnetic pole position estimation unit 60*b*.

There are various methods for estimating the magnetic pole position: a typical one is to obtain the magnetic pole position using information indicating the speed electromotive force of the synchronous motor in the middle- and high-speed ranges among the entire rotational speed range of the rotor of the synchronous motor. The speed electromotive force is induced power that occurs inside the synchronous motor as the rotor rotates, and is proportional to the field generated between the rotor and the stator of the synchronous motor and to the rotational speed of the rotor. The methods of estimating the magnetic pole position will be described in detail later.

The current control unit 6 is a vector controller that performs coordinate transformation of the current detected by the current detection unit 4*a* into a current command value in the dq-coordinate system through vector control in order to control the current flowing through the main-side synchronous motor 1*a*, where the d-axis is the direction of the magnetic flux by the permanent magnet of the rotor of the main-side synchronous motor 1*a*, and the q-axis is the axis orthogonal to the d-axis. In a typical vector controller, current control in dq-coordinates is performed based on the magnetic pole of the rotor. This is because through the conversion of phase currents into dq-coordinate values, the alternating quantity is converted into a direct quantity which facilitates the control. In a synchronous motor, the q-axis current and the magnet torque of the synchronous motor are proportional to each other; therefore, the q-axis is referred to as the torque axis, and the q-axis current is referred to as the torque current. In contrast to the q-axis current, the d-axis current causes a change in the magnetic flux generated in the stator, changing the amplitude of the output voltage of the synchronous motor; therefore, the d-axis is referred to as the magnetic flux axis, and the d-axis current is referred to as the magnetic flux current, excitation current, or the like. Note that examples of types of synchronous motors include surface magnet type synchronous AC motors in which a permanent magnet is provided on the outer circumferential surface of the rotor core, and permanent magnet embedded motors in which a permanent magnet is embedded in the rotor core. In permanent magnet embedded motors, the reluctance torque is changed by the d-axis current, and therefore it is not only the q-axis current that acts on the torque. In general, however, the q-axis current is often referred to as the torque current.

For coordinate transformation, an estimated value of the magnetic pole position computed by the magnetic pole position identification unit 5*a* is used. Note that for the current control unit 6, not only the dq-coordinate system for vector control but also a polar coordinate system such as the αβ stator coordinate system or the γδ coordinate system may be used. In addition, the current control unit 6 may adopt direct torque control (DTC) instead of vector control. However, the adoption of DTC requires conversion of a current command into a magnetic flux current command and a torque current command.

Note that if control is performed not in the dq-coordinate system but in a coordinate system that is based on the magnetic flux generated from the stator, the torque current and the magnetic flux current can be calculated more precisely. This coordinate system is often referred to as the f-t coordinate system, n-t coordinate system, or the like, which is well known and will not be described in detail. In the first embodiment, the q-axis current may be referred to as the torque current, and the d-axis current may be referred to as the magnetic flux current, which is not the case, for example, with control that uses a coordinate system other than the dq-coordinate system or with the use of a reluctance type synchronous motor, in which no magnet torque is generated in principle.

Note that the current control unit 6 performs control such that the torque current flowing through the main-side synchronous motor 1*a* matches the value of a torque current command $i_q^*$, and that the magnetic flux current flowing through the main-side synchronous motor 1*a* matches the value of a magnetic flux current command $i_d^{}$. Although the current control unit 6 may be implemented in any way, the current control unit 6** is typically configured by a proportional integral controller and a decoupling controller. The torque current command $i_q^*$ may be calculated as the result of speed control in the magnetic flux current command determination unit 9, or may be input from a higher-level controller. The magnetic flux current command $i_d^{**}$ will be described in detail later.

When the main-side synchronous motor 1*a* is vector-controlled by the current control unit 6, the sub-side synchronous motor 1b is driven to rotate following the main-side synchronous motor 1a, and thus the sub-side synchronous motor 1b is in an open-loop driven state. There is a well-known paper on open-loop drive of a synchronous motor: Reference Literature 1 "Junichi Itoh, Jiro Toyosaki, and Hiroshi Osawa, 'High Performance V/f Control Method for PM Motor', Journal of Institute of Electrical Engineers of Japan, D, 2002, Vol. 122, No. 3, pp. 253-259".

Reference Literature 1 states that when a synchronous motor is open-loop driven, the synchronous motor self-oscillates at a natural angular frequency wn, which may make the control unstable. The natural angular frequency $\omega_n$ is expressed by the approximate expression of Formula (1) below. Here, $P_m$ represents the number of pole pairs, $\Phi_a$ represents the number of armature interlinkage magnetic fluxes, $L_a$ represents the armature inductance, and J represents the moment of inertia.

[Formula 1]

$$\omega_n \cong \frac{P_m \Phi_a}{\sqrt{JL_a}} \quad (1)$$

Because electromechanical coupling vibration can be referred to as electrical spring resonance, the natural angular frequency $\omega_n$ expressed by Formula (1) is also referred to as the electrical spring resonance angular frequency. In the technique disclosed in Reference Literature 1, a stabilization compensator is added in order to reduce electrical spring resonance; similarly, the drive device 100 also requires stabilization compensation. Therefore, it is necessary to examine to what extent the torque current flowing through the sub-side synchronous motor 1b illustrated in FIG. 1 oscillates due to electrical spring resonance.

Note that the technique disclosed in Patent Literature 1 obtains a speed difference, i.e. the difference between the rotational speeds of the rotors of the main-side synchronous motor and the sub-side synchronous motor, and performs speed difference stabilization compensation using the speed difference. Thus, if the main-side synchronous motor is stably controlled, it can be said that the technique disclosed in Patent Literature 1 performs stabilization compensation by obtaining the speed pulsation component of the sub-side synchronous motor. Differences between the technique disclosed in Patent Literature 1 and the first embodiment will be described in detail later.

In the torque current flowing through the sub-side synchronous motor 1b, a component derived from the acceleration/deceleration torque and a component derived from the load torque are superimposed. The acceleration/deceleration torque is an inertial torque associated with the acceleration/deceleration of the synchronous motor. The load torque is a torque obtained by subtracting the acceleration/deceleration torque and losses such as friction from the output torque. In the pulsation component extraction unit 7 illustrated in FIG. 1, the pulsation component near the electrical spring resonance angular frequency included in the torque current of the sub-side synchronous motor 1b is extracted. Note that the pulsation component extraction unit 7 is based on either of two types of methods: one uses a high-pass filter and the other uses a bandpass filter, which will be described in order.

Figure 2:
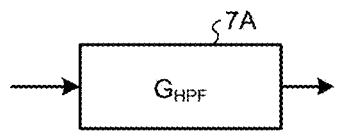
FIG. 2 is a diagram illustrating a first exemplary configuration of the sub-side torque current pulsation component extraction unit illustrated in FIG. 1.

FIG. 2 is a diagram illustrating a first exemplary configuration of the sub-side torque current pulsation component extraction unit illustrated in FIG. 1. FIG. 2 depicts an exemplary configuration of the sub-side torque current pulsation component extraction unit 7A that uses a first-order high-pass filter, and the transfer function thereof is expressed by Formula (2) below. Here, s is an operator of the Laplace transform, and c) is the cutoff angular frequency.

[Formula 2]

$$G_{HPF} = \frac{s}{s + \omega_c} \quad (2)$$

Although Formula (2) represents a transfer function in which a first-order high-pass filter is used, a high-pass filter with an order of n may be used so that steeper filter characteristics can be obtained. Here, n is an integer of two or more. In the case of using a high-pass filter, the cutoff angular frequency c) is preferably set to ⅓ or less of the electrical spring resonance angular frequency, e.g. ⅕ to 1/20 of the electrical spring resonance angular frequency.

Figure 3:
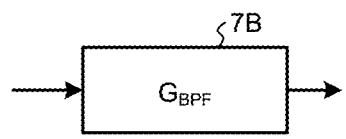
FIG. 3 is a diagram illustrating a second exemplary configuration of the sub-side torque current pulsation component extraction unit illustrated in FIG. 1.

FIG. 3 is a diagram illustrating a second exemplary configuration of the sub-side torque current pulsation component extraction unit illustrated in FIG. 1. FIG. 3 depicts an exemplary configuration of the sub-side torque current pulsation component extraction unit 7B that uses a second-order bandpass filter, and the transfer function thereof is expressed by Formula (3) below. Here, s represents an operator of the Laplace transform, and $\omega_p$ represents the peak angular frequency. In addition, q is the quality factor, i.e. a coefficient that determines the passband width of the filter.

[Formula 3]

$$G_{BPF} = \frac{\frac{\omega_p}{q} s}{s^2 + \frac{\omega_p}{q} s + \omega_p^2} \quad (3)$$

Although Formula (3) represents a transfer function in which a second-order bandpass filter is used, a bandpass filter with an order of m may be used so that steeper filter characteristics can be obtained. Here, m is an integer of three or more. In the case of using a bandpass filter, the sub-side torque current pulsation component extraction unit 7B matches the peak angular frequency $\omega_p$ with the electrical spring resonance angular frequency. However, the electrical spring resonance angular frequency has the property of varying depending on driving conditions, which is not mentioned in Reference Literature 1. Therefore, the bandpass filter needs to be designed to have a relatively wide passband width that can deal with variations in the electrical spring resonance angular frequency. Note that the sub-side torque current pulsation component extraction unit 7B may be configured to actually measure the electrical spring resonance angular frequency so that the peak angular frequency $\omega_p$ tracks the electrical spring resonance angular frequency, that is, configured to dynamically change the center frequency of the bandpass filter. In this case, the passband width can be narrowed. The center frequency corresponds to the peak angular frequency $\omega_p$.

Figure 4:
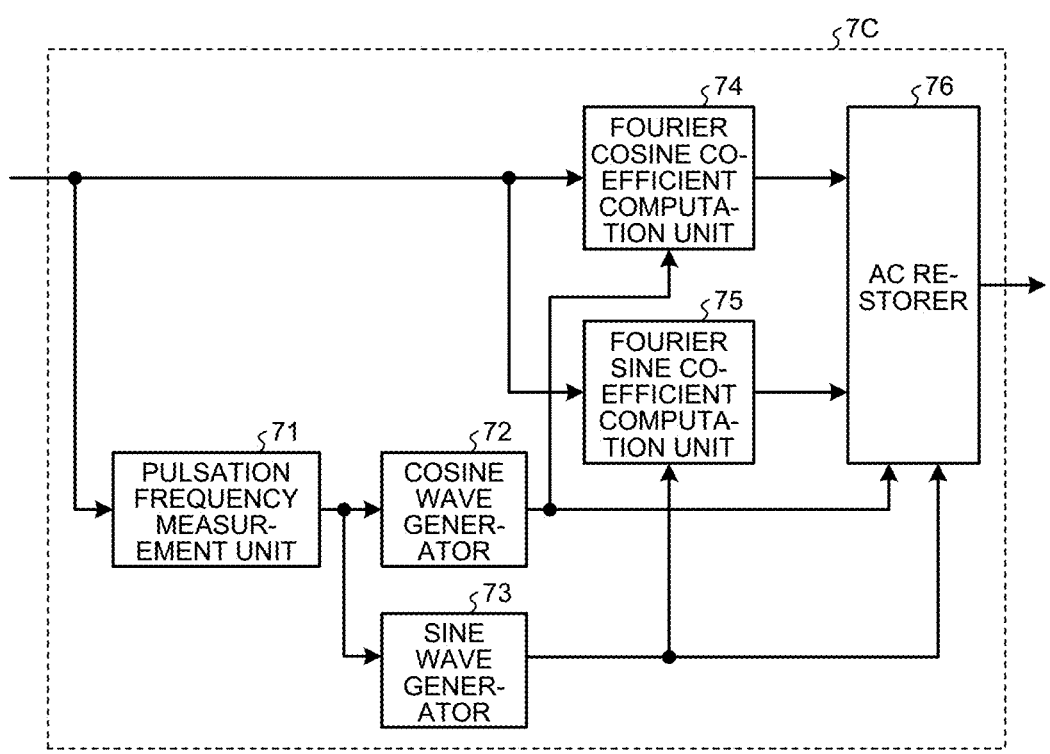
FIG. 4 is a diagram illustrating a third exemplary configuration of the sub-side torque current pulsation component extraction unit illustrated in FIG. 1.

Note that instead of performing the calculation of Formula (3), a bandpass filter that uses Fourier series expansion may be used as illustrated in FIG. 4. FIG. 4 is a diagram illustrating a third exemplary configuration of the sub-side torque current pulsation component extraction unit illustrated in FIG. 1. The sub-side torque current pulsation component extraction unit 7C illustrated in FIG. 4 includes a pulsation frequency measurement unit 71, a cosine wave generator 72, a sine wave generator 73, a Fourier cosine coefficient computation unit 74, a Fourier sine coefficient computation unit 75, and an AC restorer 76.

The pulsation frequency included in the input signal that is the current detected by the current detection unit 4b, namely the pulsation frequency included in the current detected by the current detection unit 4b, is measured by the pulsation frequency measurement unit 71. Note that the sub-side torque current pulsation component extraction unit 7 includes a coordinate converter (not illustrated) that performs coordinate transformation using the current detected by the current detection unit 4b and the magnetic pole position identified by the magnetic pole position identification unit 5b. Using the magnetic pole position identified by the magnetic pole position identification unit 5b, the coordinate converter performs coordinate transformation of the current in the three-phase coordinate system detected by the current detection unit 4b into the current in the rotating orthogonal coordinate system for output. The input signal above corresponds to the current obtained through coordinate transformation in the coordinate converter. The cosine wave generator 72 generates a cosine wave signal oscillating at the pulsation frequency, and the sine wave generator 73 generates a sine wave signal oscillating at the pulsation frequency.

The Fourier cosine coefficient computation unit 74 performs Fourier series expansion of the input signal, namely the current detected by current detection unit 4b, using the cosine wave signal from the cosine wave generator 72, and computes a Fourier cosine coefficient, i.e. the magnitude of the cosine component among the magnitudes of specific frequency components included in the input signal. The Fourier cosine coefficient is the coefficient in the case that an even function having an arbitrary period is expanded into a series of cos. The Fourier sine coefficient computation unit 75 performs Fourier series expansion of the input signal using the sine wave signal from the sine wave generator 73, and calculates a Fourier sine coefficient, i.e. the magnitude of the sine component among the magnitudes of specific frequency components included in the input signal. The Fourier sine coefficient is the coefficient in the case that an odd function having an arbitrary period is expanded into a series of sin.

The AC restorer 76 restores the alternating current using the cosine wave signal from the cosine wave generator 72, the sine wave signal from the sine wave generator 73, the Fourier cosine coefficient obtained through Fourier series expansion, and the Fourier sine coefficient obtained through Fourier series expansion. Fourier series expansion is to extract the magnitude and phase of a specific frequency component from the input signal. The magnitude of a specific frequency component can be expressed by the magnitude of the cosine component and the magnitude of the sine component. The phase can be expressed by the ratio of the magnitude of the cosine component to the magnitude of the sine component. According to the sub-side torque current pulsation component extraction unit 7C illustrated in FIG. 4, the characteristics of the bandpass filter are obtained using Fourier series expansion and inverse transform. In the inverse transform, the alternating current of the specific frequency is output based on the magnitude of the cosine component, the magnitude of the sine component, and the phase of the specific frequency component extracted in the Fourier series expansion.

In a case where the functions of the drive device 100 are implemented in a processing device such as a microcomputer, it is necessary to discretize the functions for implementation. However, if the bandpass filter of Formula (3) is discretized for use, the calculation accuracy fluctuates with changes in the peak angular frequency op: in particular, the calculation accuracy tends to decrease with increase in the peak angular frequency op. On the other hand, Fourier series expansion can prevent the calculation accuracy from decreasing even in the case of discretization that changes the peak angular frequency op. Therefore, the method of extracting the pulsation component near the electrical spring resonance angular frequency included in the torque current of the sub-side synchronous motor 1b using Fourier series expansion is advantageous in terms of implementation. It is thus considered that the method of extracting the pulsation component using Fourier series expansion is useful in the case of changing the peak frequency of the bandpass filter. However, as long as the calculation accuracy can be ensured, the pulsation frequency measurement unit 71 illustrated in FIG. 4 and Formula (3) may be combined into a bandpass filter that is used as the pulsation component extraction unit 7 illustrated in FIG. 1.

As described above, the pulsation component extraction unit 7 may be configured by any of the filters illustrated in FIGS. 2 to 4 as long as the pulsation component near the electrical spring resonance angular frequency included in the torque current of the sub-side synchronous motor 1b can be extracted. Note that the high-pass filter is easier to design and implement in circuitry than the bandpass filter, and thus the high-pass filter is preferable when emphasis is on the ease of design and implementation in circuitry. In contrast, for obtaining sharp cutoff characteristics, the bandpass filter is preferable.

The subtractor 8 illustrated in FIG. 1 obtains an angular difference $\lambda$, i.e. the difference between the magnetic pole positions of the rotors of the main-side synchronous motor 1a and the sub-side synchronous motor 1b. The magnetic pole position of each of the main-side synchronous motor 1a and the sub-side synchronous motor 1b is equal to the rotational position or rotational angle of the rotor thereof. In order to explain the reason for obtaining the angular difference $\lambda$, a voltage equation and a torque equation in the steady state of a permanent magnet synchronous motor will now be described.

The voltage equation is expressed by Formula (4) below. The torque equation is expressed by Formula (5) below. The first term on the right side of Formula (5) represents the magnet torque, and the second term represents the reluctance torque. The magnet torque is proportional to the q-axis current, and the reluctance torque is proportional to the product of the d-axis current and the q-axis current.

[Formula 4]

[Formula 4]

$$\begin{bmatrix} v_{dx} \\ v_{qx} \end{bmatrix} = \begin{bmatrix} R_{ax} & -\omega_{ex}L_{qx} \\ \omega_{ex}L_{dx} & R_{ax} \end{bmatrix} \begin{bmatrix} i_{dx} \\ i_{qx} \end{bmatrix} + \begin{bmatrix} 0 \\ \omega_{ex}\Phi_{ax} \end{bmatrix} \quad (4)$$

[Formula 5]

$$\tau_x = P_{mx}\Phi_{ax}i_{qx} + P_{mx}(L_{dx}-L_{qx})i_{dx}i_{qx} \quad (5)$$

In Formulas (4) and (5), $R_a$ represents the armature resistance, $L_d$ represents the d-axis inductance, $L_q$ represents the q-axis inductance, $P_m$ represents the number of pole pairs, $\Phi_a$ represents the number of armature interlinkage magnetic fluxes, $\omega_e$ represents the angular velocity, $i_d$ represents the d-axis current, $i_q$ represents the q-axis current, $v_d$ represents the d-axis voltage, $v_q$ represents the q-axis voltage, and T represents the generated torque. The subscript "x" of each coefficient is for distinguishing whether the synchronous motor is on the main side or the sub side. For example, when it is not necessary to distinguish between the main side and the sub side, "x" is added to the subscript, or the subscript is omitted. In addition, "m" can be added to the subscript instead of "x" to represent the main side, and "s" can be added to the subscript instead of "x" to represent the sub side.

Figure 5:
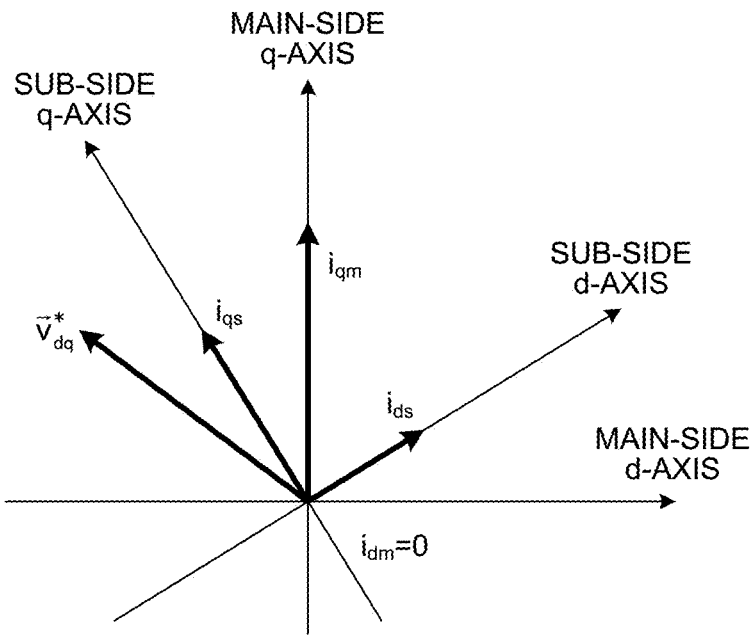
FIG. 5 is a first diagram for explaining the torque change behavior of the sub-side synchronous motor illustrated in FIG. 1.
Figure 6:
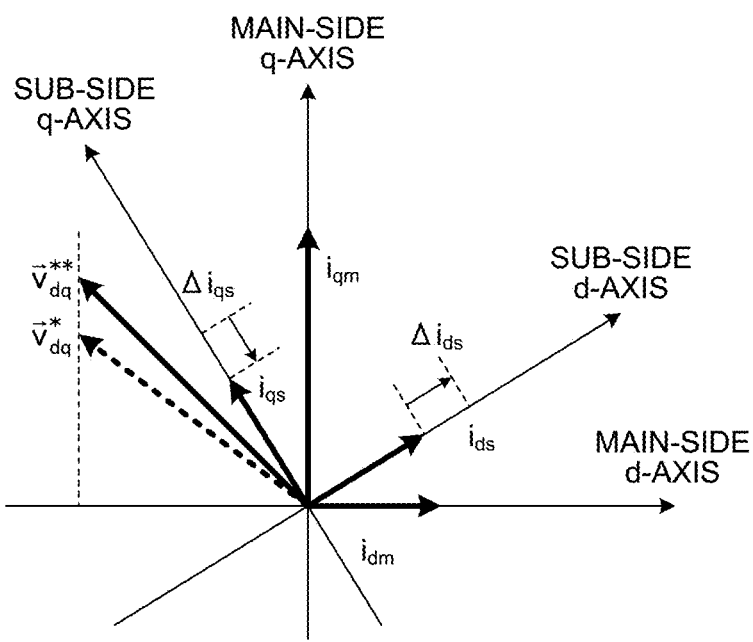
FIG. 6 is a second diagram for explaining the torque change behavior of the sub-side synchronous motor illustrated in FIG. 1.
Figure 7:
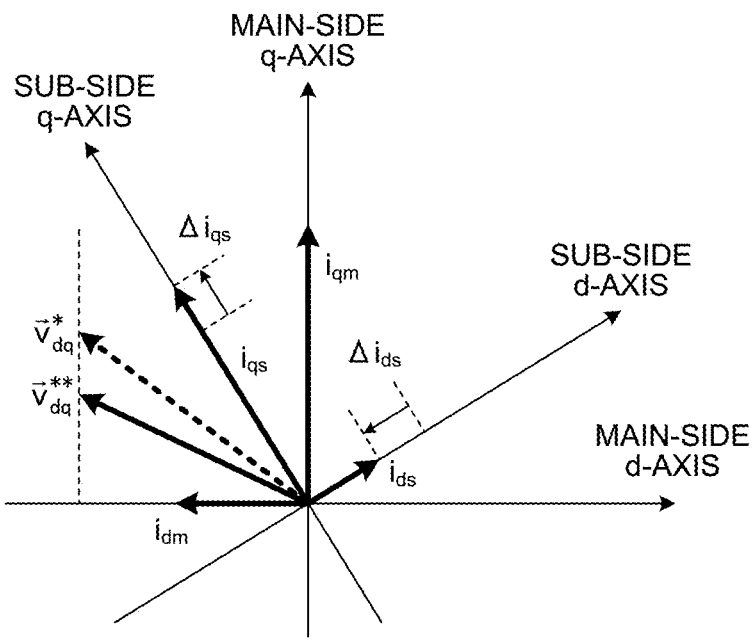
FIG. 7 is a third diagram for explaining the torque change behavior of the sub-side synchronous motor illustrated in FIG. 1.
Figure 8:
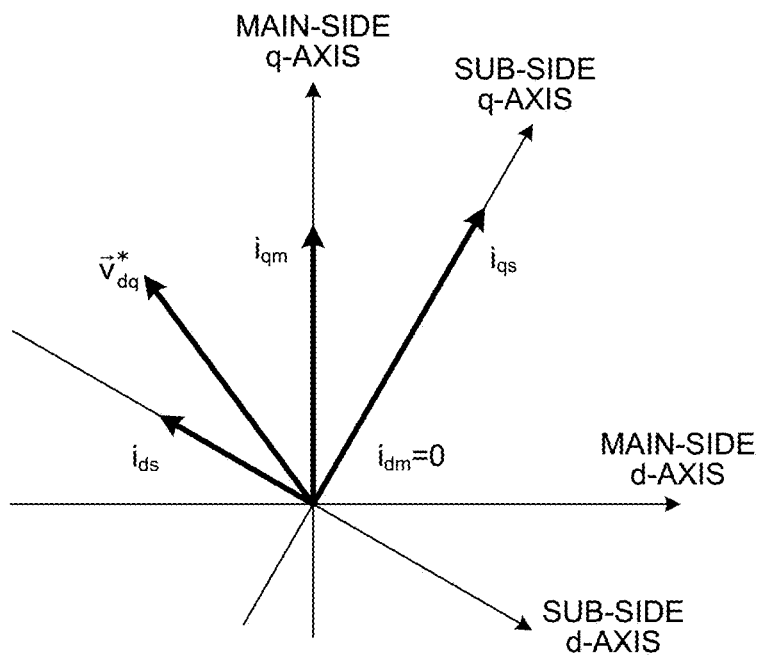
FIG. 8 is a fourth diagram for explaining the torque change behavior of the sub-side synchronous motor illustrated in FIG. 1.
Figure 9:
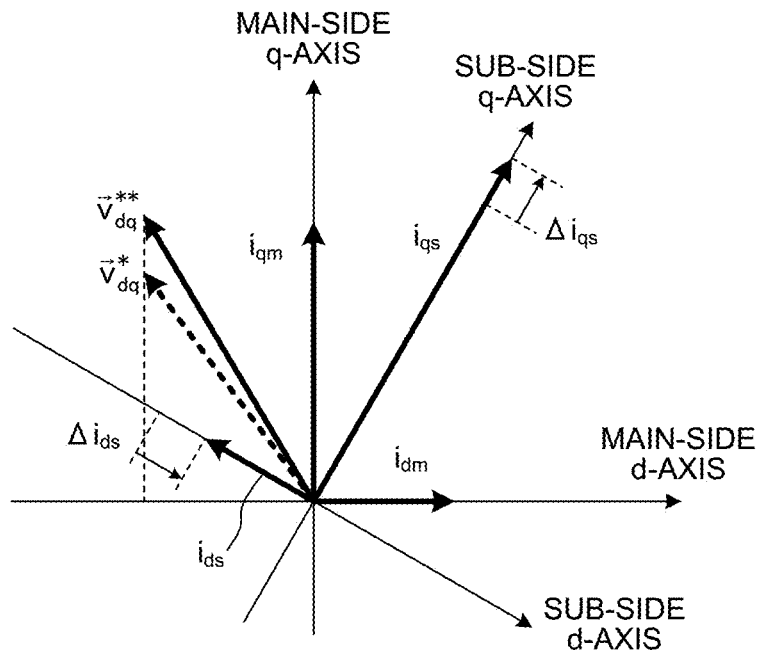
FIG. 9 is a fifth diagram for explaining the torque change behavior of the sub-side synchronous motor illustrated in FIG. 1.
Figure 10:
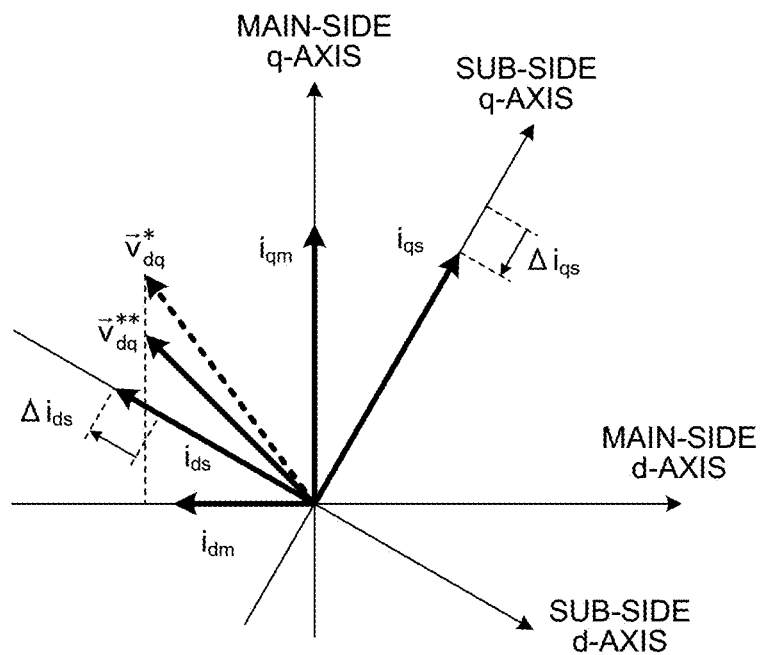
FIG. 10 is a sixth diagram for explaining the torque change behavior of the sub-side synchronous motor illustrated in FIG. 1.

Next, the torque change behavior of the sub-side synchronous motor 1b due to magnetic flux current compensation will be described with reference to FIGS. 5 to 11. FIG. 5 is a first diagram for explaining the torque change behavior of the sub-side synchronous motor illustrated in FIG. 1. FIG. 6 is a second diagram for explaining the torque change behavior of the sub-side synchronous motor illustrated in FIG. 1. FIG. 7 is a third diagram for explaining the torque change behavior of the sub-side synchronous motor illustrated in FIG. 1. FIG. 8 is a fourth diagram for explaining the torque change behavior of the sub-side synchronous motor illustrated in FIG. 1. FIG. 9 is a fifth diagram for explaining the torque change behavior of the sub-side synchronous motor illustrated in FIG. 1. FIG. 10 is a sixth diagram for explaining the torque change behavior of the sub-side synchronous motor illustrated in FIG. 1. FIG. 11 is a diagram illustrating the main-side d-axis current, the sign of the angular difference, and the state of the torque of the sub-side synchronous motor illustrated in FIGS. 6, 7, 9, and 10 in association with one another.

FIGS. 5 to 10 depict the torque change behavior of the sub-side synchronous motor 1b due to magnetic flux current compensation, and the contents of FIGS. 5 to 10 are disclosed in Patent Literature 1. The technique disclosed in Patent Literature 1 and the drive device 100 according to the first embodiment are similar in that the angular difference $\lambda$ between the magnetic pole positions of the rotors of the main-side synchronous motor 1a and the sub-side synchronous motor 1b is used for control to stably drive the sub-side synchronous motor 1b. However, the drive device 100 according to the first embodiment differs from the technique disclosed in Patent Literature 1 in that the speed difference between the main-side synchronous motor 1a and the sub-side synchronous motor 1b is not used.

First, referring to FIG. 5, a case where the d-axis of the main-side synchronous motor 1a is delayed in phase with respect to the d-axis of the sub-side synchronous motor 1b will be described. In FIG. 5, when the d-axis current $i_{dm}$, which is the magnetic flux current of the main-side synchronous motor 1a, is zero and the torque current $i_{qm}$ of the main-side synchronous motor 1a flows in the positive direction, the voltage command vector $\vec{v}_{dq}*$ is generated in the direction of the second quadrant. The voltage command vector $\vec{v}_d*$ represents a voltage command in the rotating orthogonal coordinate system (dq-axes). When different load torques are generated in the two synchronous motors, if the two synchronous motors have equal motor constants, the phase of the synchronous motor under heavier load is delayed. Therefore, in the case of FIG. 5, it can be said that the load of the main-side synchronous motor 1a is larger than the load of the sub-side synchronous motor 1b. That is, the main-side synchronous motor 1a has a heavier load. The drive device 100 applies the same voltage to the two synchronous motors, but with the main-side synchronous motor 1a under heavier load, the magnetic flux current of the sub-side synchronous motor 1b flows in the positive direction. This is apparent by solving Formula (4).

Now we consider a case where a positive magnetic flux current flows through the main-side synchronous motor 1a as illustrated in FIG. 6. In this case, as the q-axis voltage of the main-side synchronous motor 1a increases in the positive direction, the voltage command vector changes from $\vec{v}_{dq}*$ to $\vec{v}_{dq}**$. Such a change in the q-axis voltage of the main-side synchronous motor 1a causes a decrease in the d-axis voltage of the sub-side synchronous motor 1b and an increase in the q-axis voltage of the sub-side synchronous motor 1b. With the decrease in the d-axis voltage of the sub-side synchronous motor 1b, the armature reaction $\omega_{es}L_{qs}i_{qs}$ of the q-axis of the sub-side synchronous motor 1b decreases. Therefore, the q-axis current $i_{qs}$ of the sub-side synchronous motor 1b decreases. In addition, as the q-axis voltage of the sub-side synchronous motor 1b increases, the d-axis current $i_{ds}$ of the sub-side synchronous motor 1b increases. Such a change in the d-axis current $i_{dm}$, namely the magnetic flux current of the main-side synchronous motor 1a, causes a change in the current of the sub-side synchronous motor 1b. This change in the current of the sub-side synchronous motor 1b makes the torque of the sub-side synchronous motor 1b different from the torque of the sub-side synchronous motor 1b illustrated in FIG. 5. Here, for ease of explanation, it is assumed that the synchronous motors are surface magnet type synchronous AC motors in which a permanent magnet is provided on the outer circumferential surface of the rotor core, and that there is no reluctance torque. In this case, as the current of the sub-side synchronous motor 1b changes, the torque of the sub-side synchronous motor 1b decreases compared to the state of FIG. 5.

FIG. 7 depicts the torque state of the sub-side synchronous motor 1b in which a negative magnetic flux current flows through the main-side synchronous motor 1a, in contrast to the case of FIG. 6. In this case, as the q-axis voltage of the main-side synchronous motor 1a decreases, the voltage command vector changes from $\vec{v}_{dq}*$ to $\vec{v}_{dq}**$. Consequently, the d-axis voltage of the sub-side synchronous motor 1b increases, and the q-axis voltage of the sub-side synchronous motor 1b decreases. The increase in the d-axis voltage of the sub-side synchronous motor 1b causes an increase in the q-axis current $i_{qs}$ of the sub-side synchronous motor 1b, and the decrease in the q-axis voltage of the sub-side synchronous motor 1b causes a decrease in the d-axis current $i_{ds}$ of the sub-side synchronous motor 1b. In this case, the torque of the sub-side synchronous motor 1b increases compared to the state of FIG. 5.

Next, referring to FIG. 8, a case where the d-axis of the main-side synchronous motor 1a is leading in phase with respect to the d-axis of the sub-side synchronous motor 1b will be described. In FIG. 8, the d-axis current $i_{dm}$ of the main-side synchronous motor 1a is zero, and the load of the sub-side synchronous motor 1b is larger than the load of the main-side synchronous motor 1a, that is, the sub-side synchronous motor 1b has a heavier load. Since the same voltage is applied to the main-side synchronous motor 1a and the sub-side synchronous motor 1b, with the sub-side synchronous motor 1b under heavier load, the d-axis current $i_{ds}$ of the sub-side synchronous motor 1b flows in the negative direction.

Now we consider a case where the positive d-axis current $i_{dm}$ flows through the main-side synchronous motor 1a as illustrated in FIG. 9. In this case, as the q-axis voltage of the main-side synchronous motor 1a increases, the voltage command vector changes from $\vec{v}_{dq}^*$ to $\vec{v}_{dq}^{}$. Such a change in the q-axis voltage of the main-side synchronous motor 1a causes an increase in the d-axis voltage of the sub-side synchronous motor 1b and an increase in the q-axis voltage of the sub-side synchronous motor 1b. As the d-axis voltage of the sub-side synchronous motor 1b increases, the q-axis current $i_{qs}$ of the sub-side synchronous motor 1b increases. In addition, as the q-axis voltage of the sub-side synchronous motor 1b increases, the d-axis current $i_{ds}$ of the sub-side synchronous motor 1b decreases. In this case, the torque of the sub-side synchronous motor 1b increases compared to the state of FIG. 8**.

FIG. 10 depicts the torque state of the sub-side synchronous motor 1b in which a negative magnetic flux current flows through the main-side synchronous motor 1a, in contrast to the case of FIG. 9. In this case, the q-axis current of the sub-side synchronous motor 1b decreases. Therefore, the torque of the sub-side synchronous motor 1b decreases compared to the state of FIG. 8.

FIG. 11 depicts the main-side d-axis current $i_{dm}$, the sign of the angular difference $\lambda$, and the state of the torque of the sub-side synchronous motor 1b illustrated in FIGS. 6, 7, 9, and 10 in association with one another. In a case where the angular difference $\lambda$ between the two synchronous motors is defined as Formula (6) below, when the d-axis current $i_{dm}$ of the main-side synchronous motor 1a is increased, the torque of the sub-side synchronous motor 1b decreases if the angular difference $\lambda$ between the two synchronous motors is positive, and the torque of the sub-side synchronous motor 1b increases if the angular difference $\lambda$ is negative. Here, $\theta_{es}$ in Formula (6) represents the magnetic pole position of the sub-side synchronous motor 1b as an electrical angle, and $\theta_{em}$ represents the magnetic pole position of the main-side synchronous motor 1a as an electrical angle. On the other hand, when the d-axis current $i_{dm}$ of the main-side synchronous motor 1a is reduced, the torque of the sub-side synchronous motor 1b increases if the angular difference $\lambda$ between the two synchronous motors is positive, and the torque of the sub-side synchronous motor 1b decreases if the angular difference $\lambda$ is negative. That is, in order to stably drive the sub-side synchronous motor 1b by changing the torque of the sub-side synchronous motor 1b by changing the d-axis current $i_{dm}$ of the main-side synchronous motor 1a, it is necessary to determine the compensation direction for the d-axis current $i_{dm}$ based on whether the angular difference $\lambda$ between the two synchronous motors is positive or negative. For this reason, the subtractor 8 is used to obtain the angular difference $\lambda$ between the magnetic pole positions of the two synchronous motors.

[Formula 6]

$$\lambda = \theta_{es} - \theta_{em} \tag{6}$$

The magnetic flux current command determination unit 9 illustrated in FIG. 1 determines a magnetic flux current command for stably driving the sub-side synchronous motor 1b. It has already been described that the torque of the sub-side synchronous motor 1b is changed by changing the d-axis current $i_{dm}$, which is the magnetic flux current, but how to determine the magnetic flux current command $i_d^*$ is important for the drive device 100. In Patent Literature 1, the magnetic flux current command is determined using the speed difference between the two synchronous motors, whereas in the drive device 100 according to the first embodiment, the magnetic flux current command is determined from the pulsation component of the torque current of the sub-side synchronous motor 1b. To explain the reason, it is necessary to describe speed estimation methods for synchronous motors and speed estimation errors due to changes in magnetic flux current.

As described above, various methods have been studied for estimating the magnetic pole position of a synchronous motor or for estimating the rotational speed of the rotor of a synchronous motor: a typical one is to obtain the magnetic pole position using the speed electromotive force information of the synchronous motor in the middle- and high-speed ranges among the entire rotational speed range of the rotor of the synchronous motor. Here, two types of methods, arctangent method and adaptive magnetic flux observer, will be described.

The arctangent method is widely known as the most primitive position estimation method. Formula (7) below is a voltage equation for a surface magnet type synchronous AC motor in stator coordinates. Here, p is a differential operator, $\theta_e$ is the magnetic pole position expressed as an electrical angle, $R_a$ is the armature resistance, $L_a$ is the armature inductance, $v_\alpha$ and $v_\beta$ are voltages in stator coordinates, $\Phi_a$ is the number of armature interlinkage magnetic fluxes, and $i_\alpha$ and $i_\beta$ are currents in stator coordinates.

[Formula 7]

[Formula 7]

$$\begin{bmatrix} v_\alpha \\ v_\beta \end{bmatrix} = \begin{bmatrix} R_a + pL_a & 0 \\ 0 & R_a + pL_a \end{bmatrix} \begin{bmatrix} i_\alpha \\ i_\beta \end{bmatrix} + p\Phi_a \begin{bmatrix} \cos\theta_e \\ \sin\theta_e \end{bmatrix} \tag{7}$$

The second term on the right side of Formula (7) represents the speed electromotive force. Note that the term representing the speed electromotive force can be expressed in the form of Formula (8) below. Here, $e_\alpha$ is the α-axis speed electromotive force, $e_\beta$ is the β-axis speed electromotive force, p is a differential operator, $\varphi_{ar}$ is the rotor α-axis magnetic flux, $\varphi_{\beta r}$ is the rotor β-axis magnetic flux, $\Phi_a$ is the number of armature interlinkage magnetic fluxes, $\theta_e$ is the magnetic pole position expressed as an electrical angle, and $\omega_e$ is the angular velocity.

[Formula 8]

[Formula 8]

$$\begin{bmatrix} e_\alpha \\ e_\beta \end{bmatrix} = p \begin{bmatrix} \phi_{ar} \\ \phi_{\beta r} \end{bmatrix} = p\Phi_a \begin{bmatrix} \cos\theta_e \\ \sin\theta_e \end{bmatrix} = \omega_e \Phi_a \begin{bmatrix} -\sin\theta_e \\ \cos\theta_e \end{bmatrix} \tag{8}$$

As can be seen from Formula (7), because the speed electromotive force includes $\theta_e$, which is magnetic pole position information, the magnetic pole position is computed by arranging Formula (7). First, the term of the rotor magnetic flux is put on the left side and the other terms are put on the right side, whereby Formula (9) below is obtained. Because noise is amplified by differential calculation, both sides of Formula (9) are integrated, whereby Formula (10) below is obtained. Here, in a case where there is a DC offset in a voltage sensor or the like, the use of pure integration makes the integral diverge; therefore, it is common practice to use approximate integration so as not to integrate the DC component when calculating Formula (10).

[Formula 9]

$$p\begin{bmatrix}\phi_{\alpha r}\\ \phi_{\beta r}\end{bmatrix}=\begin{bmatrix}v_{\alpha}\\ v_{\beta}\end{bmatrix}-R_a\begin{bmatrix}i_{\alpha}\\ i_{\beta}\end{bmatrix}-pL_a\begin{bmatrix}i_{\alpha}\\ i_{\beta}\end{bmatrix} \quad (9)$$

[Formula 10]

$$\begin{bmatrix}\hat{\phi}_{\alpha r}\\ \hat{\phi}_{\beta r}\end{bmatrix}=\begin{bmatrix}\int(v_{\alpha}-R_a i_{\alpha})\cdot dt\\ \int(v_{\beta}-R_a i_{\beta})\cdot dt\end{bmatrix}-L_a\begin{bmatrix}i_{\alpha}\\ i_{\beta}\end{bmatrix} \quad (10)$$

In Formula (10), the symbol "^" represents an estimated value. By calculating Formula (10) to obtain the rotor magnetic flux, and performing the arctangent calculation represented by Formula (11) below using the obtained rotor magnetic flux, it is possible to estimate the magnetic pole position of the rotor. The angular velocity can be calculated using the estimated magnetic pole position of the rotor; therefore, an estimated angular velocity $\hat{\omega}_e$ is calculated with Formula (12) below. However, in order to avoid the influence of differential noise, a low-pass filter is usually applied when the estimated angular velocity $\hat{\omega}_e$ is used for control. Alternatively, the estimated angular velocity $\hat{\omega}_e$ can also be calculated by estimating the speed electromotive force and dividing the amplitude thereof by the number of armature interlinkage magnetic fluxes (Q, as represented by Formula (13) below. However, because the magnetic flux of the permanent magnet fluctuates with temperature changes, the calculation method of Formula (13) produces steady speed estimation errors due to temperature changes. Therefore, errors due to the speed estimation method with Formula (12) are smaller than errors due to the method represented by Formula (13). The first embodiment describes a case where speed estimation is performed based on Formula (12).

[Formula 11]

$$\hat{\theta}_e = \tan^{-1}\left(\frac{\hat{\phi}_{\beta r}}{\hat{\phi}_{\alpha r}}\right) \quad (11)$$

[Formula 12]

$$\hat{\omega}_e = \frac{d}{dt}\hat{\theta}_e \quad (12)$$

[Formula 13]

$$\hat{\omega}_e = \frac{\sqrt{\hat{e}_{\alpha}^2+\hat{e}_{\beta}^2}}{\Phi_a} \quad (13)$$

Figure 12:
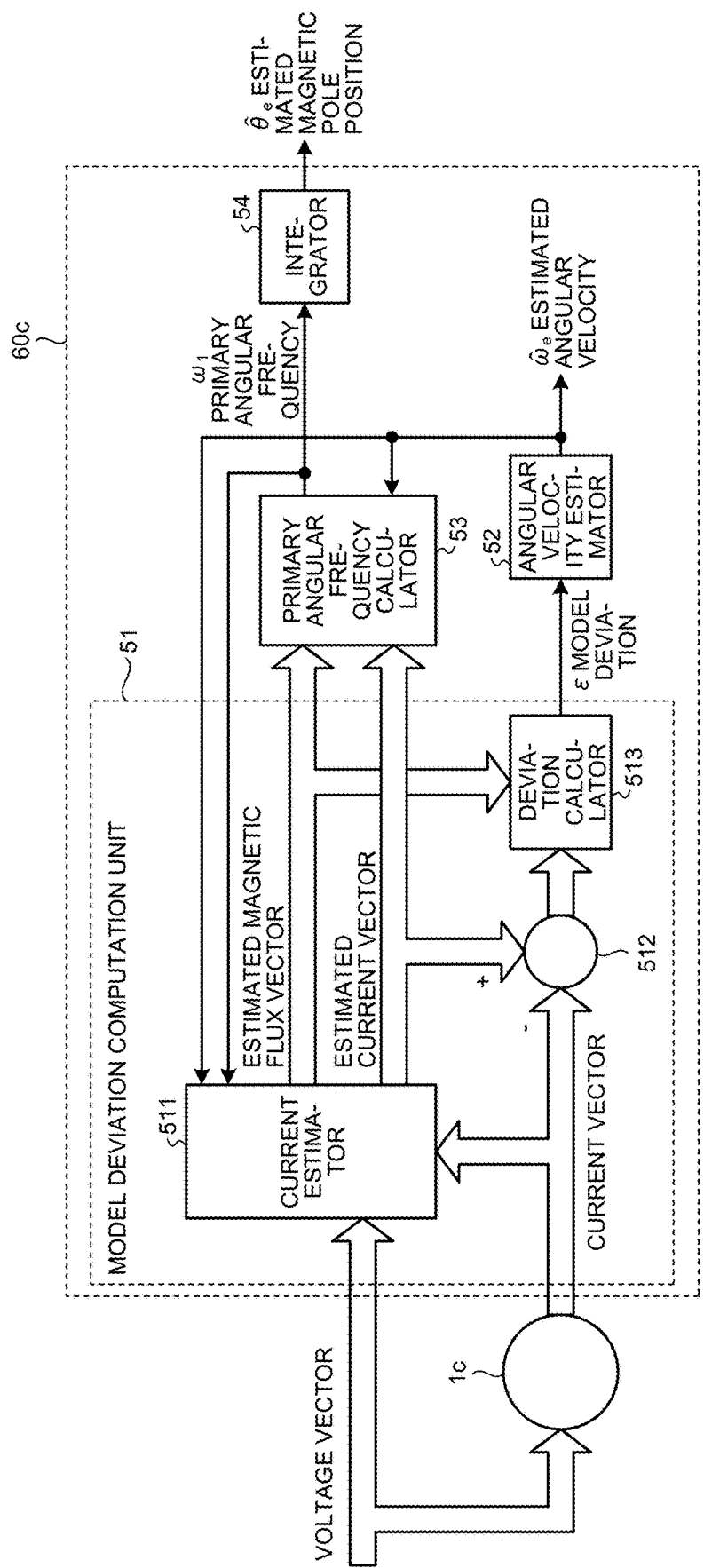
FIG. 12 is a diagram illustrating an example in which the magnetic pole position estimation unit illustrated in FIG. 1 is configured by an adaptive magnetic flux observer.

In addition to the arctangent method, various speed estimation methods have been proposed. A representative example of speed estimation methods other than the arctangent method is an adaptive magnetic flux observer, which will be described below with reference to FIG. 12. FIG. 12 is a diagram illustrating an example in which the magnetic pole position estimation unit illustrated in FIG. 1 is configured by an adaptive magnetic flux observer. The magnetic pole position estimation unit 60c illustrated in FIG. 12 is the magnetic pole position estimation unit 60a or 60b illustrated in FIG. 1 that is configured by an adaptive magnetic flux observer. A synchronous motor 1c illustrated in FIG. 12 corresponds to each of the main-side synchronous motor 1a and the sub-side synchronous motor 1b illustrated in FIG. 1. The magnetic pole position estimation unit 60c estimates the rotational speed of the synchronous motor 1c using a voltage vector and a current vector based on the adaptive magnetic flux observer technique, and outputs the estimated angular velocity $\hat{\omega}_e$ and the estimated magnetic pole position $\hat{\theta}_e$. The voltage vector is a voltage command generated by the current control unit 6 and input to the magnetic pole position estimation units 60a and 60b. The current vector is current information generated by the current detection units 4a and 4b, that is, a detected dq-axis current value on the dq-coordinate axes.

The magnetic pole position estimation unit 60c includes a model deviation computation unit 51 that computes a model deviation ε based on the voltage vector and current vector of the synchronous motor 1c, a primary angular frequency $\omega_1$ of the power converter 2 that is an inverter, and the estimated angular velocity $\hat{\omega}_e$, and an angular velocity estimator 52 that computes the estimated angular velocity $\hat{\omega}_e$ based on the model deviation ε. The magnetic pole position estimation unit 60c also includes a primary angular frequency calculator 53 that computes the primary angular frequency $\omega_1$ using an estimated magnetic flux vector, an estimated current vector, and the estimated angular velocity $\hat{\omega}_e$, and an integrator 54 that integrates the primary angular frequency $\omega_1$ and outputs the estimated magnetic pole position $\hat{\theta}_e$.

The model deviation computation unit 51 includes a current estimator 511 that computes and outputs the estimated magnetic flux vector and the estimated current vector based on the voltage vector and current vector of the synchronous motor 1c, the primary angular frequency $\omega_1$, and the estimated angular velocity $\hat{\omega}_e$, and a subtractor 512 that computes and outputs a current deviation vector by subtracting the current vector from the estimated current vector. The model deviation computation unit 51 also includes a deviation calculator 513 that receives input of the current deviation vector from the subtractor 512, extracts the quadrature component of the estimated magnetic flux vector as a scalar quantity, and outputs the extracted scalar quantity as the model deviation ε. Known methods of extracting the quadrature component of the estimated magnetic flux vector as a scalar quantity include coordinate transformation of the current deviation vector into two rotating axes and computation of the magnitude of the outer product of the current deviation vector and the estimated magnetic flux vector.

The current estimator 511 estimates the current and the magnetic flux from the equation of state of the synchronous motor 1c. Here, it is assumed that the synchronous motor 1c is a general permanent magnet embedded synchronous AC motor, but the current estimator 511 can perform current estimation on any synchronous motor other than a permanent magnet embedded synchronous AC motor using a similar method as long as the equation of state thereof can be established.

In the case where the synchronous motor 1c is a permanent magnet embedded synchronous AC motor, the equation of state is expressed by Formulas (14) and (15) below. Here, $L_d$ represents the d-axis inductance, $L_q$ represents the q-axis inductance, $R_a$ represents the armature resistance, and $\omega_1$ represents the primary angular frequency. In addition, $v_d$ represents the d-axis voltage, $v_q$ represents the q-axis voltage, $i_d$ represents the d-axis current, and $i_q$ represents the q-axis current. Further, $\varphi_{ds}$ represents the d-axis stator magnetic flux, $\varphi_{qs}$ represents the q-axis stator magnetic flux, $\varphi_{dr}$ represents the d-axis rotor magnetic flux, c) represents the angular velocity, and $h_{11}$ to $h_{32}$ represent observer gains. The symbol "^" represents an estimated value.

[Formula 14]

[Formula 14]

$$\frac{d}{dt}\begin{bmatrix}\hat{\varphi}_{ds}\\ \hat{\varphi}_{qs}\\ \hat{\varphi}_{dr}\end{bmatrix} = \begin{pmatrix}-\frac{R_a}{L_d} & \omega_1 & 0\\ -\omega_1 & -\frac{R_a}{L_q} & -\hat{\omega}_e\\ 0 & 0 & 0\end{pmatrix}\begin{bmatrix}\hat{\varphi}_{ds}\\ \hat{\varphi}_{qs}\\ \hat{\varphi}_{dr}\end{bmatrix} + \begin{bmatrix}v_d\\ v_q\\ 0\end{bmatrix} - \begin{bmatrix}h_{11} & h_{12}\\ h_{21} & h_{22}\\ h_{31} & h_{32}\end{bmatrix}\begin{bmatrix}\hat{i}_d - i_d\\ \hat{i}_q - i_q\end{bmatrix} \quad (14)$$

[Formula 15]

[Formula 15]

$$\begin{bmatrix}\hat{i}_d\\ \hat{i}_q\end{bmatrix} = \begin{bmatrix}1/L_d & 0 & 0\\ 0 & 1/L_q & 0\end{bmatrix}\begin{bmatrix}\hat{\varphi}_{ds}\\ \hat{\varphi}_{qs}\\ \hat{\varphi}_{dr}\end{bmatrix} \quad (15)$$

The primary angular frequency $\omega_1$ is given as Formula (16) below. Here, $h_{41}$ and $h_{42}$ represent observer gains.

[Formula 16]

[Formula 16]

$$\omega_1 = \hat{\omega}_e - \frac{h_{41}(\hat{i}_d - i_d) + h_{42}(\hat{i}_q - i_q)}{\hat{\varphi}_{dr}} \quad (16)$$

Formulas (14) and (15) are based on the normal induced voltage, but Formulas (14) and (15) can be modified and expressed in the form of an extended induced voltage, in which case similar calculations are also possible. Because Formula (14) includes the estimated angular velocity $\hat{\omega}_e$, an error occurs in current estimation when the estimated angular velocity $\hat{\omega}_e$ does not match the actual angular velocity $\omega_e$. Here, the model deviation $\varepsilon$ is defined as Formula (17) below, and the magnetic pole position estimation unit 60c adjusts the value of the estimated angular velocity $\hat{\omega}_e$ using the angular velocity estimator 52 such that the model deviation $\varepsilon$ becomes zero. A known example of the angular velocity estimator 52 is one that includes a proportional integral controller and an integrator connected in series.

[Formula 17]

[Formula 17]

$$\varepsilon = \frac{\hat{i}_q - i_q}{\hat{\varphi}_{dr}} \quad (17)$$

The primary angular frequency calculator 53 computes the primary angular frequency $\omega_1$ from the estimated magnetic flux vector, the estimated current vector, and the estimated angular velocity $\hat{\omega}_e$ based on Formula (16). The integrator 54 estimates the magnetic pole position by integrating the primary angular frequency $\omega_1$.

The adaptive magnetic flux observer, which is advantageous in being robust against fluctuations in the number of interlinkage magnetic fluxes and not producing steady speed estimation errors, is publicly recognized as a high-performance speed estimation method.

Having described in detail the exemplary configurations of the magnetic pole position estimation units 60a and 60b, the influence of changes in magnetic flux current on speed estimation errors will now be described. Here, in order to clarify the problem, two types of analysis results will be described: without and with output voltage errors in the power converter 2. The problem means that upon a decrease in the compensation accuracy for output voltage errors in the power converter 2 in the low-rotation range, the speed electromotive force of the motor decreases in the low-rotation range, and the influence of output voltage errors in the power converter 2 becomes relatively large. That is, the problem is that in the presence of output voltage errors, the method of Patent Literature 1 alone is not enough to prevent unstable control in the low-rotation range. Note that an output voltage error is the error between the value of the voltage command that the current control unit 6 gives to the power converter 2 and the actual voltage that the power converter 2 actually outputs. Known causes of output voltage errors include short-circuit prevention time for the semiconductor elements of the upper and lower arms in series constituting the power converter 2, on-voltage to the semiconductor elements, and the like. Many commercially available power converters for motor driving have the function of compensating output voltage errors, but it is difficult to compensate output voltage errors when the current flowing through the power converter is close to zero. Therefore, relatively inexpensive power converters for motor driving usually cause some degree of output voltage error.

Figure 13:
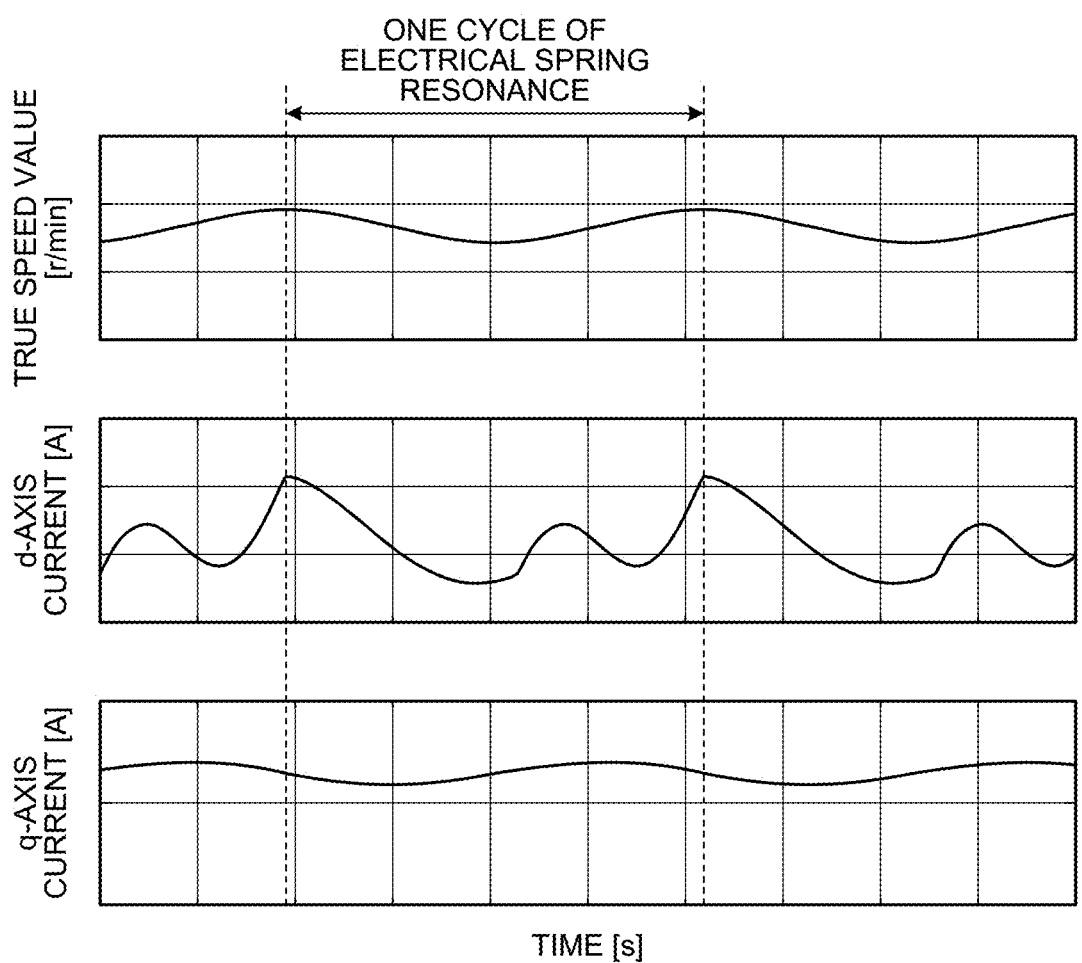
FIG. 13 is a diagram illustrating the true speed value (true value of the rotational speed), d-axis current, and q-axis current of the sub-side synchronous motor in the case that the two synchronous motors are driven in parallel in the low-speed range, with the output voltage error of the power converter virtually set to zero, in the drive device according to the first embodiment.
Figure 14:
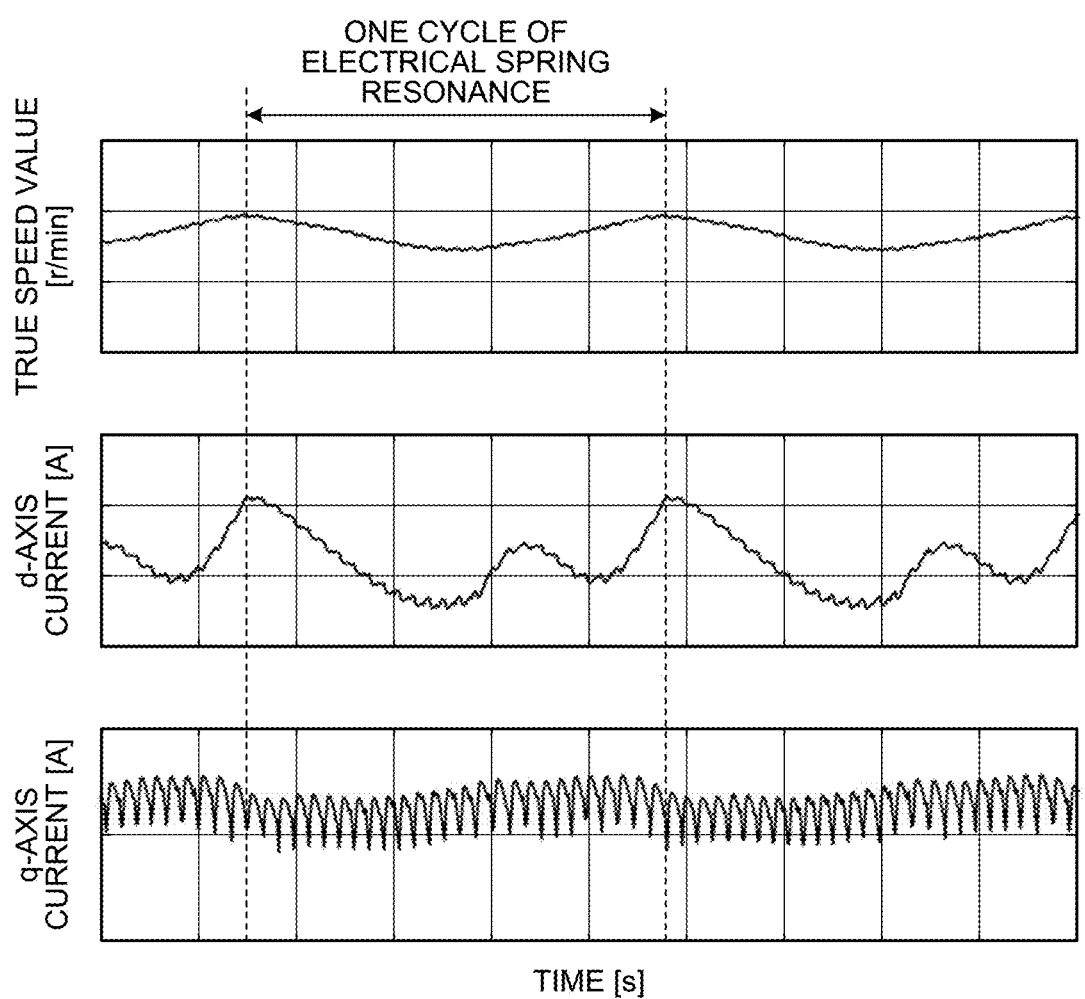
FIG. 14 is a diagram illustrating the true speed value (true value of the rotational speed), d-axis current, and q-axis current of the sub-side synchronous motor in the case that the two synchronous motors are driven in parallel in the low-speed range, with an output voltage error equivalent to that of an actual machine, in the drive device according to the first embodiment.

FIG. 13 is a diagram illustrating the true speed value (true value of the rotational speed), d-axis current, and q-axis current of the sub-side synchronous motor in the case that the two synchronous motors are driven in parallel in the low-speed range, with the output voltage error of the power converter virtually set to zero, in the drive device according to the first embodiment. FIG. 14 is a diagram illustrating the true speed value (true value of the rotational speed), d-axis current, and q-axis current of the sub-side synchronous motor in the case that the two synchronous motors are driven in parallel in the low-speed range, with an output voltage error equivalent to that of an actual machine, in the drive device according to the first embodiment. FIGS. 13 and 14 depict the true value of the rotational speed, the d-axis current, and the q-axis current in order from the top. Each horizontal axis represents time.

Note that these operating conditions are very stringent for the control method disclosed in Patent Literature 1: if the operating conditions are given to the control method disclosed in Patent Literature 1, the sub-side synchronous motor 1b becomes unstable, making parallel driving difficult. The above operating conditions are that the two synchronous motors are driven in parallel in the low-speed range, and that the angular difference λ between the magnetic pole positions of the two synchronous motors is close to zero. FIGS. 13 and 14 depict analysis results under the conditions that the difference in load torque between the two synchronous motors is extremely small and that the angular difference λ between the magnetic pole positions of the two synchronous motors is close to zero. With the magnetic flux current compensation method, in which the torque of the sub-side synchronous motor 1b is changed using the angular difference λ between the two synchronous motors, it is difficult to completely make the speed ripple of the sub-side synchronous motor 1b zero when the angular difference λ is close to zero. Therefore, as illustrated in the first row from the top in FIGS. 13 and 14, the true value of the rotational speed oscillates at the electrical spring resonance angular frequency. The rotational speed reaches the maximum in every cycle of the electrical spring resonance angular frequency. In addition, as illustrated in the third row from the top in FIGS. 13 and 14, the q-axis current of the sub-side synchronous motor 1b oscillates at the electrical spring resonance angular frequency. Although the details of the method for determining the magnetic flux current command $i_d^*$ will be described later, regarding the d-axis current that is applied for stably driving the sub-side synchronous motor 1b, the compensation direction for the d-axis current needs to be changed depending on whether the angular difference λ between the two synchronous motors is positive or negative as described above. Therefore, the d-axis current has a waveform that reaches the maximum in every cycle of the electrical spring resonance angular frequency as illustrated in the second row from the top in FIGS. 13 and 14. As described above, due to the influence of sign changes in the angular difference λ, the d-axis current includes pulsations with the frequency component of integral multiples of the electrical spring resonance angular frequency. Note that in the presence of errors in the output voltage of the power converter 2, a pulsation component of six times the electrical angular frequency is superimposed on the dq-axis currents. Except for this, there is no significant difference between the waveforms of the true value of the rotational speed, the d-axis current, and the q-axis current illustrated in FIG. 13 and the waveforms of the true value of the rotational speed, the d-axis current, and the q-axis current illustrated in FIG. 14.

Figure 15:
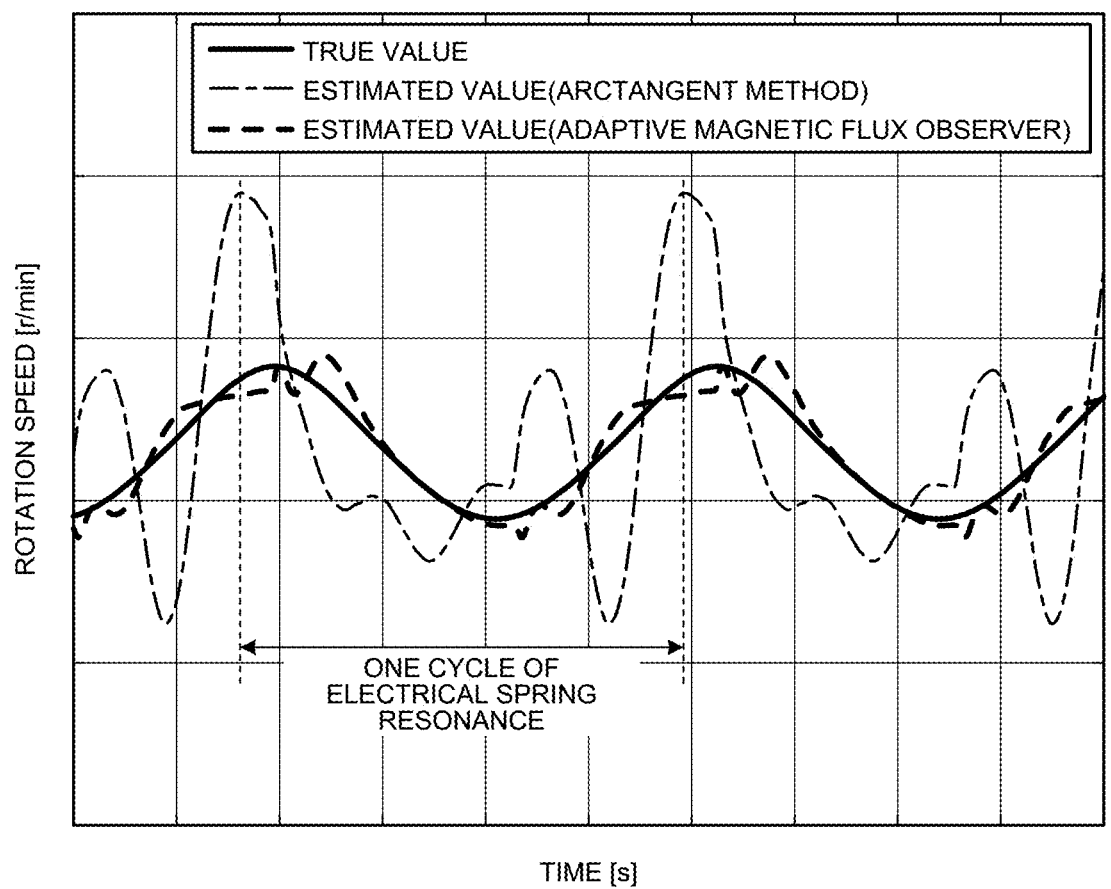
FIG. 15 is a diagram illustrating estimated speed waveforms in the case that the two synchronous motors are driven in parallel in the low-speed range, with the output voltage error of the power converter virtually set to zero, in the drive device according to the first embodiment.

FIG. 15 is a diagram illustrating estimated speed waveforms in the case that the two synchronous motors are driven in parallel in the low-speed range, with the output voltage error of the power converter virtually set to zero, in the drive device according to the first embodiment. In FIG. 15, the true value of the rotation speed is indicated by a solid line, the estimated value of the rotation speed with the arctangent method is indicated by a one-dot chain line, and the estimated value of the rotation speed with the adaptive magnetic flux observer is indicated by a broken line. The horizontal axis represents time. The vertical axis represents the rotation speed of the rotor of the sub-side synchronous motor 1b.

When the two synchronous motors are driven in parallel in the low-speed range with an output voltage error equivalent to that of an actual machine, transient speed estimation errors occur with changes in magnetic flux current. As can be seen from FIG. 15, the speed estimation errors due to the adaptive magnetic flux observer are smaller than those due to the arctangent method, but both methods produce speed estimation errors.

Figure 16:
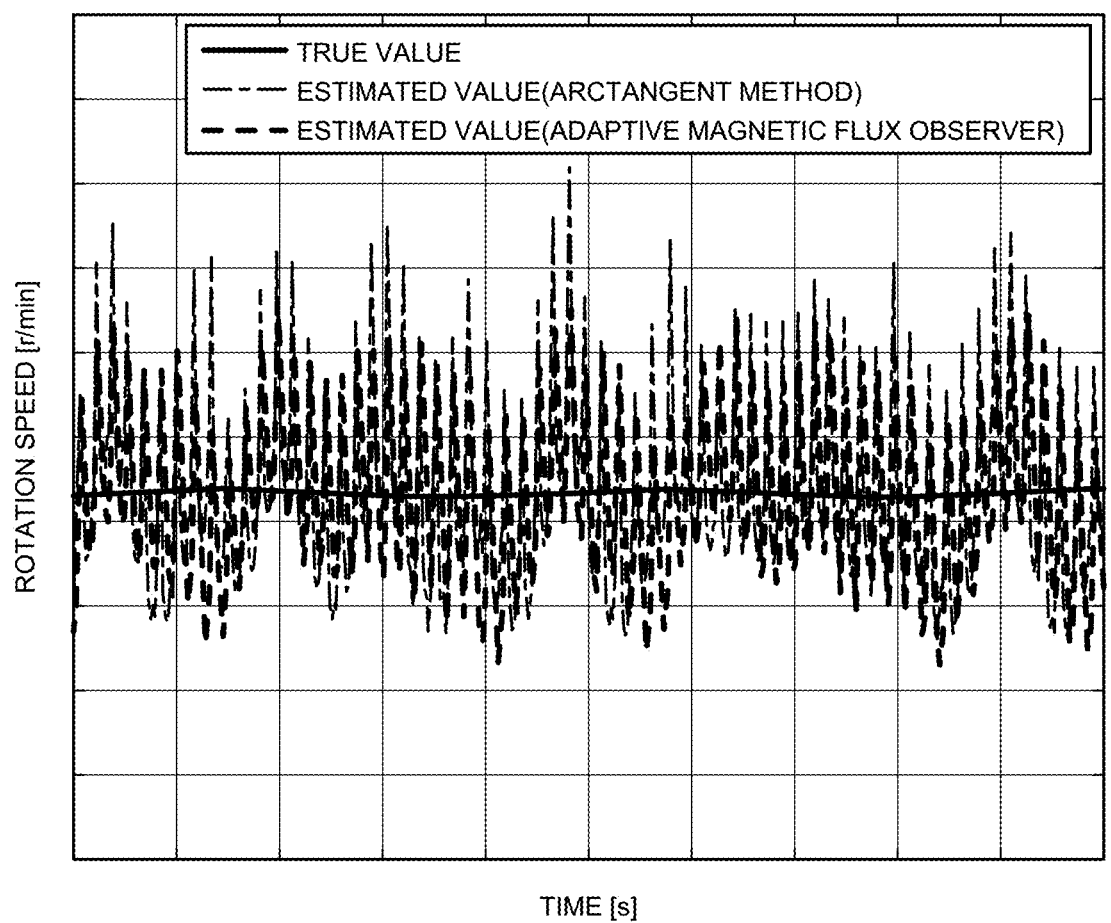
FIG. 16 is a diagram illustrating estimated speed waveforms in the case that the two synchronous motors are driven in parallel in the low-speed range, with an output voltage error equivalent to that of an actual machine, in the drive device according to the first embodiment.

FIG. 16 is a diagram illustrating estimated speed waveforms in the case that the two synchronous motors are driven in parallel in the low-speed range, with an output voltage error equivalent to that of an actual machine, in the drive device according to the first embodiment. In FIG. 16, as in FIG. 15, the true value of the rotation speed is indicated by a solid line, the estimated value of the rotation speed with the arctangent method is indicated by a one-dot chain line, and the estimated value of the rotation speed with the adaptive magnetic flux observer is indicated by a broken line. The horizontal axis represents time. The vertical axis represents the rotation speed of the rotor of the sub-side synchronous motor 1b.

Some fluid utilization devices that use a general drive device are configured to have a carrier frequency of 10 kHz or more in order to reduce electromagnetic noise. Such fluid utilization devices tend to have large output voltage errors. A comparison between FIGS. 15 and 16 shows that the signal to noise (S/N) ratio of the estimated speed waveforms is significantly deteriorated in FIG. 16. This tendency is seen in both speed estimation errors due to the arctangent method and the adaptive magnetic flux observer.

Figure 17:
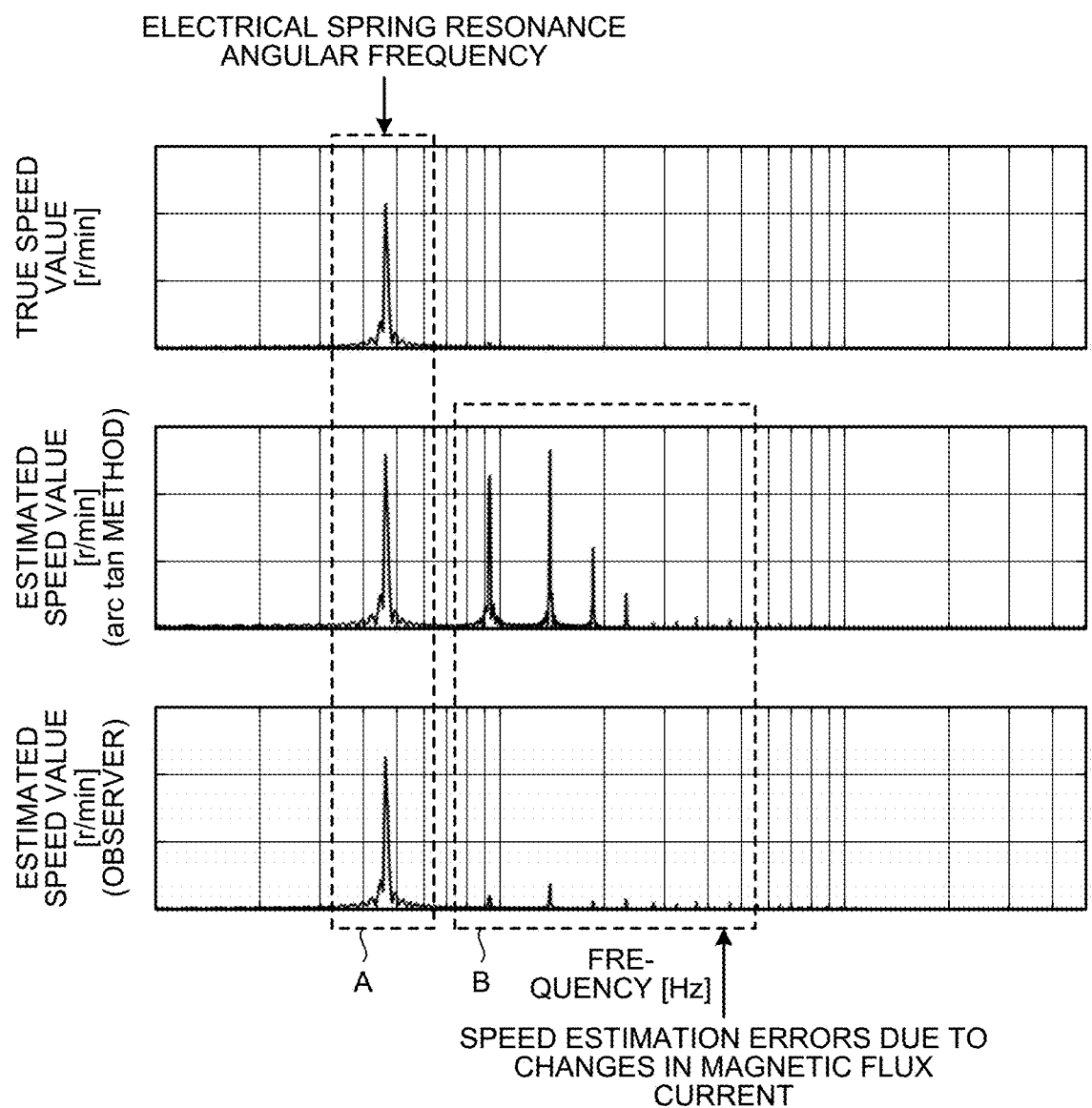
FIG. 17 is a diagram illustrating the results of fast Fourier transform (FFT) analysis of the estimated speed waveforms in FIG. 15.

FIG. 17 is a diagram illustrating the results of FFT analysis of the estimated speed waveforms in FIG. 15. FIG. 17 depicts, in order from the top, the true speed value, namely the true value of the rotational speed, the estimated speed value with the arctangent method, and the estimated speed value with the adaptive magnetic flux observer. Each horizontal axis represents frequency. It can be seen from FIG. 17 that speed estimation errors of the order of integral multiples of the electrical spring resonance angular frequency occur as indicated in the dotted frame B. The frequency of these speed estimation errors matches the frequency of the pulsation component of the magnetic flux current which is the d-axis current illustrated in FIG. 13. In addition, as indicated in the dotted frame A, the primary component of the electrical spring resonance angular frequency also has amplitude errors between the true value and the estimated values.

Figure 18:
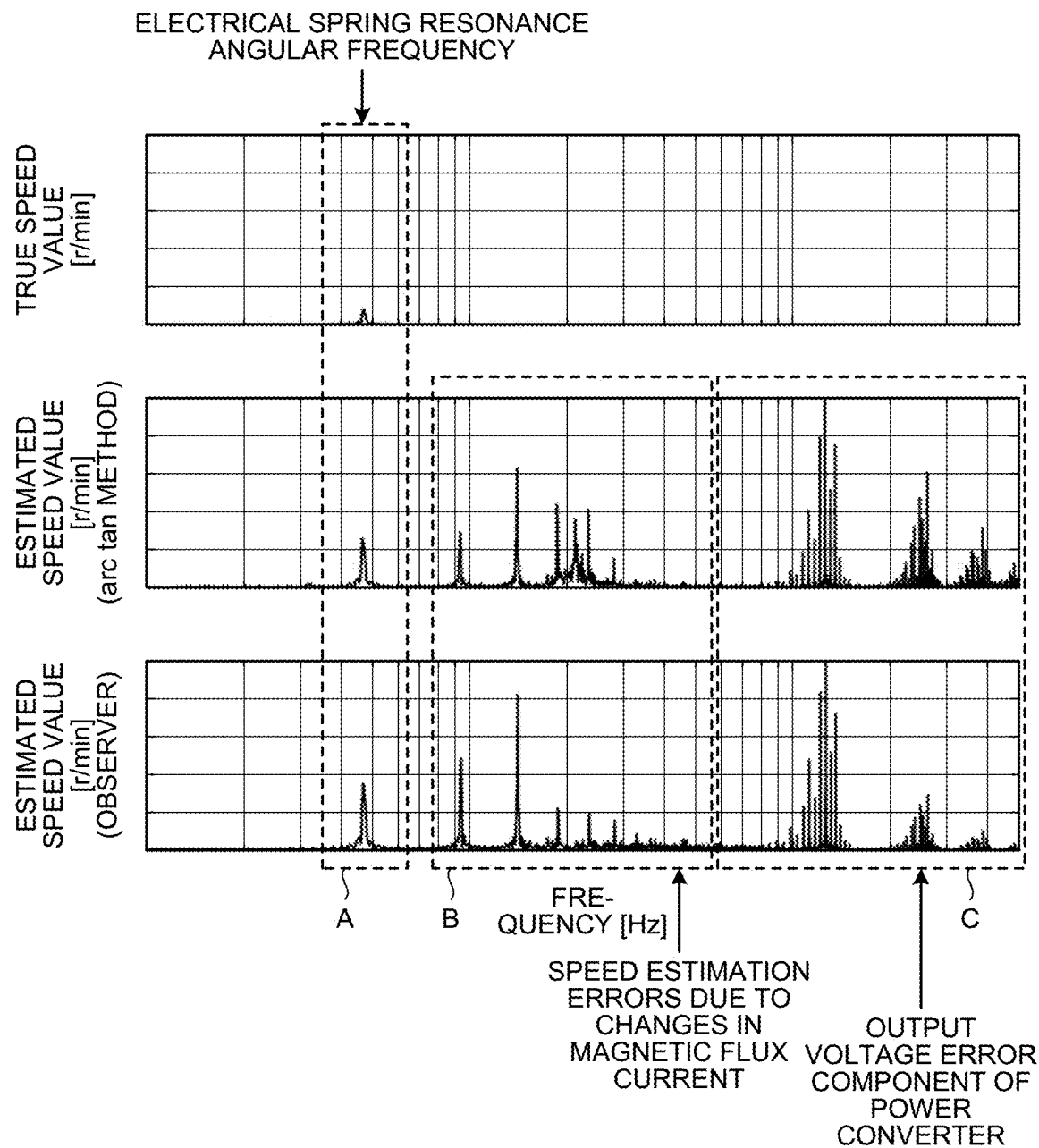
FIG. 18 is a diagram illustrating the results of FFT analysis of the estimated speed waveforms in FIG. 16.

FIG. 18 is a diagram illustrating the results of FFT analysis of the estimated speed waveforms in FIG. 16. As in the case of FIG. 17, FIG. 18 depicts, in order from the top, the true speed value, namely the true value of the rotational speed, the estimated speed value with the arctangent method, and the estimated speed value with the adaptive magnetic flux observer. Each horizontal axis represents frequency. It can be seen from FIG. 18 that the primary component of the electrical spring resonance angular frequency has errors of several times as indicated in the dotted frame A. It can also be seen that extremely large peaks appear on the order of integral multiples of the electrical spring resonance angular frequency as indicated in the dotted frame B. It can further be seen that peaks appear on the high-frequency side due to the output voltage error component of the power converter 2 as indicated in the dotted frame C.

The analysis results illustrated in FIGS. 17 and 18 indicate that a change in magnetic flux current is a disturbance for existing speed estimators. In addition, in the case illustrated in FIG. 17 that there is no output voltage error in the power converter 2, speed estimation errors occur at the same frequency as the pulsation frequency of the magnetic flux current as indicated in the dotted frame B, so that speed estimation cannot be appropriately performed. In addition, the speed estimation errors of the frequency component indicated in the dotted frame B of FIG. 17 may increase to several times to several tens times in the case illustrated in FIG. 18 that there is an output voltage error in the power converter 2, which is a major problem for the drive device. In Patent Literature 1, the magnetic flux current command is computed using the speed difference between the two synchronous motors so that the sub-side synchronous motor 1b is stably driven. However, in the presence of speed estimation errors that are indicated in the dotted frame B of FIG. 17, the sub-side synchronous motor 1b cannot be stabilized. The reasons are as follows.

First, making the magnetic flux current command pulsate in order to stably drive the sub-side synchronous motor 1b causes an unexpected error component in speed estimation. Then, making the magnetic flux current command pulsate at the frequency of the error component of the speed pulsation in order to suppress the error component excites the sub-side synchronous motor 1b, increasing the vibration of the sub-side synchronous motor 1b. Due to the increased vibration of the sub-side synchronous motor 1b, the magnetic flux current command for the main-side synchronous motor 1a needs to be changed more significantly for stably driving the sub-side synchronous motor 1b. This causes a vicious cycle of further increase in speed estimation error. As a result, various phenomena occur in the synchronous motor, such as an increase in noise and vibration and a decrease in motor efficiency. In addition, there is a possibility that the synchronous motor fails to generate appropriate torque and thus falls out of step or stops operating.

In particular, the phenomenon of unstable rotation in the low-speed range is remarkable when the technique disclosed in Patent Literature 1 is used for a fluid utilization device. A typical load of the fluid utilization device is a quadratic torque load, which has load characteristics of light load on the low-rotation side. The quadratic torque load is characterized in that the load torque increases in proportion to the square of the rotational speed of the motor.

Therefore, in the fluid utilization device, the torque current decreases on the low-rotation side, but the compensation accuracy for output voltage errors in the power converter 2 decreases in a region where the current is small. Furthermore, in the fluid utilization device, because the speed electromotive force of the motor decreases in the low-rotation range, the influence of output voltage errors becomes relatively large. Consequently, the above-described speed estimation errors increase to such an extent that the speed difference between the two synchronous motors can no longer be accurately obtained, resulting in unstable control. The inventors of the present application performed various types of filtering processing on speed difference signals including many speed estimation errors in an attempt to improve the stability, which yielded no satisfactory performance.

It is generally known that speed estimation errors occur on the low-frequency side due to output voltage errors, but it has been found by the inventors of the present application and is not yet known that speed estimation errors occur by changing the magnetic flux current. This is because usual changes in the magnetic flux current command are so gradual that such a problem does not occur. However, in the drive device, it is necessary to rapidly fluctuate the magnetic flux current when the angular difference λ is close to zero. Through careful observation of such cases, the inventors of the present application have found that speed estimation errors occur by changing the magnetic flux current. Then, considering that it is necessary to establish a method of eliminating the influence of transient speed estimation errors in order to stably drive the two synchronous motors in parallel in the presence of such speed estimation errors, the inventors of the present application have devised a method in which the magnetic flux current command $i_d^*$ is computed from the pulsation component of the torque current of the sub-side synchronous motor 1b. As a result of investigation by the inventors of the present application, it has been found that determining the magnetic flux current command $i_d^*$ from the pulsation component of the sub-side torque current improves the S/N ratio of the magnetic flux current command $i_d^*$ significantly as compared with the method disclosed in Patent Literature 1. The reasons are as follows.

As mentioned above, estimated speed signals include many error components due to changes in magnetic flux current. As a means for avoiding this influence, we focus on estimated magnetic pole position signals. The calculation process for an estimated magnetic pole position signal involves integration which removes the high-frequency component of the errors included in the estimated speed. In the low-frequency component of the estimated magnetic pole position signal, an error signal due to a change in the magnetic flux current command $i_d^*$ remains, but this error is only about several degrees.

Now we consider the torque current of the sub-side synchronous motor 1b. Comparing the case where phase currents undergo coordinate transformation with the true value of the magnetic pole position and the case where phase currents undergo coordinate transformation with an estimated value of the magnetic pole position, if the error in the magnetic pole position is about several degrees, the error between the torque current on the true dq-axes and the torque current on the estimated dq-axes is less than a few percent. This is obvious, considering that the cosine function can be approximated to one in the vicinity of zero.

Thus, the torque current of the sub-side synchronous motor 1b can be obtained with relatively high accuracy even when the magnetic flux current is changed. Although steady position estimation errors can occur due to the influence of fluctuations in motor constants, these are estimation errors associated with the direct current and thus pose no problem for the extraction of the pulsation component by the pulsation component extraction unit 7.

There is another reason why it is better to perform stabilization compensation using the sub-side torque current, instead of the speed difference. Fluid utilization devices such as fans and blowers can have a large moment of inertia in the mechanical system. In such a case, even when torque pulsations are so large that the power converter 2 as an inverter stops due to overcurrent, the pulsation component appearing in the speed signal may be very small. In this case, it is better to perform stabilization compensation at a stage when pulsations in the torque current have increased to some extent than to perform stabilization after speed pulsations have become large enough to be observed. In such a case, the torque current signal has a better S/N ratio than the estimated speed signal, suggesting that it is better to use the torque current signal for stabilization compensation.

For the above reasons, in the first embodiment, the magnetic flux current command $i_d^*$ is determined by the magnetic flux current command determination unit 9 based on the pulsation component of the torque current flowing through the sub-side synchronous motor 1b.

Figure 19:
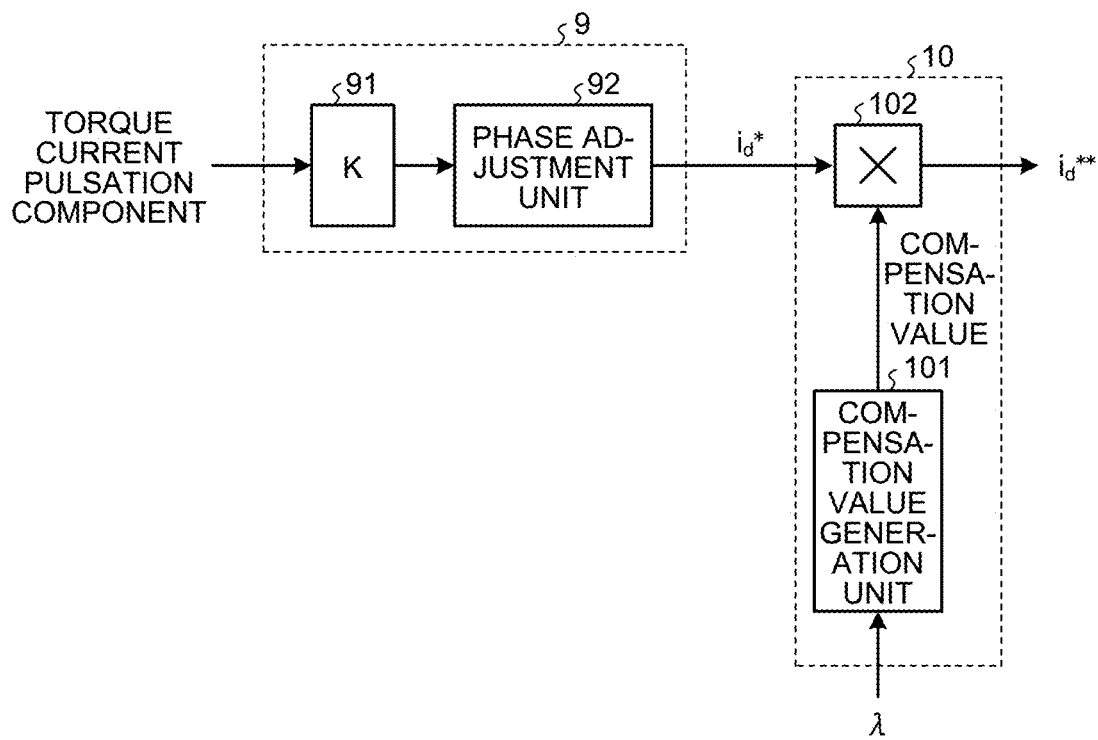
FIG. 19 is a diagram illustrating an exemplary configuration of the magnetic flux current command determination unit and the magnetic flux current command compensation unit illustrated in FIG. 1.
Figure 20:
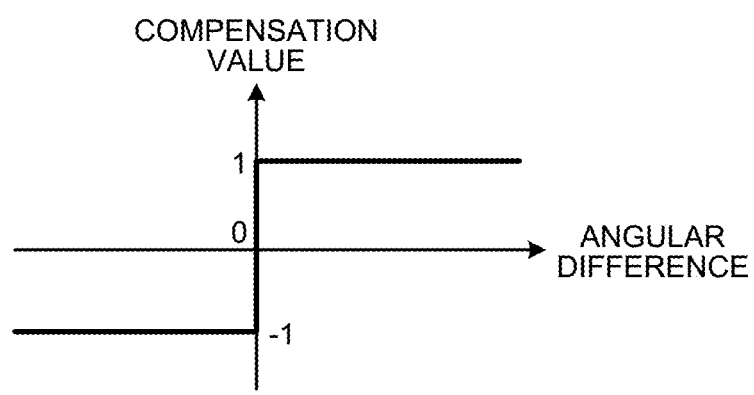
FIG. 20 is a first diagram for explaining processing by the magnetic flux current command compensation unit illustrated in FIG. 19.
Figure 21:
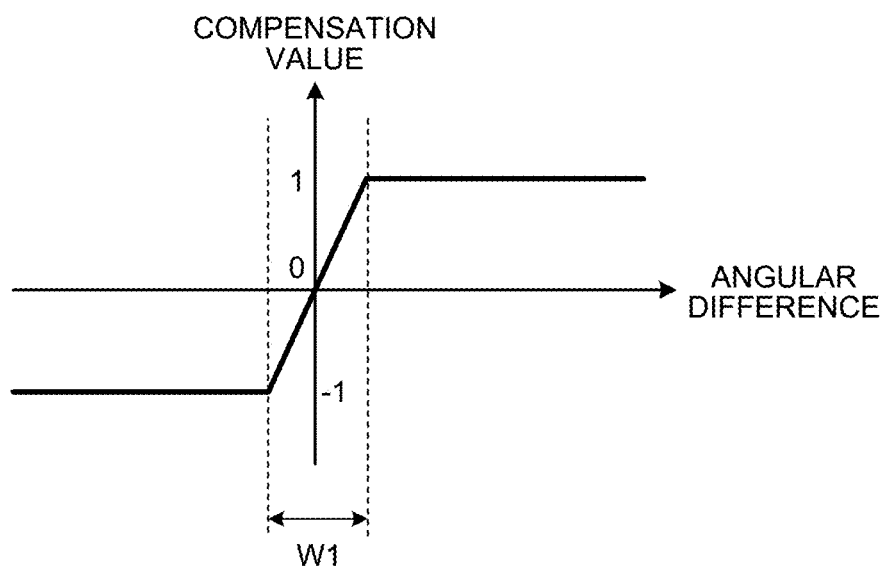
FIG. 21 is a second diagram for explaining processing by the magnetic flux current command compensation unit illustrated in FIG. 19.
Figure 22:
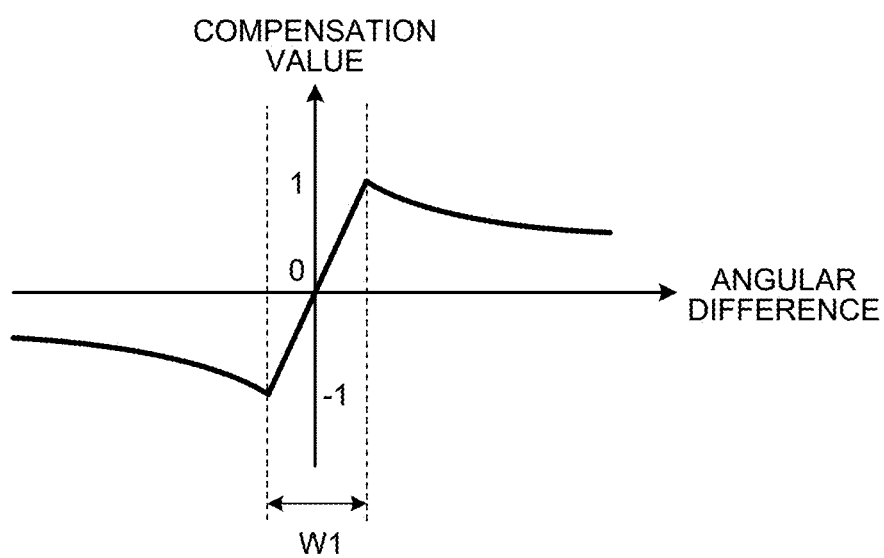
FIG. 22 is a third diagram for explaining processing by the magnetic flux current command compensation unit illustrated in FIG. 19.
Figure 23:
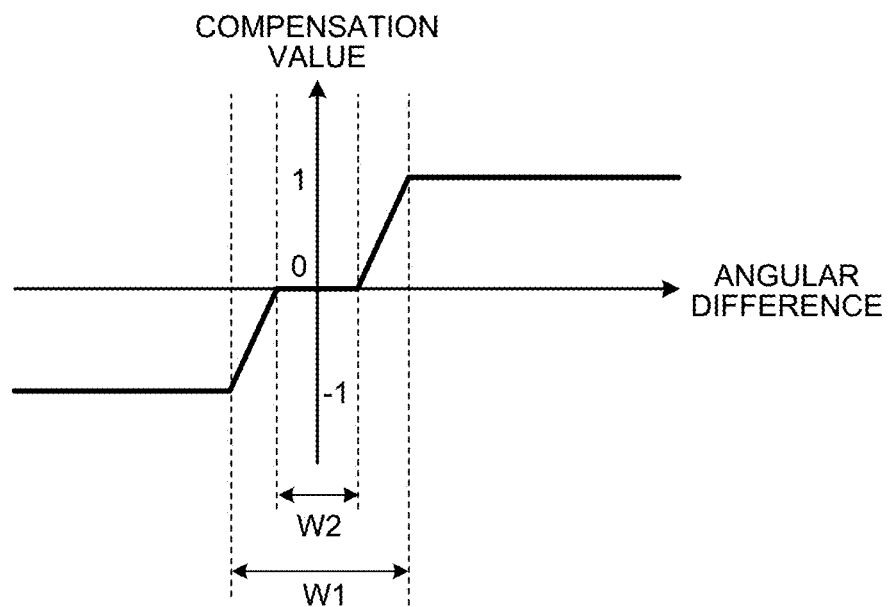
FIG. 23 is a fourth diagram for explaining processing by the magnetic flux current command compensation unit illustrated in FIG. 19.
Figure 24:
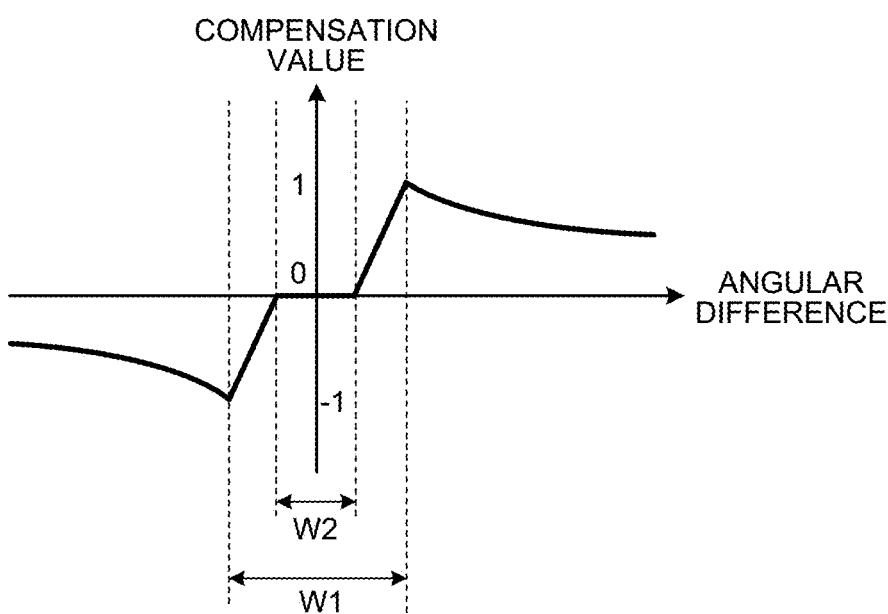
FIG. 24 is a fifth diagram for explaining processing by the magnetic flux current command compensation unit illustrated in FIG. 19.

FIG. 19 is a diagram illustrating an exemplary configuration of the magnetic flux current command determination unit and the magnetic flux current command compensation unit illustrated in FIG. 1. FIG. 20 is a first diagram for explaining processing by the magnetic flux current command compensation unit illustrated in FIG. 19. FIG. 21 is a second diagram for explaining processing by the magnetic flux current command compensation unit illustrated in FIG. 19. FIG. 22 is a third diagram for explaining processing by the magnetic flux current command compensation unit illustrated in FIG. 19. FIG. 23 is a fourth diagram for explaining processing by the magnetic flux current command compensation unit illustrated in FIG. 19. FIG. 24 is a fifth diagram for explaining processing by the magnetic flux current command compensation unit illustrated in FIG. 19.

The magnetic flux current command determination unit 9 illustrated in FIG. 19 includes a gain multiplication unit 91 and a phase adjustment unit 92. The magnetic flux current command determination unit 9 receives input of the pulsation component of the torque current of the sub-side synchronous motor 1b, and determines the magnetic flux current command $i_d^*$ using the gain multiplication unit 91 and the phase adjustment unit 92.

The gain multiplication unit 91 adjusts the gain of the torque current pulsation component which is an input signal. The phase adjustment unit 92 adjusts the phase of the torque current pulsation component which is an input signal, and outputs the amplitude-adjusted pulsation component. Note that the magnetic flux current command determination unit 9 need not necessarily include both the gain multiplication unit 91 and the phase adjustment unit 92 as long as the stability of the system can be secured with either the gain multiplication unit 91 or the phase adjustment unit 92.

The gain multiplication unit 91 multiplies the torque current pulsation component which is an input signal by a specific gain for output, and has the role of adjusting the stability and responsiveness of the system. The gain may be changed according to the operating conditions. For example, the gain may be increased in the low-speed range, and the gain may be reduced in the high-speed range. The phase adjustment unit 92 includes, for example, a phase delay compensator, a low-pass filter, an integration controller, or the like. Phase delay compensators are commonly used in the industry for the purpose of achieving stabilization by reducing the gain by a certain amount in the high-frequency range. Low-pass filters and integration controllers also have the property of changing the signal phase in the high-frequency range; therefore, a low-pass filter or an integration controller can be used like a phase delay compensator.

In a case where an approximate integrator with a first-order low-pass filter is used as the phase adjustment unit 92, its cutoff angular frequency is preferably set to ⅓ or less of the electrical spring resonance angular frequency. If possible, ¹⁄₁₀ to ¹⁄₂₀ of the electrical spring resonance angular frequency is more preferable. This setting enables the phase to be delayed by about 90 degrees near the electrical spring resonance angular frequency, which enhances the control stability.

Although not illustrated in FIG. 19, a dead zone may be provided in either the input or output of the magnetic flux current command determination unit 9. This dead zone is useful for removing frequency components other than the electrical spring resonance that cannot be removed by the pulsation component extraction unit 7 described above.

The magnetic flux current command compensation unit 10 illustrated in FIG. 19 includes a compensation value generation unit 101 and a multiplier 102. The magnetic flux current command compensation unit 10 performs magnetic flux current compensation according to the operation principles described with reference to FIGS. 5 to 11. Specifically, the magnetic flux current command compensation unit 10 determines a compensation value for adjusting the compensation amount and compensation direction for the magnetic flux current command $i_d^*$ from the angular difference λ, which is the difference between the magnetic pole position of the main-side synchronous motor 1a and the magnetic pole position of the sub-side synchronous motor 1b. The sign of the compensation value indicates the compensation direction for the magnetic flux current command $i_d^*$, and the absolute value of the compensation value indicates the compensation amount for the magnetic flux current command $i_d^*$. The magnetic flux current command compensation unit 10 adjusts the magnetic flux current command $i_d^*$ with the determined compensation value and outputs the magnetic flux current command $i_d^{}$. The magnetic flux current command $i_d^{}$ is the magnetic flux current command $i_d^*$ adjusted by the magnetic flux current command compensation unit 10. The compensation value generation unit 101 generates a compensation value for adjusting the absolute value of the magnetic flux current command $i_d^*$ based on the angular difference λ. For example, the compensation value generation unit 101 outputs a compensation value that reduces the absolute value of the magnetic flux current command $i_d^*$ when the angular difference λ input is within a predetermined range. The horizontal axis in FIGS. 20 to 24 represents the angular difference λ that is input to the compensation value generation unit 101. The angular difference λ has a positive or negative value as illustrated in FIG. 11. In FIGS. 20 to 24, the vertical axis represents the compensation value that is output from the compensation value generation unit 101.

The method illustrated in FIG. 20 is to output "1" as a compensation value in response to the angular difference λ indicating positive, and output "−1" as a compensation value in response to the angular difference λ indicating negative. In the method illustrated in FIG. 20, if an error occurs in the angular difference λ in the vicinity of zero, the compensation value that should be "1" may actually be set to "−1", and vice versa. That is, if an error occurs in the angular difference λ in the vicinity of zero, the magnetic flux current command $i_d^*$ may be adjusted in a wrong compensation direction with the constant compensation amount. In this case, due to the constant compensation amount for the magnetic flux current command $i_d^*$, the influence of the compensated magnetic flux current command $i_d^*$ on the magnetic flux current is large. To avoid this, as illustrated in FIG. 21, for the angular difference λ within a compensation range W1 that is a preset range in the vicinity of zero, the compensation value generation unit 101 outputs a compensation value such that the absolute value of the magnetic flux current command $i_d^*$ gradually changes with respect to changes in the angular difference λ. Specifically, in the case where the angular difference λ is within the compensation range W1 and the angular difference λ changes from positive to negative, the compensation value generation unit 101 gradually switches the compensation value from "1" to "−1" for output. In addition, in the case where the angular difference λ is within the compensation range W1 and the angular difference λ changes from negative to positive, the compensation value generation unit 101 gradually switches the compensation value from "−1" to "1" for output. Note that in the compensation range W1, the compensation value and the angular difference λ may be in a proportional relationship, or the compensation value and the angular difference λ may be in another relationship of compensation. When the angular difference λ is small, the effect of stabilization by the magnetic flux current is small. Therefore, by reducing the absolute value of the magnetic flux current command $i_d^*$ and reducing the magnetic flux current when the angular difference λ is small, it is possible to more efficiently drive the synchronous motors while ensuring the operation stability in the low-speed range.

In addition, under the condition that the angular difference λ is large, the influence of the amount of change in the magnetic flux current of the main-side synchronous motor 1a on the amount of change in the torque of the sub-side synchronous motor 1b is larger than under the condition that the angular difference λ is small. Therefore, as illustrated in FIG. 22, the compensation value generation unit 101 may gradually reduce the compensation value for output as the absolute value of the angular difference λ increases in the regions where the absolute value of the angular difference λ is large.

The above-described error in the angular difference λ is caused by the difference between a constant in the drive device 100 set as a characteristic of the synchronous motors and an actual characteristic of the synchronous motors. The error in the angular difference λ is caused by, for example, an error in magnetic pole position estimation or an error in speed estimation in the magnetic pole position identification units 5a and 5b. The error in magnetic pole position estimation or the error in speed estimation is caused by an error due to manufacturing variations in the resistance value, inductance, or induced voltage constant of the synchronous motors. The resistance value is exemplified by the value of the armature resistance $R_a$ described above, and the inductance is exemplified by the d-axis inductance $L_d$ or the q-axis inductance $L_q$ described above. The error in the resistance value, inductance, or induced voltage constant of the synchronous motors is also caused by a temperature change in the synchronous motors due to the driving conditions of the synchronous motors or a change in air temperature. In addition, the error in magnetic pole position estimation or the error in speed estimation is also caused by an error in current detection by the current detection unit 4a or the current detection unit 4b. Moreover, in a case where the current detection unit 4a or the current detection unit 4b is configured to detect the bus voltage of the power converter 2, the error in magnetic pole position estimation or the error in speed estimation is caused by an error in bus voltage detection by the current detection unit 4a or the current detection unit 4b.

Figure 25:
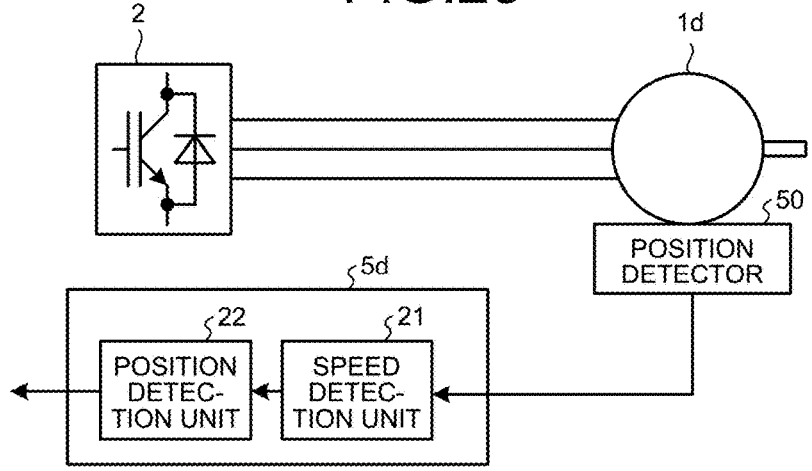
FIG. 25 is a diagram illustrating another exemplary configuration of the magnetic pole position identification unit according to the first embodiment.

In the example illustrated in FIG. 1, the magnetic pole position identification units 5a and 5b respectively include the magnetic pole position estimation units 60a and 60b that estimate the magnetic pole position, but may be configured to identify the magnetic pole position by detecting the magnetic pole position. FIG. 25 is a diagram illustrating another exemplary configuration of the magnetic pole position identification unit according to the first embodiment. The magnetic pole position identification unit 5d illustrated in FIG. 25 is the magnetic pole position identification unit 5a or 5b illustrated in FIG. 1 that is configured by a speed detector and a position detector. A synchronous motor 1d illustrated in FIG. 25 corresponds to each of the main-side synchronous motor 1a and the sub-side synchronous motor 1b illustrated in FIG. 1. The magnetic pole position identification unit 5d includes a speed detection unit 21 that detects the rotational speed of the synchronous motor 1d based on a motor position detection signal output from a position detector 50, and a position detection unit 22 that detects the magnetic pole position of the synchronous motor 1d based on the detection result from the speed detection unit 21. The speed detection unit 21 calculates the angular velocity $\omega_e$ based on the motor position detection signal, and the position detection unit 22 computes the detected magnetic pole position $\theta_e$ representing the magnetic pole position of the synchronous motor 1d as an electrical angle by integrating the angular velocity $\theta_e$, and outputs the detected magnetic pole position $\theta_e$ computed. The position detector 50 is exemplified by a rotary encoder, and is attached to the synchronous motor 1d. Even when the magnetic pole position identification units 5a and 5b are the magnetic pole position identification unit 5d illustrated in FIG. 25, a speed detection error in the speed detection unit 21 or a magnetic pole position detection error in the position detection unit 22 may occur. The magnetic pole position detection error or the speed detection error also occurs due to a detection error in the position detector 50. Therefore, the angular difference λ that is obtained using the magnetic pole position identified by the magnetic pole position identification unit 5d may have an error.

In the presence of an error in the angular difference λ, the determination of the compensation direction for the magnetic flux current command $i_d^*$ illustrated in FIG. 20, which depends on whether the angular difference λ is positive or negative, can result in the compensation direction for the magnetic flux current command $i_d^*$ being adjusted to a wrong direction. Once the compensation direction for the magnetic flux current command $i_d^*$ is adjusted to a wrong direction with the method illustrated in FIG. 20, the torque of the sub-side synchronous motor 1b is compensated in the direction that increases the angular difference λ between the magnetic pole position of the main-side synchronous motor 1a and the magnetic pole position of the sub-side synchronous motor 1b. Therefore, in the worst case, the sub-side synchronous motor 1b falls out of step.

To avoid this, the magnetic flux current command compensation unit 10 includes the compensation value generation unit 101, which outputs a compensation value that reduces the absolute value of the magnetic flux current command $i_d^*$ based on the input angular difference λ as described above, so as to compensate the error in the compensation direction for the magnetic flux current command $i_d^*$. Consequently, even when the compensation direction for the magnetic flux current command $i_d^*$ is adjusted to a wrong direction, it is possible to prevent an increase in the angular difference λ and to prevent unstable rotation in the low-speed range. In the above example, the compensation value generation unit 101 outputs smaller compensation values as the absolute value of the angular difference λ decreases, and sets the compensation value to zero when the angular difference λ is zero. Alternatively, as illustrated in FIGS. 23 and 24, the compensation value can be set to zero in the case where the angular difference λ is within a compensation range W2 in the compensation range W1. In this manner, by setting the compensation value to zero for the angular difference λ within a predetermined range, it is possible to prevent the torque of the sub-side synchronous motor 1b from being compensated in a wrong direction and to prevent the sub-side synchronous motor 1b from falling out of step when the angular difference λ is within the predetermined range.

The larger the compensation ranges W1 and W2, the more significant the effect of reducing the influence of errors in the compensation direction for the magnetic flux current command $i_d^*$ due to errors in the angular difference λ or preventing errors in the compensation direction for the magnetic flux current command $i_d^*$ due to errors in the angular difference N. In some cases, however, the predetermined compensation range W1 may be too large to give sufficient torque compensation to the sub-side synchronous motor 1b, which may even cause the sub-side synchronous motor 1b to fall out of step. In addition, if the compensation range W2 in which the compensation value generation unit 101 outputs zero is too large, the speed pulsation of the sub-side synchronous motor 1b increases, resulting in an increase in noise from the synchronous motor or noise of the fluid utilization device. Therefore, the compensation ranges W1 and W2 are determined based on at least one of an error in identifying the magnetic pole positions by the magnetic pole position identification units 5a and 5b, an error in detecting the currents by the current detection units 4a and 4b, a torque compensation amount required for stably driving the sub-side synchronous motor 1b, noise of the synchronous motors, and noise of a device such as a fluid utilization device including the synchronous motors. The error in identifying the magnetic pole positions by the magnetic pole position identification units 5a and 5b includes at least one of an error in magnetic pole position estimation, an error in magnetic pole position detection, an error in speed estimation, and an error in speed detection.

In addition, the error in identifying the magnetic pole positions by the magnetic pole position identification units 5a and 5b, the error in detecting the currents by the current detection units 4a and 4b, the noise of the synchronous motors, the noise of the fluid utilization device, and the like vary with changes in the resistance value, inductance, or induced voltage constant of the synchronous motors due to the driving conditions of the synchronous motors or changes in air temperature. Therefore, the compensation range W2 in which the output value is set to zero may be dynamically changed while the synchronous motors are being driven. For example, the compensation value generation unit 101 can dynamically change the compensation range W2 based on the driving conditions of the synchronous motors or the air temperature. The compensation value generation unit 101 can also dynamically change the compensation range W1 based on the driving conditions of the synchronous motors or the air temperature while the synchronous motors are being driven.

The multiplier 102 multiplies the output from the compensation value generation unit 101 and the output from the magnetic flux current command determination unit 9, and, when the magnetic flux current command $i_d^*$ is within the compensation ranges W1 and W2, reduces the absolute value of the magnetic flux current command $i_d$ to generate the magnetic flux current command $i_d^{}$. The use of the magnetic flux current command $i_d^{}$ generated in this manner achieves the following effects.

As described so far, in the drive device based on position sensorless control, transient speed estimation errors occur with changes in the magnetic flux current command during low-speed driving. As disclosed in Patent Literature 1, the method of stably driving the sub-side synchronous motor 1b using the speed difference is directly affected by speed estimation errors, causing various problems such as unstable control, increase in noise and vibration, and decrease in motor efficiency. Therefore, Patent Literature 1 is disadvantageous in that the lower limit of the rotation speed needs to be higher than that of an existing synchronous motor drive device that drives one synchronous motor with one power converter. Thus, it is difficult to replace the existing synchronous motor drive device with a parallel drive device that uses the technique disclosed in Patent Literature 1.

In contrast, the drive device 100 according to the first embodiment determines the magnetic flux current command $i_d^*$ using the pulsation component of the torque current of the sub-side synchronous motor 1b, and compensates the magnetic flux current command $i_d^*$ using the angular difference λ between the magnetic pole positions of the two synchronous motors to generate the magnetic flux current command $i_d^{}$. Consequently, the S/N ratio of the magnetic flux current command $i_d^{}$ is improved and less affected by speed estimation errors. As a result, problems such as increase in noise and vibration, decrease in motor efficiency, and step-out are solved. In addition, because the stability during low-speed driving is improved, the lower limit of the rotation speed can be maintained at a value equivalent to that of the existing synchronous motor drive device that drives one synchronous motor with one power converter. Consequently, the existing synchronous motor drive device can be easily replaced with the drive device 100 according to the first embodiment. Further, the drive device 100 adjusts the absolute value of the magnetic flux current command $i_d^*$ using the angular difference λ between the magnetic pole positions of the two synchronous motors. Consequently, even in the presence of errors in the angular difference λ, it is possible to prevent unstable rotation in the low-speed range. Moreover, the drive device 100 reduces the absolute value of the magnetic flux current command $i_d^*$ to a predetermined value or a value that depends on the magnetic flux current command $i_d$ when the angular difference λ is within the compensation ranges W1 and W2 that are predetermined ranges. Consequently, it is possible to prevent unstable rotation in the low-speed range while preventing insufficient torque compensation. Note that the predetermined value is zero in the above example, but may be a value other than zero.

Second Embodiment

A second embodiment describes an exemplary configuration in which the magnetic flux current is determined using the pulsation component of the active power consumed by the sub-side synchronous motor 1b. In order to solve problems such as increase in noise and vibration and decrease in motor efficiency, it is necessary to accurately detect the self-oscillation phenomenon of the sub-side synchronous motor 1b due to electrical spring resonance even under the condition that the magnetic flux current significantly changes. One method therefor is to use the pulsation component of the torque current as described in the first embodiment. However, in a case where the moment of inertia of the mechanical system that is the load connected to the main-side synchronous motor 1a and the sub-side synchronous motor 1b is relatively large, the magnetic flux current may be determined using the pulsation component of the active power, instead of the pulsation component of the torque current. As mentioned above, fluid utilization devices such as fans and blowers can have a large moment of inertia in the mechanical system, in which case it is better to observe the pulsation component of the active power rather than to observe the estimated speed signal.

Figure 26:
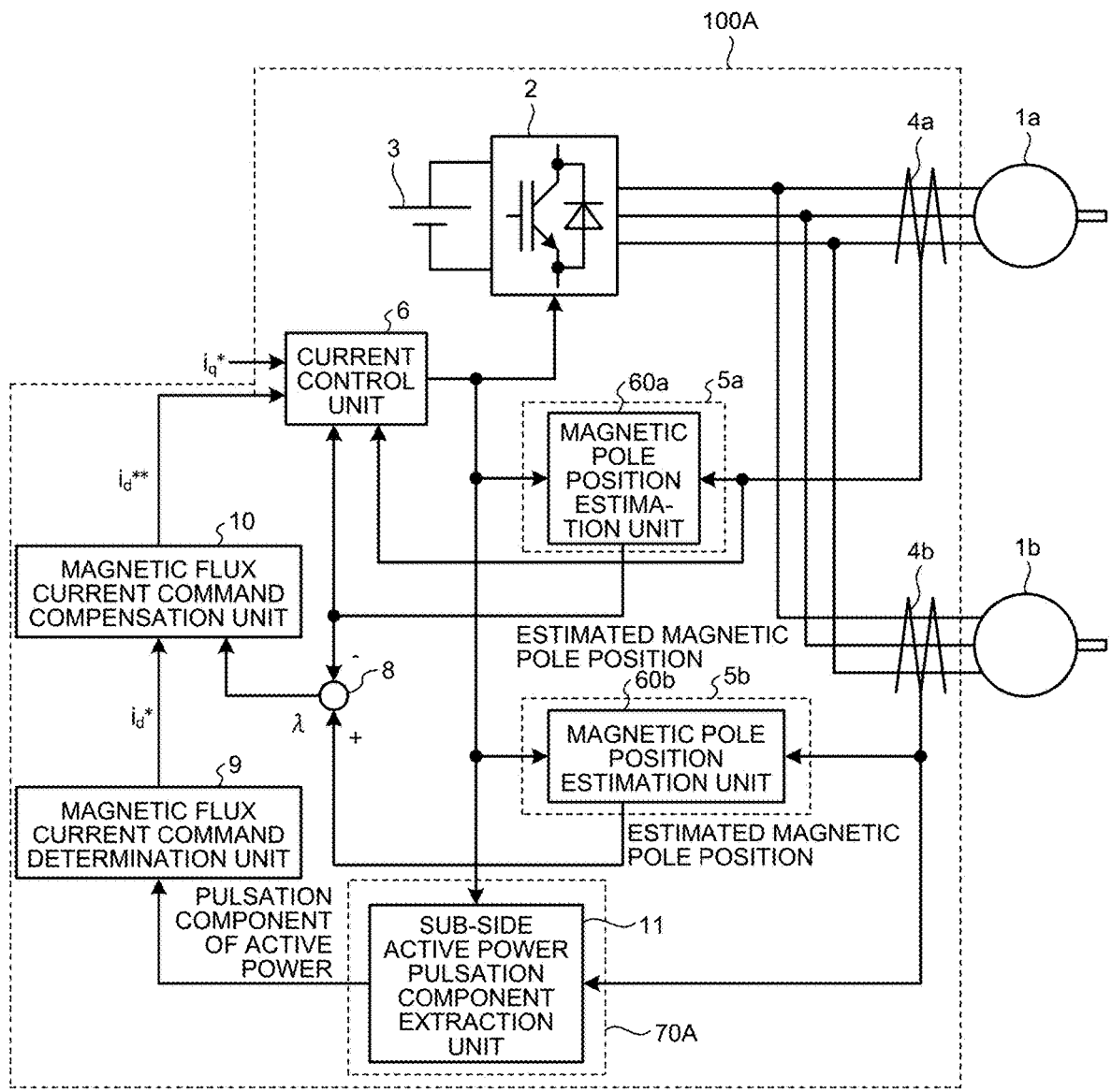
FIG. 26 is a diagram illustrating an exemplary configuration of a drive device according to a second embodiment of the present invention.

FIG. 26 is a diagram illustrating an exemplary configuration of a drive device according to the second embodiment of the present invention. A drive device 100A according to the second embodiment includes a pulsation component extraction unit 70A instead of the pulsation component extraction unit 70 illustrated in FIG. 1. The pulsation component extraction unit 70A includes a sub-side active power pulsation component extraction unit 11. The other parts of the configuration are the same as or equivalent to those in the first embodiment. The same or equivalent components are denoted by the same reference signs, and redundant descriptions are omitted.

The active power $P_x$ can be calculated with Formula (18) below using three-phase voltage commands $v_u^*$, $v_v^*$, and $v_w^*$ and phase currents $i_u^*$, $i_v^*$, and $i_w^*$. The subscript "x" is for distinguishing between the main side and the sub side. Here, $R_a$ is the armature resistance. The three-phase voltage commands $v_u^*$, $v_v^*$, and $v_w^*$ are obtained from the current control unit 6. The phase currents $i_u^*$, $i_v^*$, and $i_w^*$ are obtained from the current detection unit 4b.

[Formula 18]

$$P_x = (v_u^* i_{ux} + v_v^* i_{vx} + v_w^* i_{wx}) - R_a(i_{ux}^{*} + i_{vx}^{*} + i_{wx}^{*}) \quad (18)$$

The second term on the right side of Formula (18) represents a copper loss due to the armature resistance. Strictly speaking, the copper loss is also a part of the active power; however, because the information required here corresponds to the torque pulsation of the sub-side synchronous motor 1b, it is better to subtract the copper loss. Nevertheless, in some cases where the armature resistance is negligibly small, only the first term on the right side may be calculated.

When the moment of inertia of the mechanical system is large and speed pulsations are minute, pulsations in the active power are considered to be due to pulsations in the torque. In this case, therefore, the sub-side active power pulsation component extraction unit 11 performs computation processing in a similar manner to the sub-side torque current pulsation component extraction unit 7 described in the first embodiment, and extracts an active power pulsation component, i.e. a pulsation component included in the active power, from the active power of the sub-side synchronous motor 1b. Determining the magnetic flux current command $i_d^*$ using this information produces effects similar to those according to the first embodiment.

Note that the magnetic flux current command determination unit 9 according to the second embodiment includes the gain multiplication unit 91 and the phase adjustment unit 92 as in the first embodiment, but the gain multiplication unit 91 according to the second embodiment adjusts the gain of the active power pulsation component which is an input signal, and the phase adjustment unit 92 according to the second embodiment adjusts the phase of the active power pulsation component which is an input signal. In addition, the magnetic flux current command determination unit 9 according to the second embodiment need not necessarily include both the gain multiplication unit 91 and the phase adjustment unit 92 as long as the stability of the system can be secured with either the gain multiplication unit 91 or the phase adjustment unit 92, as in the first embodiment.

The drive device 100A according to the second embodiment is useful in the case where the moment of inertia of the load connected to the synchronous motors is large, and is also useful in the case where a computation device having a simple configuration is used owing to a smaller amount of calculation than in the first embodiment due to the non-use of coordinate transformation computation. Specifically, the sub-side torque current pulsation component extraction unit 7 according to the first embodiment obtains the torque current through coordinate transformation of the current in the three-phase coordinate system detected by the current detection unit 4b into the current in the rotating orthogonal coordinate system using the signal from the magnetic pole position identification unit 5b, and extracts the pulsation component of the torque current. On the other hand, in the second embodiment, the sub-side active power pulsation component extraction unit 11 obtains the active power by directly using the current in the three-phase coordinate system detected by the current detection unit 4b as represented by Formula (18), and extracts the pulsation component of the active power. Using the pulsation component, the magnetic flux current command determination unit 9 according to the second embodiment is able to determine the magnetic flux current command $i_d^*$. Therefore, the second embodiment does not require coordinate transformation and has a reduced amount of calculation. In the case of an application having a large moment of inertia, the observation of the pulsation component of the active power described above reduces the required number of coordinate transformations by one, so that the computation load can be reduced in the second embodiment.

As in the first embodiment, the drive device 100A according to the second embodiment includes the magnetic flux current command compensation unit 10 so as to adjust the absolute value of the magnetic flux current command $i_d$ using the angular difference λ between the magnetic pole positions of the two synchronous motors. Consequently, even in the presence of errors in the angular difference λ, it is possible to prevent unstable rotation in the low-speed range.

Third Embodiment

Figure 27:
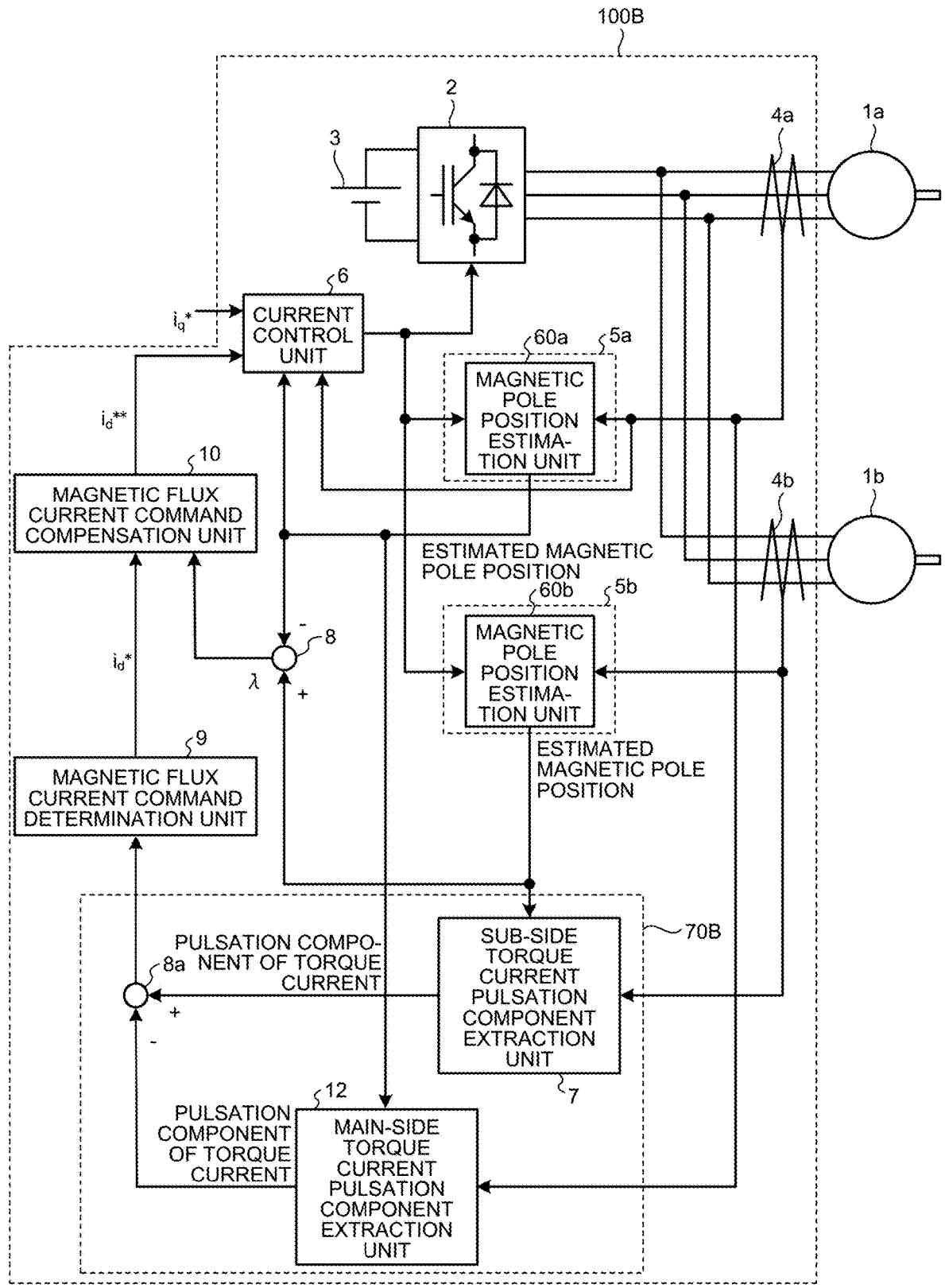
FIG. 27 is a diagram illustrating an exemplary configuration of a drive device according to a third embodiment of the present invention.

FIG. 27 is a diagram illustrating an exemplary configuration of a drive device according to a third embodiment of the present invention. A drive device 100B according to the third embodiment includes a pulsation component extraction unit 70B instead of the pulsation component extraction unit 70 illustrated in FIG. 1. The pulsation component extraction unit 70B includes the sub-side torque current pulsation component extraction unit 7, a main-side torque current pulsation component extraction unit 12, and a subtractor 8a. The other parts of the configuration are the same as or equivalent to those in the first embodiment. The same or equivalent components are denoted by the same reference signs, and redundant descriptions are omitted.

The third embodiment describes an exemplary configuration in which the magnetic flux current command is determined from the difference between the torque current pulsation component that is the pulsation component of the torque current of the sub-side synchronous motor 1b and the torque current pulsation component that is the pulsation component of the torque current of the main-side synchronous motor 1a. The drive devices 100 and 100A according to the first and second embodiments are configured on the premise that the pulsation component of the torque current of the main-side synchronous motor 1a is minute in the steady state. Because the main-side synchronous motor 1a is vector-controlled, if the torque current command value is constant, the torque current of the main-side synchronous motor 1a is supposed to follow the command value. However, in reality, the torque current of the main-side synchronous motor 1a pulsates due to various disturbance factors. Possible disturbance factors include short-circuit prevention time for the semiconductor elements of the upper and lower arms in series constituting the power converter 2, offset of the current sensor, gain imbalance of the current sensor, distortion of the magnetic flux generated from the magnet provided in the rotor, and the like. Torque current pulsations due to these factors similarly occur in the sub-side synchronous motor 1b. In the first and second embodiments, some AC component that can be superimposed on the torque current command is also a disturbance for the magnetic flux current command determination unit 9. The disturbance component superimposed on the torque current command causes torque current pulsations of this frequency in the sub-side synchronous motor 1b. However, because the cause of the disturbance component is different from the self-oscillation due to electrical spring resonance, it is not appropriate to feed back the disturbance component to the magnetic flux current command determination unit 9.

The sub-side torque current pulsation component extraction unit 7 according to the first embodiment and the main-side torque current pulsation component extraction unit 12 according to the third embodiment include a high-pass filter, a bandpass filter, or the like. In order to more precisely stabilize the sub-side synchronous motor 1b, it is desirable to eliminate the influence of the disturbance factors described above. However, high-pass filters have poor disturbance removal characteristics, and bandpass filters require measurement of the electrical spring resonance angular frequency for improving disturbance removal characteristics. Under such circumstances, in order to remove the influence of disturbance with a simpler method, the third embodiment is designed to subtract the pulsation component of the torque current generated in the main-side synchronous motor 1a from the pulsation component of the torque current of the sub-side synchronous motor 1b.

Therefore, the drive device 100B according to the third embodiment includes the main-side torque current pulsation component extraction unit 12 in addition to the sub-side torque current pulsation component extraction unit 7. The main-side torque current pulsation component extraction unit 12 extracts, based on the first current detected by the current detection unit 4a, the torque current pulsation component that is the pulsation component included in the torque current flowing through the main-side synchronous motor 1a. In addition, the drive device 100B includes the subtractor 8a that obtains the difference between the torque current pulsation component from the sub-side torque current pulsation component extraction unit 7 and the torque current pulsation component from the main-side torque current pulsation component extraction unit 12.

The main-side torque current pulsation component extraction unit 12 calculates the pulsation component of the torque current of the main-side synchronous motor 1a. The calculation method may be similar to that of the sub-side torque current pulsation component extraction unit 7 described in the first embodiment. The subtractor 8a calculates the difference between the pulsation components of the torque currents generated in the two synchronous motors, and the magnetic flux current command determination unit 9 determines the magnetic flux current command using the difference.

Figure 28:
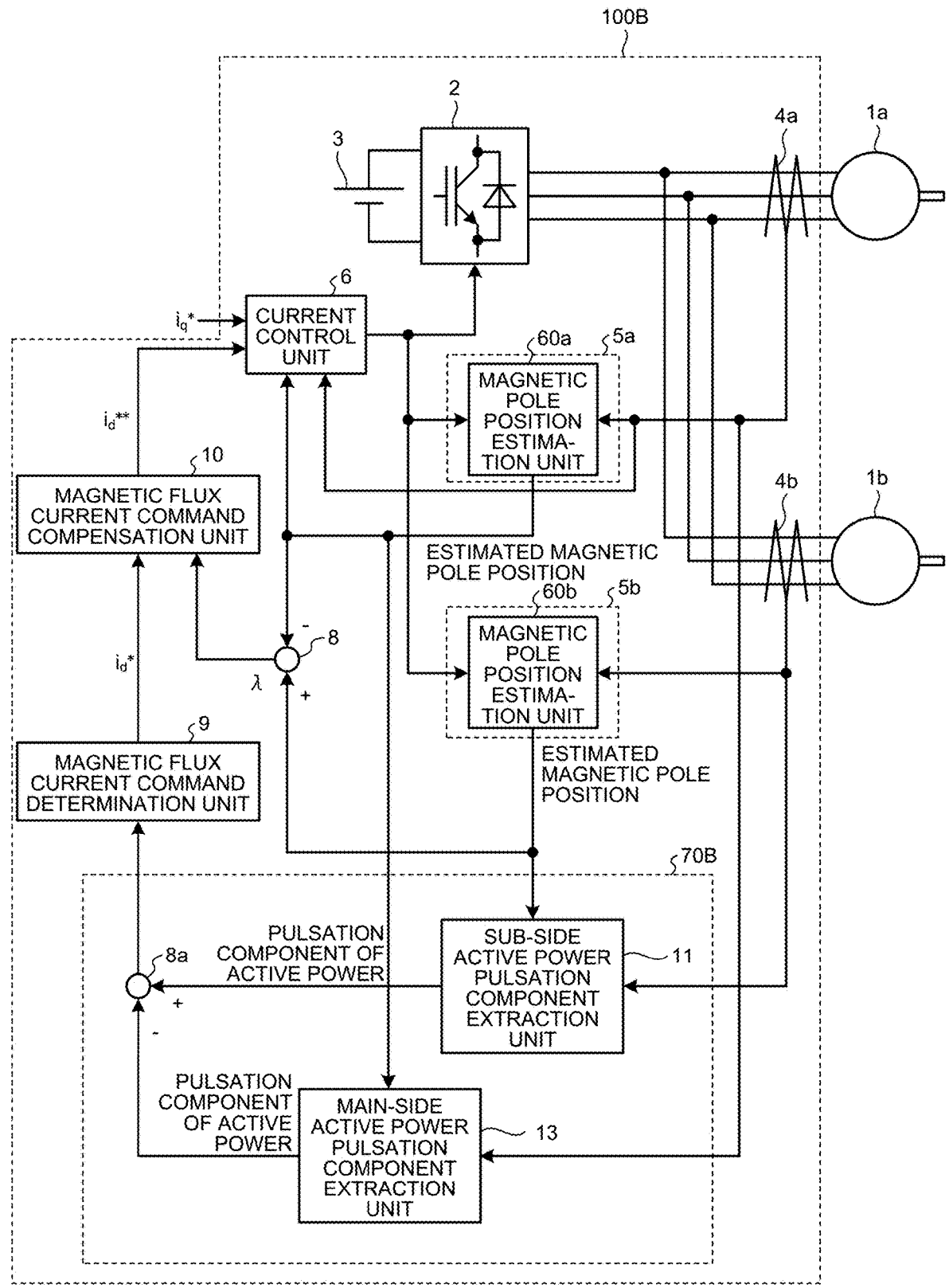
FIG. 28 is a diagram illustrating another exemplary configuration of the drive device according to the third embodiment.

This configuration enables the two synchronous motors to be more stably driven in parallel. Although the third embodiment has described the method of using the difference between the pulsation components of the torque currents generated in the two synchronous motors, the difference between the pulsation components of the active powers may be used instead. FIG. 28 is a diagram illustrating another exemplary configuration of the drive device according to the third embodiment. The pulsation component extraction unit 70B of the drive device 100B illustrated in FIG. 28 determines the magnetic flux current command $i_d^*$ from the difference between the active power pulsation component that is the pulsation component included in the active power consumed by the sub-side synchronous motor 1b and the active power pulsation component that is the pulsation component included in the active power consumed by the main-side synchronous motor 1a. The pulsation component extraction unit 70B includes the sub-side active power pulsation component extraction unit 11, a main-side active power pulsation component extraction unit 13, and the subtractor 8a. The sub-side active power pulsation component extraction unit 11 calculates, based on the second current detected by the current detection unit 4b, the pulsation component included in the active power consumed by the sub-side synchronous motor 1b. The main-side active power pulsation component extraction unit 13 calculates, based on the first current detected by the current detection unit 4a, the pulsation component included in the active power consumed by the main-side synchronous motor 1a. The calculation method may be similar to that of the sub-side active power pulsation component extraction unit 11 described in the second embodiment. The subtractor 8a calculates the difference between the pulsation components of the active powers consumed by the two synchronous motors, and the magnetic flux current command determination unit 9 determines the magnetic flux current command $i_d^*$ using the difference calculated by the subtractor 8a.

Alternatively, the pulsation component extraction unit 70B according to the third embodiment may include the sub-side torque current pulsation component extraction unit 7 and the main-side active power pulsation component extraction unit 13. In this case, the pulsation component extraction unit 70B converts the pulsation component of the torque current calculated by the sub-side torque current pulsation component extraction unit 7 and the pulsation component of the active power calculated by the main-side active power pulsation component extraction unit 13 into the same scale, and then obtains the difference therebetween by means of the subtractor 8a. Still alternatively, the pulsation component extraction unit 70B according to the third embodiment may include the sub-side active power pulsation component extraction unit 11 and the main-side torque current pulsation component extraction unit 12. In this case, the pulsation component extraction unit 70B converts the pulsation component of the active power calculated by the sub-side active power pulsation component extraction unit 11 and the pulsation component of the torque current calculated by the main-side torque current pulsation component extraction unit 12 into the same scale, and then obtains the difference therebetween by means of the subtractor 8a.

As in the first embodiment, the drive device 100B according to the third embodiment includes the magnetic flux current command compensation unit 10 so as to adjust the absolute value of the magnetic flux current command $i_d^*$ using the angular difference λ between the magnetic pole positions of the two synchronous motors. Consequently, even in the presence of errors in the angular difference λ, it is possible to prevent unstable rotation in the low-speed range.

Although the magnetic flux current command determination unit 9 described above determines the magnetic flux current command $i_d^*$ based on the pulsation components extracted by the pulsation component extraction unit 70, 70A, or 70B, the method of determining the magnetic flux current command $i_d^*$ by the magnetic flux current command determination unit 9 is not limited to the above examples. For example, the magnetic flux current command determination unit 9 can also determine the magnetic flux current command $i_d^*$ using the speed difference between the two synchronous motors. In such a case, as with the technique disclosed in Patent Literature 1, by adjusting the absolute value of the magnetic flux current command $i_d^*$ using the angular difference λ between the magnetic pole positions of the two synchronous motors, it is possible to prevent unstable rotation in the low-speed range even in the presence of errors in the angular difference λ.

Fourth Embodiment

Figure 29:
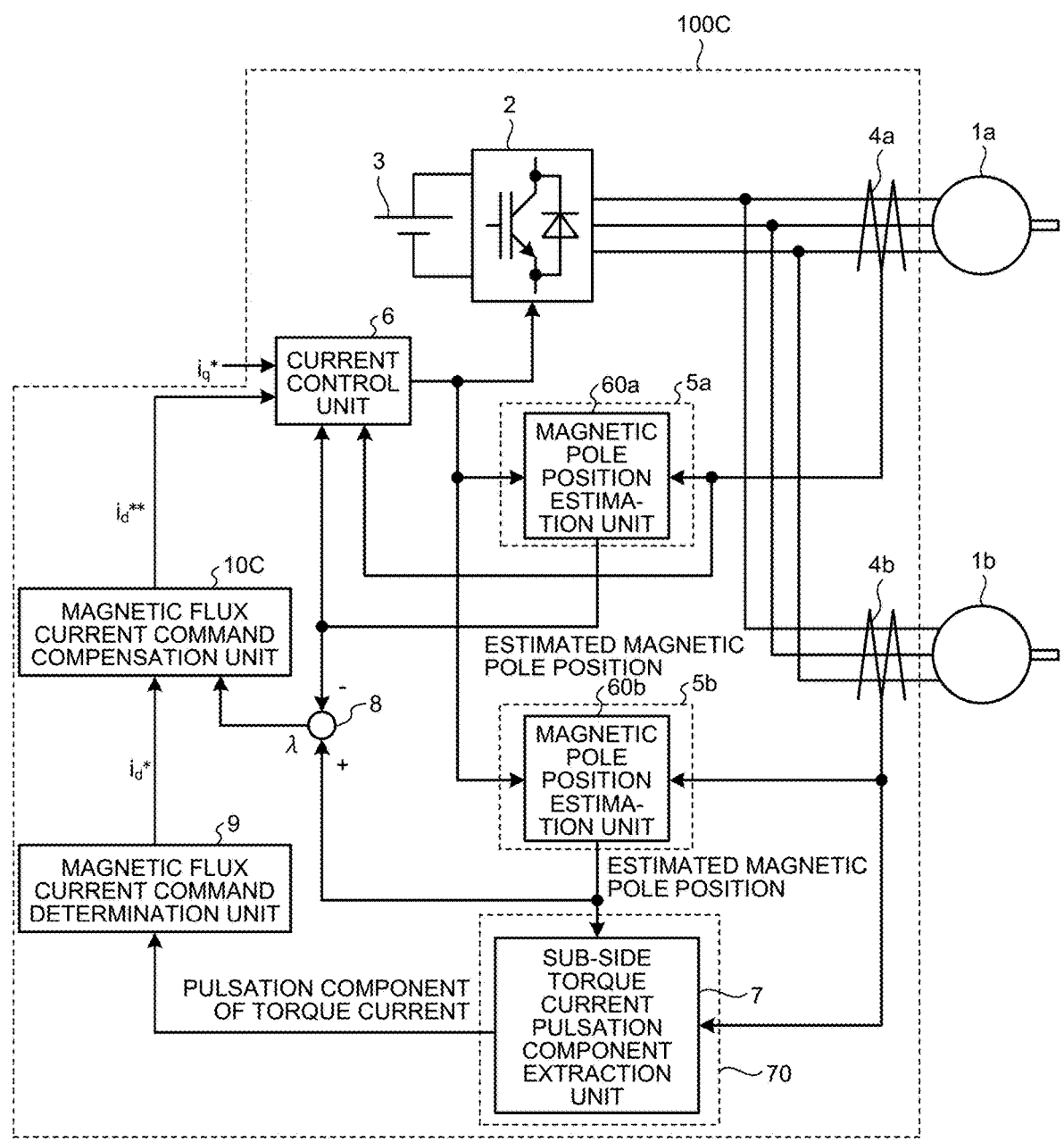
FIG. 29 is a diagram illustrating an exemplary configuration of a drive device according to a fourth embodiment of the present invention.

A fourth embodiment describes an exemplary configuration in which the magnetic flux current command is compensated using a magnetic flux current command compensation unit including a limiter. FIG. 29 is a diagram illustrating an exemplary configuration of a drive device according to the fourth embodiment of the present invention.

A drive device 100C illustrated in FIG. 29 includes a magnetic flux current command compensation unit 10C instead of the magnetic flux current command compensation unit 10. The other parts of the configuration are the same as or equivalent to those in the first embodiment. The same or equivalent components are denoted by the same reference signs, and redundant descriptions are omitted. Note that the drive device 100C may include the pulsation component extraction unit 70A or the pulsation component extraction unit 70B instead of the pulsation component extraction unit 70.

The magnetic flux current command compensation unit 10C illustrated in FIG. 29 reduces the absolute value of the magnetic flux current command $i_d^*$ and makes the magnetic flux current command $i_d^{**}$ zero for output in the section where the magnetic flux current command $i_d^*$ is negative. Consequently, the drive device 100C can prevent a decrease in the voltage applied to the synchronous motors, and can improve the driving stability of the synchronous motors. The reasons are as follows.

The sub-side synchronous motor 1b can be stably driven by compensating the torque of the sub-side synchronous motor 1b with the magnetic flux current command $i_d^{}$, but when the magnetic flux current command $i_d^{}$ is negative, the voltage applied to the synchronous motors decreases. Therefore, the driving stability of the synchronous motors may be impaired due to disturbance or the like. Here, examples of disturbance include errors in the resistance value of the synchronous motors, errors in the inductance of the synchronous motors, errors in the induced voltage constant of the synchronous motors, errors in the current detection units 4a and 4b, and the like.

Figure 30:
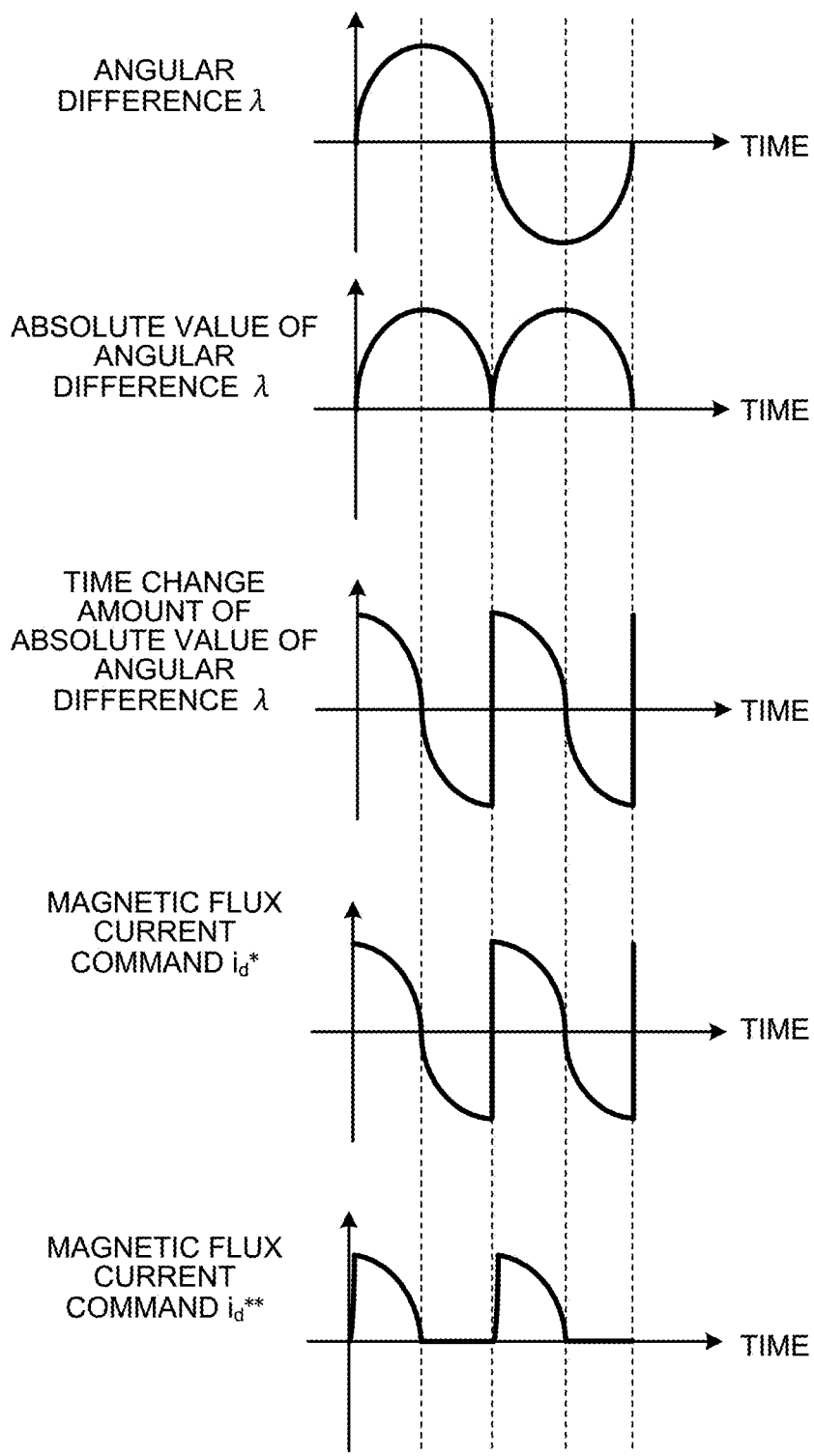
FIG. 30 is a diagram illustrating an example of changes in the angular difference that is the difference in the magnetic pole position of the sub-side synchronous motor relative to the magnetic pole position of the main-side synchronous motor and changes in the value of the magnetic flux current command according to the fourth embodiment.

FIG. 30 is a diagram illustrating an example of changes in the angular difference that is the difference in the magnetic pole position of the sub-side synchronous motor relative to the magnetic pole position of the main-side synchronous motor and changes in the value of the magnetic flux current command according to the fourth embodiment. In FIG. 30, the horizontal axis represents time, and the vertical axis represents, in order from the top, the angular difference λ, which is the difference in the magnetic pole position of the sub-side synchronous motor 1b relative to the magnetic pole position of the main-side synchronous motor 1a, the absolute value of the angular difference λ, the time change amount of the absolute value of the angular difference λ, the magnetic flux current command $i_d^*$, and the magnetic flux current command $i_d^{**}$ output from the magnetic flux current command compensation unit 10C.

In the drive devices 100, 100A, and 100B according to the first to third embodiments, torque compensation with the magnetic flux current command $i_{d+}^*$ is also performed when the angular difference λ decreases with time. However, as the absolute value of the angular difference λ in magnetic pole position decreases with time, the phase of the sub-side synchronous motor 1b approaches the phase of the main-side synchronous motor 1a with no need for torque compensation with the magnetic flux current command $i_d^{}$, resulting in stable operation. In addition, when the absolute value of the angular difference λ increases with time, the time change amount of the absolute value of the angular difference λ is positive, whereas when the absolute value of the angular difference λ decreases with time, the time change amount of the absolute value of the angular difference λ is negative. Therefore, when the time change amount of the absolute value of the angular difference λ is negative, the synchronous motors are considered to stably operate with no need for torque compensation with the magnetic flux current command $i_d^{}$. In the example illustrated in FIG. 30, the time change amount of the absolute value of the angular difference λ and the magnetic flux current command $i_d^*$ output from the magnetic flux current command determination unit 9 are in substantially the same phase. Therefore, by not applying the magnetic flux current in the section where the magnetic flux current command $i_d^*$ is negative, it is possible to prevent a decrease in the voltage applied to the synchronous motors and to improve the driving stability of the synchronous motors. Furthermore, power efficiency is improved because no unnecessary magnetic flux current flows to the synchronous motors.

Figure 31:
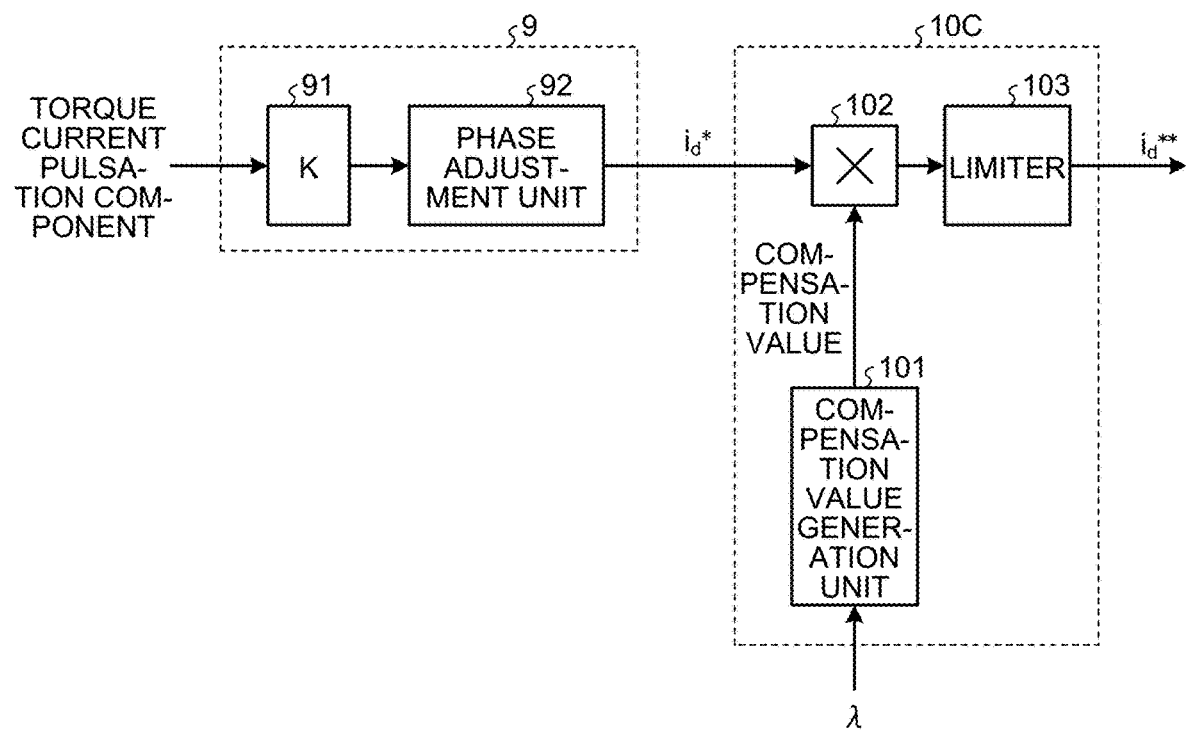
FIG. 31 is a diagram illustrating an exemplary configuration of the magnetic flux current command determination unit and the magnetic flux current command compensation unit according to the fourth embodiment.
Figure 32:
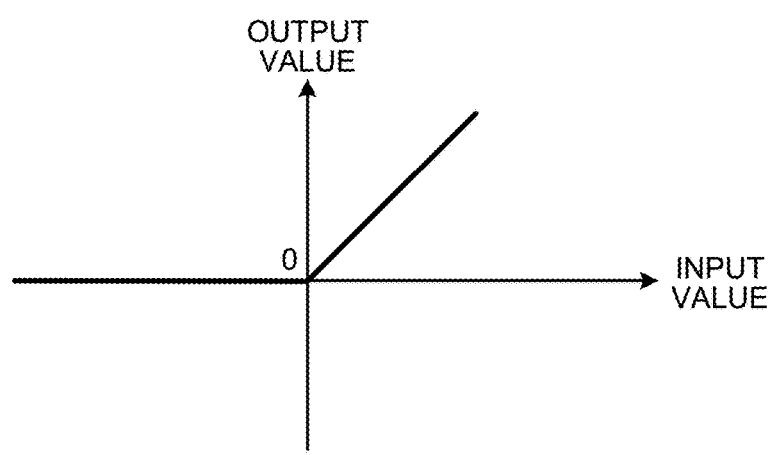
FIG. 32 is a first diagram for explaining processing by the limiter illustrated in FIG. 31.
Figure 33:
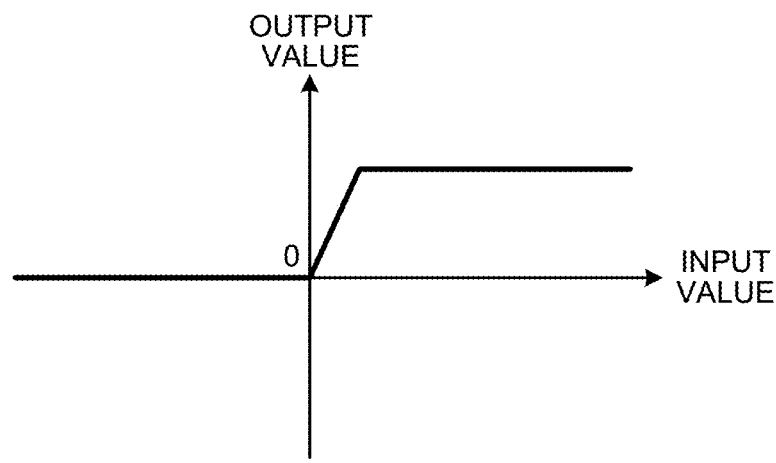
FIG. 33 is a second diagram for explaining processing by the limiter illustrated in FIG. 31.
Figure 34:
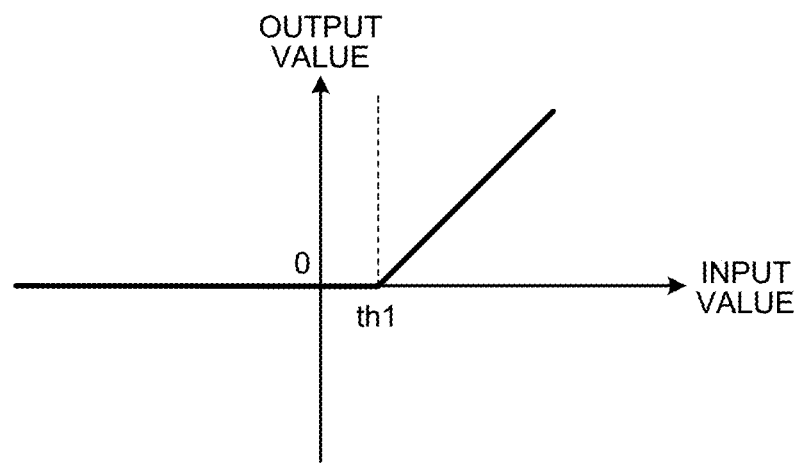
FIG. 34 is a third diagram for explaining processing by the limiter illustrated in FIG. 31.
Figure 35:
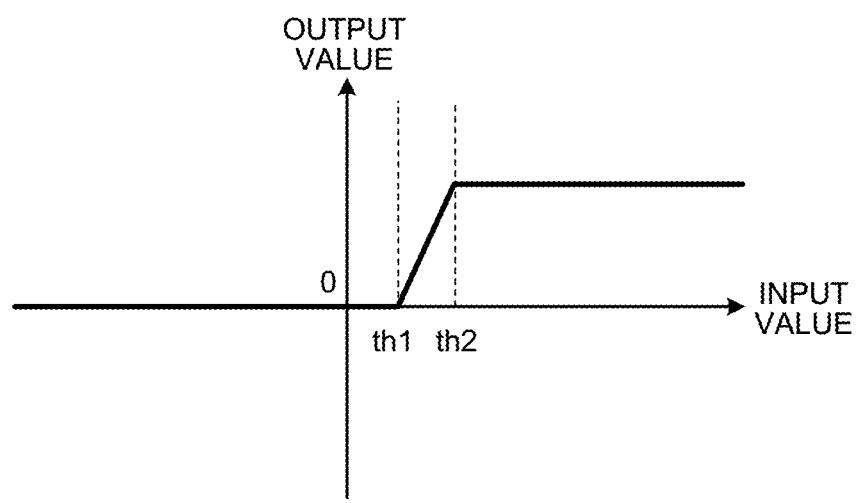
FIG. 35 is a fourth diagram for explaining processing by the limiter illustrated in FIG. 31.

FIG. 31 is a diagram illustrating an exemplary configuration of the magnetic flux current command determination unit and the magnetic flux current command compensation unit according to the fourth embodiment. FIG. 32 is a first diagram for explaining processing by the limiter illustrated in FIG. 31. FIG. 33 is a second diagram for explaining processing by the limiter illustrated in FIG. 31. FIG. 34 is a third diagram for explaining processing by the limiter illustrated in FIG. 31. FIG. 35 is a fourth diagram for explaining processing by the limiter illustrated in FIG. 31. In FIGS. 32 to 35, the horizontal axis represents the input value to the limiter, and the vertical axis represents the output value from the limiter.

As illustrated in FIG. 31, the magnetic flux current command compensation unit 10C according to the fourth embodiment differs from the magnetic flux current command compensation unit 10 according to the first to third embodiments in that a limiter 103 is provided. The limiter 103 is a means that reduces the absolute value of the magnetic flux current command $i_d^*$ multiplied by the compensation value by the multiplier 102. By defining the characteristics of the limiter 103 as illustrated in FIG. 32, it is possible to make the magnetic flux current command $i_d^{**}$ zero even when the magnetic flux current command $i_d^*$ multiplied by the compensation value by the multiplier 102 is negative. The limiter 103 characterized as illustrated in FIG. 32 outputs zero in response to a negative input value, and in response to a positive input value, outputs the value equal to the input value. Therefore, when the magnetic flux current command $i_d^*$ multiplied by the compensation value by the multiplier 102 is negative, the magnetic flux current command $i_d^{**}$ of zero is output from the limiter 103.

The characteristics of the limiter 103 may be defined as illustrated in FIG. 33, in which an upper limit is provided on the output value. The limiter 103 characterized as illustrated in FIG. 33 is able to limit the magnitude of the magnetic flux current command $i_d^{**}$ for output in a case where the magnetic flux current command $i_d^*$ is so large that overcurrent would otherwise be detected, thereby preventing the detection of overcurrent. Note that the characteristics illustrated in FIG. 33 show that in response to an input value less than the upper limit, the value equal to the input value is output, and in response to an input value greater than or equal to the upper limit, the upper limit is output.

Alternatively, the characteristics of the limiter 103 may be defined as illustrated in FIG. 34, in which zero is output in response to an input value that is positive but less than a threshold th1, and in response to an input value greater than or equal to the threshold th1, the value that varies depending on the input value is output. When the magnetic flux current command $i_d^*$ is a positive value but its absolute value is small, the voltage applied to the synchronous motors may decrease due to, for example, an error in current detection in the current detection unit 4a. In addition, when the magnetic flux current command $i_d^*$ is a negative value but its absolute value is small, the voltage applied to the synchronous motors may increase due to an error in current detection in the current detection unit 4a, an error in current detection in the current detection unit 4b, or the like. In such cases where there is an error in current detection in the current detection unit 4a or the like, the limiter 103 characterized as illustrated in FIG. 34 is able to make the magnetic flux current command $i_d^{**}$ zero for output. Note that the characteristics illustrated in FIG. 34 show that in response to an input value greater than or equal to the threshold th1, the value obtained by subtracting the threshold th1 from the input value is output, but the value equal to the input value may be output instead.

The characteristics of the limiter 103 are not limited to the examples illustrated in FIGS. 32 to 34, and may be any combination of the characteristics illustrated in FIGS. 32 to 34. For example, the characteristics of the limiter 103 may be defined as illustrated in FIG. 35, in which zero is output in response to an input value less than the threshold th1; in response to an input value greater than or equal to the threshold th1, the value that varies depending on the input value is output; and in response to an input value greater than or equal to a threshold th2, the upper limit is output. Note that the characteristics illustrated in FIG. 35 show that in response to an input value in the range of the threshold th1 (inclusive) to the threshold th2 (exclusive), the value obtained by subtracting the threshold th1 from the input value is output, but the value equal to the input value may be output instead.

As described above, the magnetic flux current command compensation unit 10C including the limiter 103 makes the magnetic flux current command $i_d^{**}$ zero when the time change amount of the absolute value of the angular difference λ decreases, so that the voltage applied to the synchronous motors can be prevented from decreasing. Therefore, the synchronous motors can be stably driven, and the driving efficiency of the synchronous motors can be further enhanced. Although the magnetic flux current command compensation unit 10C illustrated in FIG. 31 includes the compensation value generation unit 101 and the multiplier 102 similar to those in the first embodiment, the compensation value generation unit 101 and the multiplier 102 are not necessarily required, and the compensation value generation unit 101 and the multiplier 102 may not be provided. That is, the magnetic flux current command compensation unit 10C may be configured such that the magnetic flux current command $i_d^*$ is directly input to the limiter 103. Even in this case, the magnetic flux current command $i_d^{**}$ becomes zero when the time change amount of the absolute value of the angular difference λ decreases, which is advantageous in reducing the influence of errors in the angular difference λ and preventing the voltage applied to the synchronous motors from decreasing. Therefore, the synchronous motors can be stably driven, and the driving efficiency of the synchronous motors can be further enhanced. In the case where the compensation value generation unit 101 and the multiplier 102 are not used in the magnetic flux current command compensation unit 10C, the rise of the magnetic flux current command $i_d$ is steeper than that of the magnetic flux current command $i_d$ illustrated in FIG. 30.

Fifth Embodiment

Figure 36:
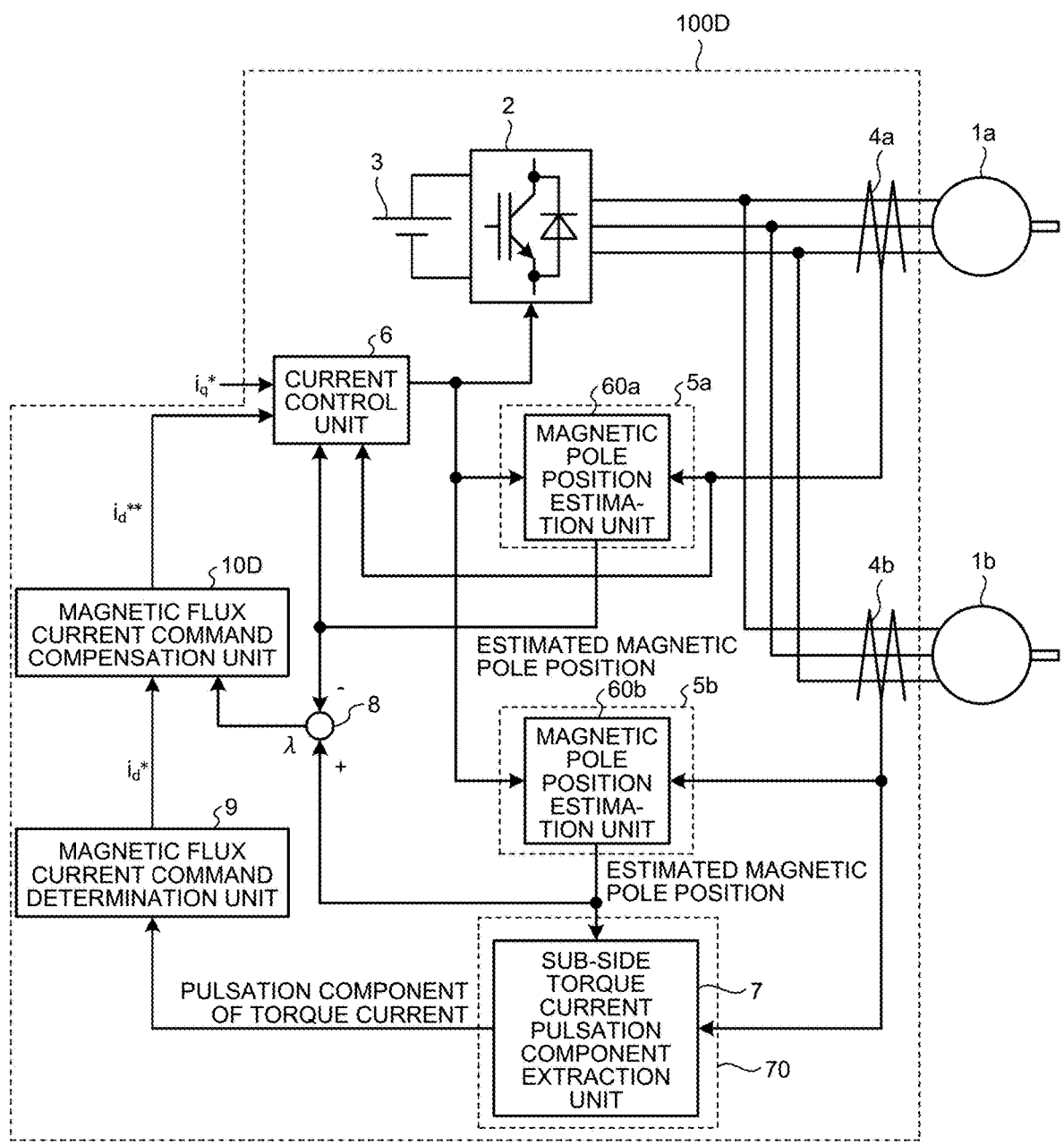
FIG. 36 is a diagram illustrating an exemplary configuration of a drive device according to a fifth embodiment of the present invention.

A fifth embodiment describes a method of reducing the magnetic flux current command by means of a magnetic flux current command compensation unit that uses the time derivative of the absolute value of the angular difference λ. FIG. 36 is a diagram illustrating an exemplary configuration of a drive device according to the fifth embodiment of the present invention. A drive device 100D illustrated in FIG. 36 includes a magnetic flux current command compensation unit 10D instead of the magnetic flux current command compensation unit 10. The other parts of the configuration are the same as or equivalent to those in the first embodiment. The same or equivalent components are denoted by the same reference signs, and redundant descriptions are omitted. Note that the drive device 100D may include the pulsation component extraction unit 70A or the pulsation component extraction unit 70B instead of the pulsation component extraction unit 70.

The magnetic flux current command compensation unit 10D illustrated in FIG. 36 reduces the absolute value of the magnetic flux current command $i_d^*$ and makes the magnetic flux current command $i_d^{**}$ zero for output when the time derivative of the absolute value of the angular difference λ is negative. Consequently, the drive device 100D can prevent a decrease in the voltage applied to the synchronous motors, and can improve the driving stability of the synchronous motors. The reasons are as follows.

The magnetic flux current command compensation unit 10C according to the fourth embodiment makes the magnetic flux current command $i_d^{**}$ zero for output in the section where the magnetic flux current command $i_d^*$ is negative, on the premise that the time change amount of the absolute value of the angular difference λ and the magnetic flux current command $i_d^*$ are in the same phase. However, the time change amount of the absolute value of the angular difference λ between the two synchronous motors and the magnetic flux current command $i_d^*$ may be in different phases.

Figure 37:
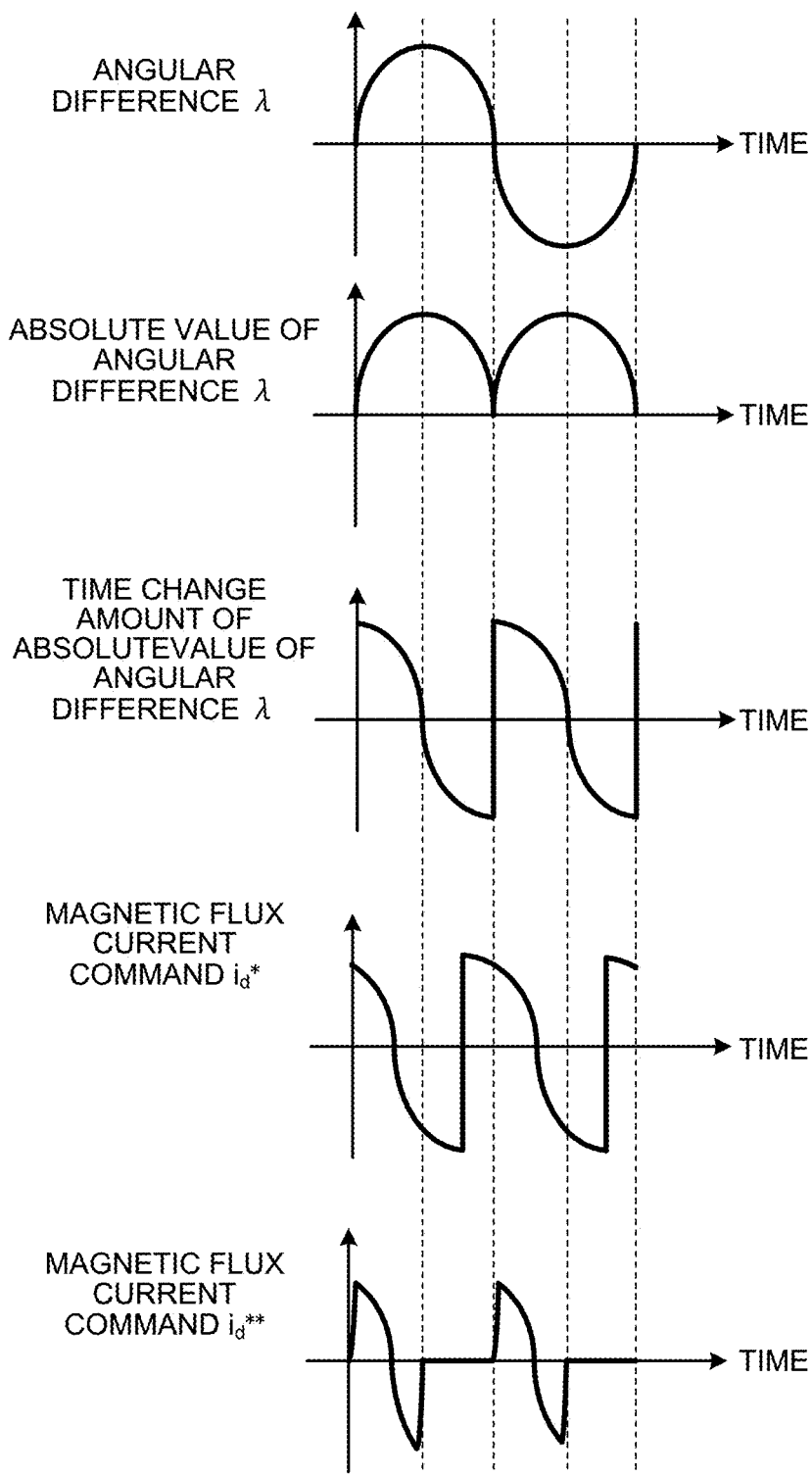
FIG. 37 is a diagram illustrating an example of changes in the angular difference that is the difference in the magnetic pole position of the sub-side synchronous motor relative to the magnetic pole position of the main-side synchronous motor and changes in the value of the magnetic flux current command according to the fifth embodiment.

FIG. 37 is a diagram illustrating an example of changes in the angular difference that is the difference in the magnetic pole position of the sub-side synchronous motor relative to the magnetic pole position of the main-side synchronous motor and changes in the value of the magnetic flux current command according to the fifth embodiment. In FIG. 37, the horizontal axis represents time, and the vertical axis represents, in order from the top, the angular difference λ, the absolute value of the angular difference λ, the time change amount of the absolute value of the angular difference λ, the magnetic flux current command $i_d^*$, and the magnetic flux current command $i_d^{**}$ output from the magnetic flux current command compensation unit 10D.

The example illustrated in FIG. 37, in which the time change amount of the absolute value of the angular difference λ and the magnetic flux current command $i_d$ are in different phases, differs from the example illustrated in FIG. 30, in which the time change amount of the absolute value of the angular difference λ and the magnetic flux current command $i_d^*$ are in the same phase. In the case where the time change amount of the absolute value of the angular difference λ and the magnetic flux current command $i_d^*$ are in different phases, if the magnetic flux current command $i_d^*$ is adjusted using the limiter 103 illustrated in FIG. 31, the magnetic flux current command $i_d^{**}$ is set to zero even when the time change amount of the absolute value of the angular difference λ is positive, that is, when the absolute value of the angular difference λ increases, which may result in deterioration of the driving stability of the synchronous motors.

Figure 38:
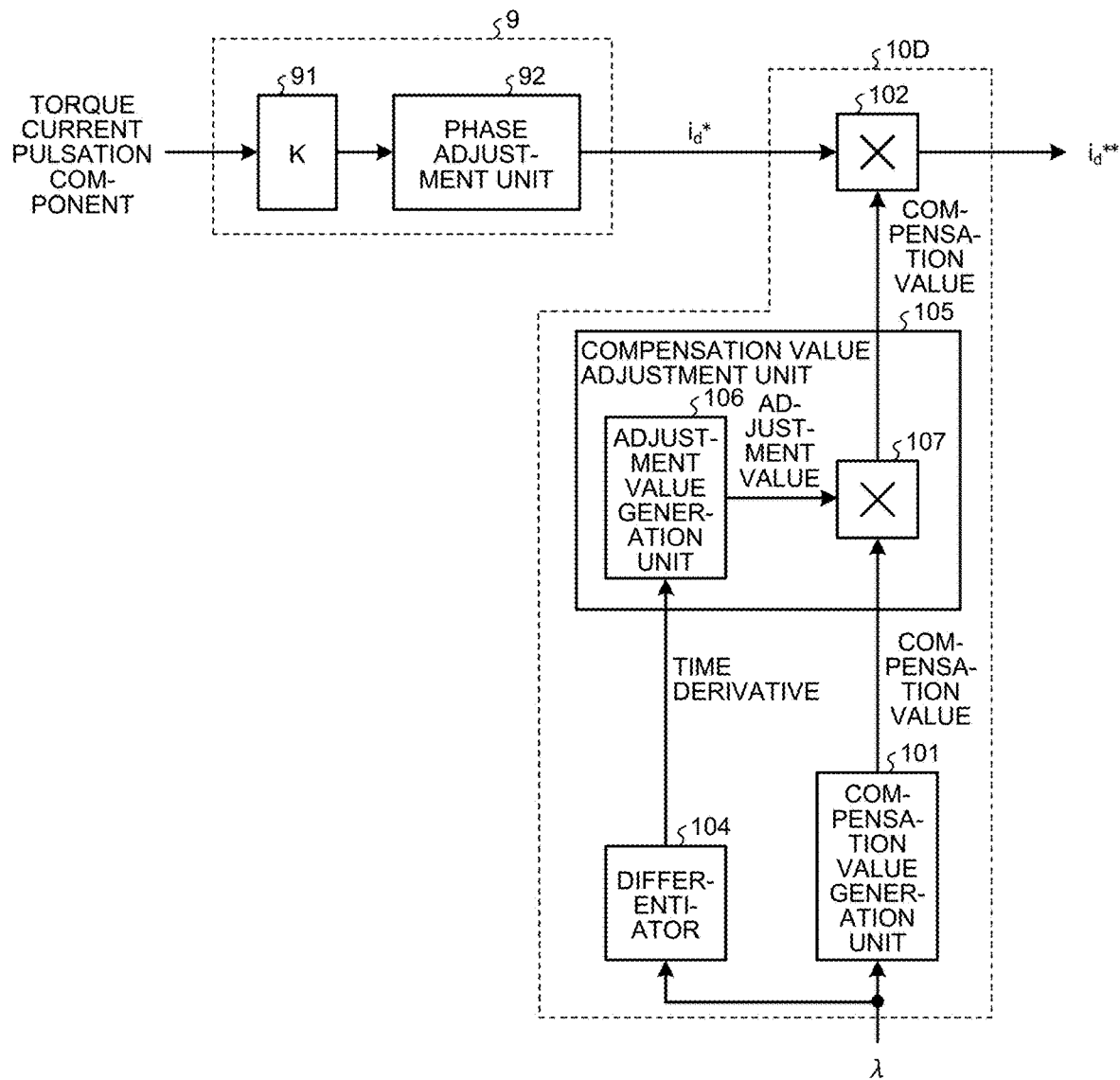
FIG. 38 is a diagram illustrating an exemplary configuration of the magnetic flux current command determination unit and the magnetic flux current command compensation unit according to the fifth embodiment.

To avoid this, the magnetic flux current command compensation unit 10D according to the fifth embodiment adjusts the magnetic flux current command $i_d^*$ using the time derivative dλ/dt of the absolute value of the angular difference λ. FIG. 38 is a diagram illustrating an exemplary configuration of the magnetic flux current command determination unit and the magnetic flux current command compensation unit according to the fifth embodiment. As illustrated in FIG. 38, the magnetic flux current command compensation unit 10D includes the compensation value generation unit 101, the multiplier 102, a differentiator 104, and a compensation value adjustment unit 105. The differentiator 104 illustrated in FIG. 38 receives input of the angular difference λ and outputs the time derivative dλ/dt. The differentiator 104 obtains the time derivative d/dt by performing the process represented by Formula (19) below. Here, θ$_{es}$ is the magnetic pole position of the sub-side synchronous motor 1b, and θ$_{em}$ is the magnetic pole position of the main-side synchronous motor 1a. The time derivative dλ/dt of the angular difference λ is the time change amount of the absolute value of the angular difference λ described above.

[Formula 19]

[Formula 19]

$$\frac{d\lambda}{dt} = \frac{d(|\theta_{es} - \theta_{cm}|)}{dt} \quad (19)$$

The compensation value adjustment unit 105 includes an adjustment value generation unit 106 that generates an adjustment value based on the time derivative dλ/dt output from the differentiator 104, and a multiplier 107 that multiplies the compensation value generated by the compensation value generation unit 101 by the adjustment value generated by the adjustment value generation unit 106. Consequently, the compensation value generated by the compensation value generation unit 101 is adjusted with the adjustment value generated by the adjustment value generation unit 106, and the adjusted compensation value is output to the multiplier 102.

Figure 39:
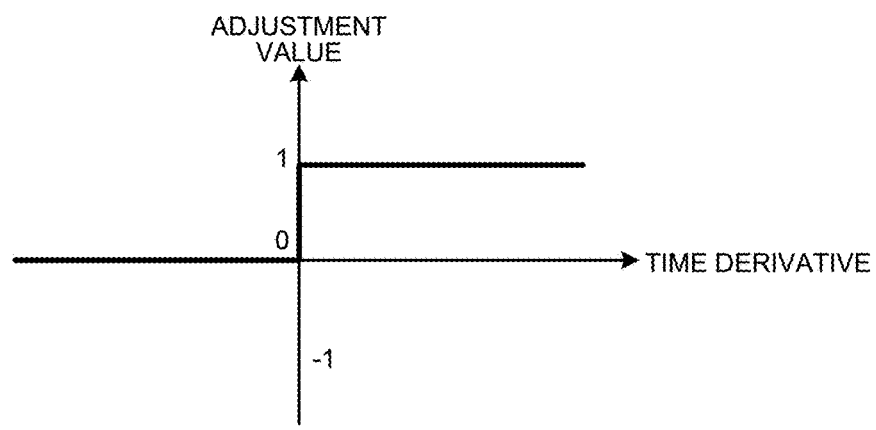
FIG. 39 is a first diagram for explaining processing by the adjustment value generation unit illustrated in FIG. 38.
Figure 40:
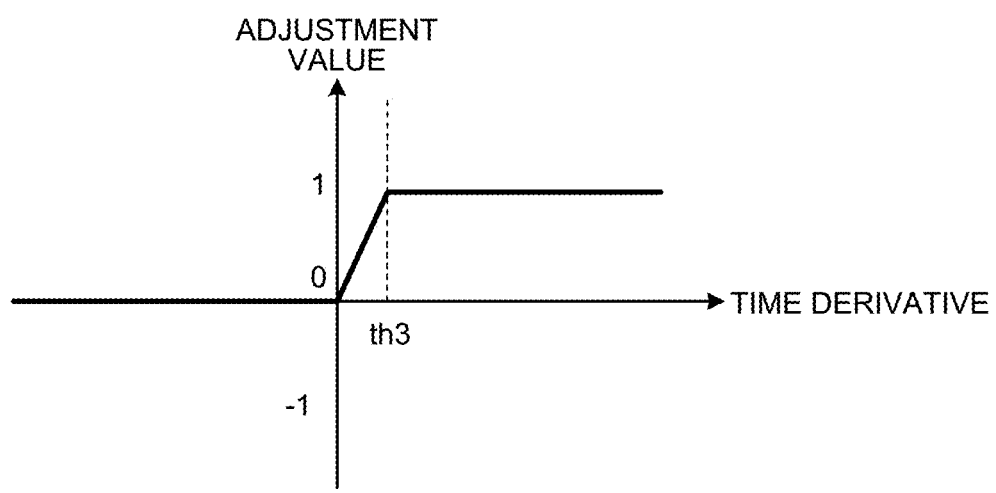
FIG. 40 is a second diagram for explaining processing by the adjustment value generation unit illustrated in FIG. 38.
Figure 41:
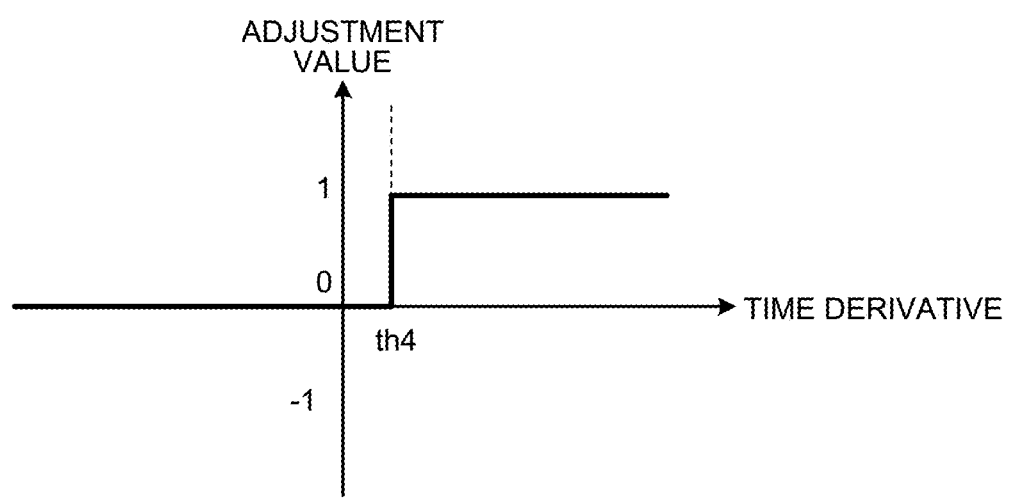
FIG. 41 is a third diagram for explaining processing by the adjustment value generation unit illustrated in FIG. 38.
Figure 42:
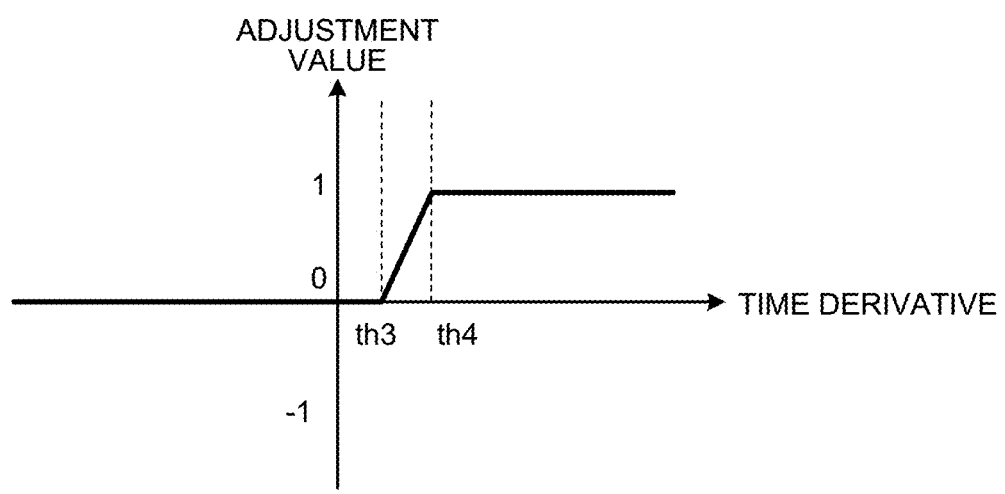
FIG. 42 is a fourth diagram for explaining processing by the adjustment value generation unit illustrated in FIG. 38.

FIG. 39 is a first diagram for explaining processing by the adjustment value generation unit illustrated in FIG. 38. FIG. 40 is a second diagram for explaining processing by the adjustment value generation unit illustrated in FIG. 38. FIG. 41 is a third diagram for explaining processing by the adjustment value generation unit illustrated in FIG. 38. FIG. 42 is a fourth diagram for explaining processing by the adjustment value generation unit illustrated in FIG. 38. FIGS. 39 to 42 depict the input/output characteristics of the adjustment value generation unit 106. In FIGS. 39 to 42, the horizontal axis represents the time derivative dλ/dt that is input to the adjustment value generation unit 106, and the vertical axis represents the adjustment value that is output from the adjustment value generation unit 106.

In a case where the input/output characteristics of the adjustment value generation unit 106 are defined as illustrated in FIG. 39, the adjustment value generation unit 106 outputs "1" as an adjustment value in response to the time derivative dλ/dt that is positive, and outputs zero as an adjustment value in response to the time derivative dλ/dt that is negative. The multiplier 107 multiplies the compensation value output from the compensation value generation unit 101 by the adjustment value output from the adjustment value generation unit 106, and outputs the multiplication result to the multiplier 102 as the adjusted compensation value. Consequently, when the time derivative dλ/dt is negative, the compensation value of zero is output to the multiplier 102 so that magnetic flux current compensation is not performed in the case of a decrease in the absolute value of the angular difference λ. Therefore, it is possible to prevent a decrease in the voltage applied to the synchronous motors and to improve the driving stability of the synchronous motors. Furthermore, power efficiency is improved because no unnecessary magnetic flux current flows to the synchronous motors.

Alternatively, in order to prevent fluctuations in output when the time derivative dλ/dt repeatedly alternates between positive and negative near zero, the input/output characteristics of the adjustment value generation unit 106 may be defined as illustrated in FIG. 40. In the case where the input/output characteristics of the adjustment value generation unit 106 are defined as illustrated in FIG. 40, the adjustment value generation unit 106 outputs smaller adjustment values as the time derivative dλ/dt that is positive and less than a threshold th3 approaches zero.

Alternatively, in order not to perform magnetic flux current compensation when the time change amount of the absolute value of the angular difference λ is positive but the time increase rate of the absolute value of the angular difference λ is small, the input/output characteristics of the adjustment value generation unit 106 may be defined as illustrated in FIG. 41. In the case where the input/output characteristics of the adjustment value generation unit 106 are defined as illustrated in FIG. 41, the adjustment value generation unit 106 outputs the adjustment value of zero in response to the time derivative dλ/dt that is positive and less than a threshold th4.

Alternatively, the input/output characteristics of the adjustment value generation unit 106 may be a combination of the characteristics illustrated in FIG. 40 and the characteristics illustrated in FIG. 41. In a case where the input/output characteristics of the adjustment value generation unit 106 are defined as illustrated in FIG. 42, the adjustment value generation unit 106 outputs the adjustment value of "1" in response to the time derivative dλ/dt that is positive and greater than or equal to the threshold th4, and outputs smaller adjustment values as the time derivative dλ/dt that is positive and in the range of the threshold th3 (inclusive) to the threshold th4 (exclusive) approaches the threshold th3. Note that the input/output characteristics of the adjustment value generation unit 106 are not limited to the examples of FIGS. 39 to 42.

As described above, the magnetic flux current command compensation unit 10D can prevent a decrease in the voltage applied to the synchronous motors, and thus can improve the driving stability of the synchronous motors. Furthermore, power efficiency is improved because no unnecessary magnetic flux current flows to the synchronous motors.

Note that the magnetic flux current command compensation unit 10D may be configured without the compensation value adjustment unit 105. For example, the magnetic flux current command compensation unit 10D may include the differentiator 104, the compensation value generation unit 101 that outputs the compensation value corresponding to the time derivative dλ/dt output from the differentiator 104, and the multiplier 102 that multiplies the magnetic flux current command i$_d$* by the compensation value. In this case, the compensation value generation unit 101 has the same input/output characteristics as the compensation value adjustment unit 105. For example, the compensation value generation unit 101 may have the same input/output characteristics as the compensation value adjustment unit 105 illustrated in FIG. 39, in which case the compensation value generation unit 101 outputs "1" as a compensation value in response to the time derivative dλ/dt that is positive, and outputs zero as a compensation value in response to the time derivative dλ/dt that is negative. Even in this case, the magnetic flux current command $i_d$ becomes zero when the time change amount of the absolute value of the angular difference λ decreases, which is advantageous in reducing the influence of errors in the angular difference λ and preventing the voltage applied to the synchronous motors from decreasing. Therefore, the synchronous motors can be stably driven, and the driving efficiency of the synchronous motors can be further enhanced. In the case where the compensation value adjustment unit 105 is not used in the magnetic flux current command compensation unit 10D as mentioned above, the rise of the magnetic flux current command $i_d$ is steeper than that of the magnetic flux current command $i_d$** illustrated in FIG. 37.

Sixth Embodiment

Figure 43:
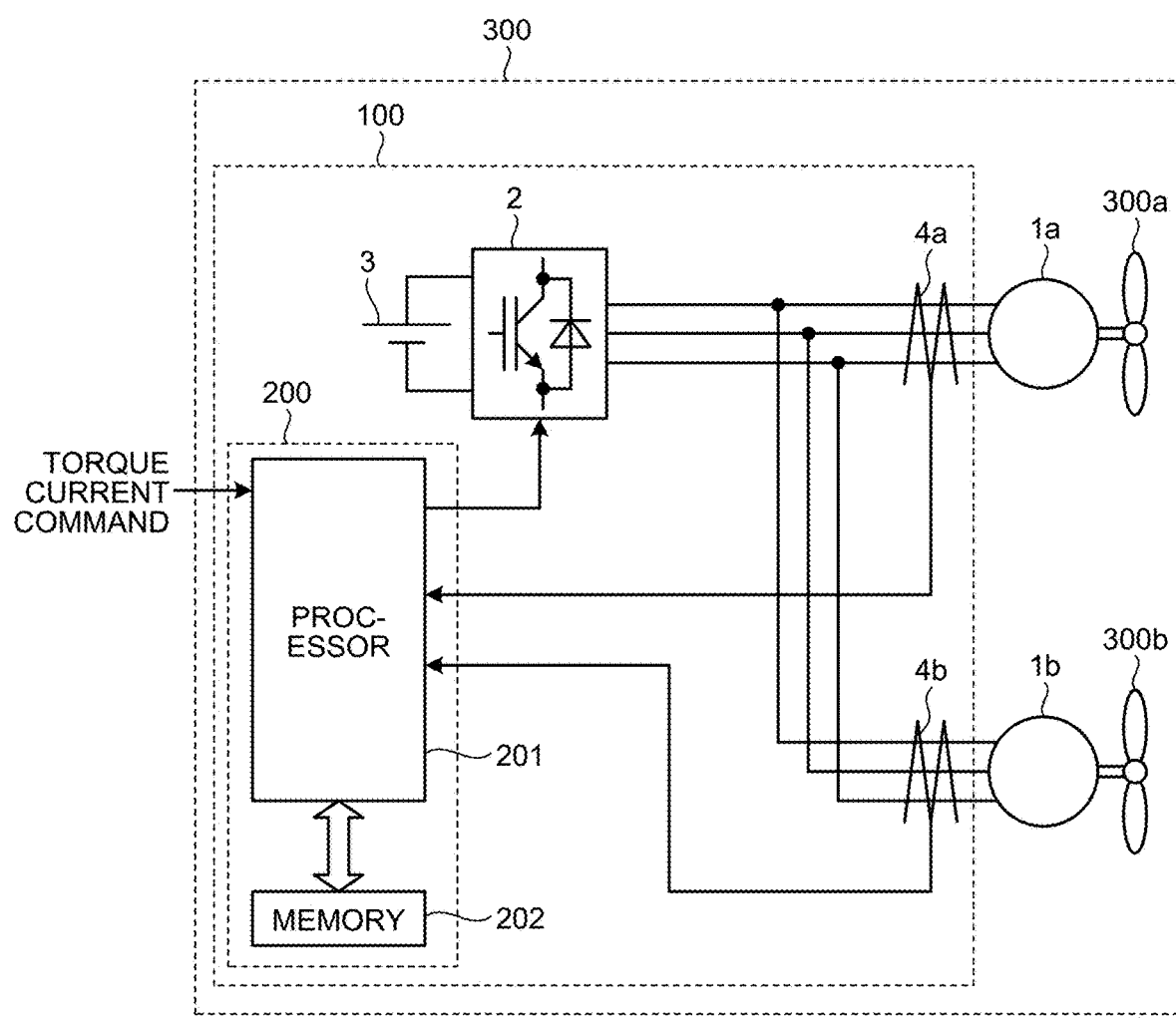
FIG. 43 is a diagram illustrating an exemplary configuration of a fluid utilization device according to a sixth embodiment of the present invention.

A sixth embodiment describes an exemplary configuration of a fluid utilization device that uses the drive device 100, 100A, 100B, 100C, or 100D according to the first, second, third, fourth, or fifth embodiment. FIG. 43 is a diagram illustrating an exemplary configuration of a fluid utilization device according to the sixth embodiment of the present invention. The sixth embodiment describes the fluid utilization device 300 in which a propeller fan 300a is provided on the rotation shaft of the main-side synchronous motor 1a and a propeller fan 300b is provided on the rotation shaft of the sub-side synchronous motor 1b.

The fluid utilization device 300 illustrated in FIG. 43 includes the drive device 100 according to the first embodiment, and the drive device 100 includes a power converter drive device 200. The power converter drive device 200 includes a processor 201 and a memory 202. The functions illustrated in FIG. 1, that is, the functions of the current control unit 6, the magnetic pole position identification units 5a and 5b, the sub-side torque current pulsation component extraction unit 7, the subtractor 8, the magnetic flux current command determination unit 9, and the magnetic flux current command compensation unit 10, are implemented using the processor 201 and the memory 202.

In the case where the processor 201 and the memory 202 are used as illustrated in FIG. 43, each of the functions described above is implemented by software, firmware, or a combination thereof. Software or firmware is described as programs and stored in the memory 202. The processor 201 reads and executes programs stored in the memory 202. It can also be said that these programs cause a computer to execute the procedures and methods for each of the above functions. The memory 202 may be a semiconductor memory such as a random access memory (RAM), a read only memory (ROM), a flash memory, an erasable programmable read only memory (EPROM), or an electrically erasable programmable read only memory (EEPROM, registered trademark). A semiconductor memory may be a nonvolatile memory or a volatile memory. Instead of a semiconductor memory, the memory 202 may be a magnetic disk, a flexible disk, an optical disk, a compact disk, a mini disk, or a digital versatile disc (DVD). Note that the processor 201 may output data such as computation results to the memory 202, cause the memory 202 to store the data, or cause an auxiliary storage device (not illustrated) to store the data via the memory 202.

Note that the fluid utilization device 300 may include the drive device 100A according to the second embodiment, the drive device 100B according to the third embodiment, the drive device 100C according to the fourth embodiment, or the drive device 100D according to the fifth embodiment, in place of the drive device 100. In this case, the functions of the current control unit 6, the magnetic pole position identification units 5a and 5b, the sub-side active power pulsation component extraction unit 11, the subtractor 8, the magnetic flux current command determination unit 9, and the magnetic flux current command compensation unit 10 illustrated in FIG. 26 are implemented using the processor 201 and the memory 202. Similarly, the functions of the current control unit 6, the magnetic pole position identification units 5a and 5b, the sub-side torque current pulsation component extraction unit 7, the main-side torque current pulsation component extraction unit 12, the subtractor 8, the subtractor 8a, the magnetic flux current command determination unit 9, and the magnetic flux current command compensation unit 10 illustrated in FIG. 27 are implemented using the processor 201 and the memory 202. Similarly, the functions of the current control unit 6, the magnetic pole position identification units 5a and 5b, the sub-side torque current pulsation component extraction unit 7, the subtractor 8, the magnetic flux current command determination unit 9, and the magnetic flux current command compensation unit 10C illustrated in FIG. 29 are implemented using the processor 201 and the memory 202. Similarly, the functions of the current control unit 6, the magnetic pole position identification units 5a and 5b, the sub-side torque current pulsation component extraction unit 7, the subtractor 8, the magnetic flux current command determination unit 9, and the magnetic flux current command compensation unit 10D illustrated in FIG. 36 are implemented using the processor 201 and the memory 202.

As described in the first embodiment, the power converter 2 may have basically any circuit configuration that can supply desired AC power to the main-side synchronous motor 1a and the sub-side synchronous motor 1b. Information on the currents detected by the current detection units 4a and 4b is transmitted to the processor 201.

The two propeller fans 300a and 300b may have the same shape or different shapes. The airflow paths of the two propeller fans 300a and 300b need not necessarily be the same. For example, in a case where the fluid utilization device 300 is an air conditioner, the two propeller fans 300a and 300b correspond to two blower fans provided in the blower chamber in the outdoor unit of the air conditioner, and the airflow paths correspond to the blower chamber. The blower chamber is the space formed by being surrounded by the side plate, ceiling plate, bottom plate, heat exchanger, and the like of the outdoor unit. In the blower chamber, airflow is formed by rotation of the propeller fans 300a and 300b.

The two propeller fans 300a and 300b preferably have different characteristics of rotation speed and load torque so as to be stably driven in parallel. Therefore, the two synchronous motors may be equipped with fans in different shapes, or the cross-sectional area of the flow path in which one fan is provided may be smaller than the cross-sectional area of the flow path in which the other fan is provided. Alternatively, a fluid utilization device with different types of specifications may be driven, for example, one synchronous motor may drive a propeller fan and the other synchronous motor may drive a pump.

Although not illustrated in FIG. 43, the fluid utilization device 300 may include a voltage detection unit that detects the voltage output from the power converter 2, and may be configured such that voltage information detected by the voltage detection unit is input to the processor 201. Although not illustrated in FIG. 43, the fluid utilization device 300 may include a wind speed sensor that measures the wind speed of the fans, and may be configured such that wind speed information detected by the wind speed sensor is input to the processor 201. Although not illustrated in FIG. 43, a temperature sensor that detects the temperature of an object that is cooled by the fans may be provided, and temperature information detected by the temperature sensor may be input to the processor 201.

The fluid load of the fluid utilization device 300 has damper characteristics, by which the open-loop driven synchronous motor is stably driven in the high-rotation range. In the low-rotation range, however, the damper characteristics are weakened and the synchronous motors become unstable; therefore, the fluid utilization device 300 uses the parallel drive methods described in the first, second, third, fourth, and fifth embodiments. Consequently, in the sixth embodiment, parallel driving of the synchronous motors can be achieved in a wide speed range. In addition, in the sixth embodiment, because there is no need for advanced torque control, it is possible to obtain the fluid utilization device 300 capable of driving the two propeller fans 300a and 300b without a significant increase in cost by modifying an existing synchronous motor drive device that drives one synchronous motor with one power converter.

Seventh Embodiment

Figure 44:
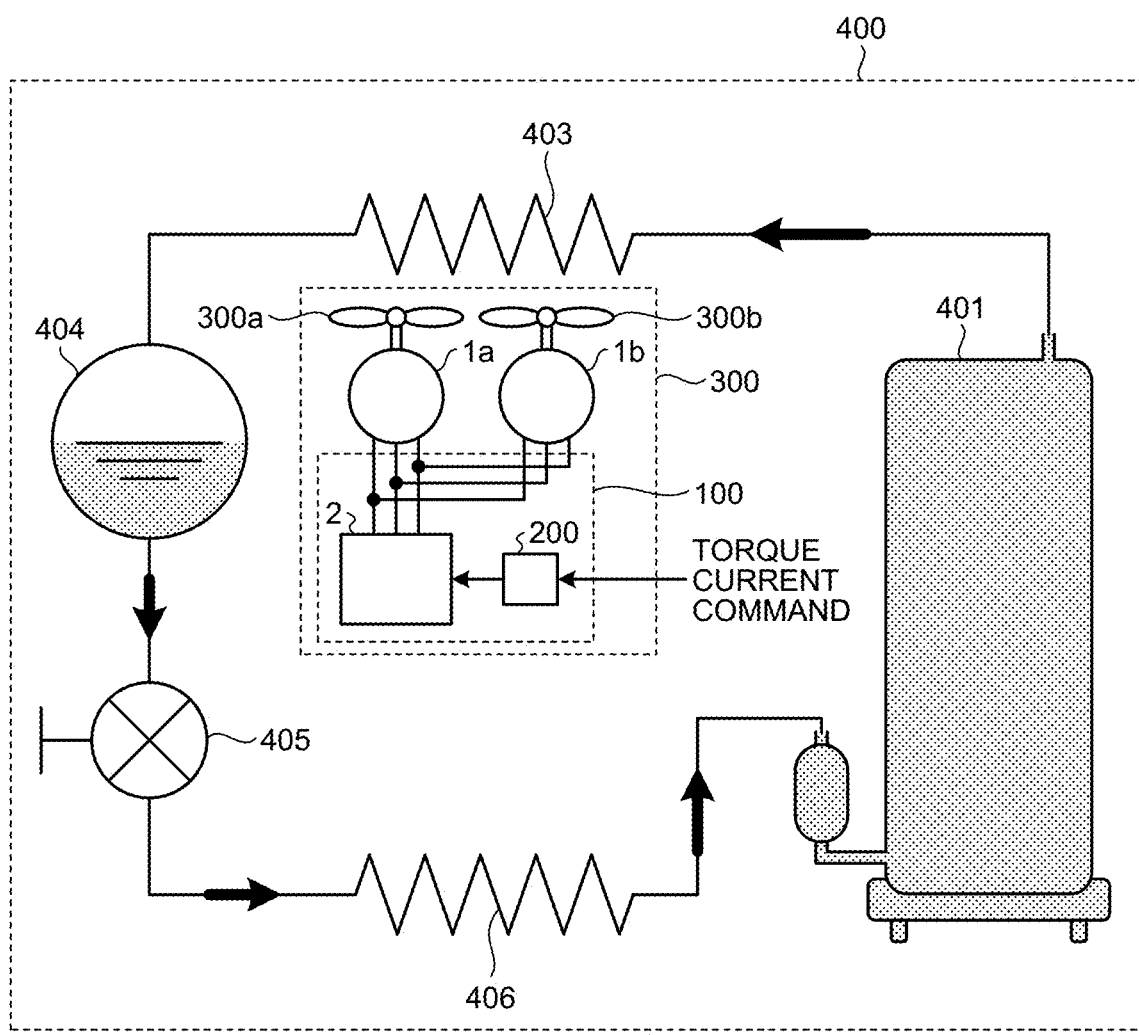
FIG. 44 is a diagram illustrating an exemplary configuration of an air conditioner according to a seventh embodiment.

A seventh embodiment describes an exemplary configuration of an air conditioner that uses the fluid utilization device 300 according to the sixth embodiment. FIG. 44 is a diagram illustrating an exemplary configuration of an air conditioner according to the seventh embodiment of the present invention. The air conditioner 400 according to the seventh embodiment includes the fluid utilization device 300, a refrigerant compressor 401, a condenser 403, a liquid receiver 404, an expansion valve 405, and an evaporator 406. The refrigerant compressor 401 and the condenser 403 are connected by piping. Similarly, the condenser 403 and the liquid receiver 404 are connected by piping, the liquid receiver 404 and the expansion valve 405 are connected by piping, the expansion valve 405 and the evaporator 406 are connected by piping, and the evaporator 406 and the refrigerant compressor 401 are connected by piping. Consequently, the refrigerant circulates through the refrigerant compressor 401, the condenser 403, the liquid receiver 404, the expansion valve 405, and the evaporator 406. Although not illustrated in FIG. 44, the fluid utilization device 300 includes the current detection units 4a and 4b, the magnetic pole position identification units 5a and 5b, etc. illustrated in FIG. 1 and other figures.

In the air conditioner 400, processes of evaporation, compression, condensation, and expansion of the refrigerant are repeatedly performed, through which the refrigerant changes from liquid to gas, and further changes from gas to liquid, whereby heat exchange is performed between the refrigerant and the outside air.

The evaporator 406 exerts a cooling action by evaporating the refrigerant liquid at low pressure and taking heat from the air around the evaporator 406. The refrigerant compressor 401 compresses the refrigerant gas gasified by the evaporator 406 into a high-pressure gas to condense the refrigerant. The condenser 403 condenses the high-pressure refrigerant gas into a refrigerant liquid by releasing heat of the refrigerant gas heated by the refrigerant compressor 401. The fluid utilization device 300 rotates the propeller fans 300a and 300b to generate wind, and causes the wind to pass through the condenser 403 to cool the condenser 403. The expansion valve 405 throttles and expands the refrigerant liquid to convert the refrigerant liquid into a low-pressure liquid in order to evaporate the refrigerant. The liquid receiver 404 is provided for adjusting the amount of circulating refrigerant, and may be omitted in a small device.

An increase in the output of the air conditioner 400 requires an increase in the size of the condenser 403, for which it is necessary to increase the cooling performance of the fluid utilization device 300 functioning as a cooling device for cooling the condenser 403. However, it is complicated to change the specifications of the fluid utilization device 300 functioning as a cooling device in accordance with the increase in the dimensions of the condenser 403. In addition, in order to increase the output of the fluid utilization device 300 so as to increase the cooling performance of the fluid utilization device 300, it may be necessary to change the manufacturing line for mass production of the fluid utilization device 300, in which case significant initial investment is required for constructing the manufacturing line. Therefore, in the large-sized air conditioner 400, the cooling performance is improved by using the fluid utilization device 300 including a plurality of cooling fans.

In addition, regarding the air conditioner 400, there is a high demand for cost reduction, and meanwhile there is a growing demand for higher efficiency as energy saving regulations have been strengthened year by year. Recent energy saving regulations focus on driving efficiency at not only the rated operating point but also operating points of low-output driving. Therefore, it is necessary to reduce the lower limit of the operating rotation speed of the cooling fans as much as possible.

As described so far, the parallel drive device that uses the technique disclosed in Patent Literature 1 is highly advantageous in terms of cost, but disadvantageous in being unsuited for position sensorless control due to unstable driving in the low-rotation range. In particular, the air conditioner 400, in which the carrier frequency is often set as high as or even higher than 10 kHz in order to reduce the carrier noise generated in the power converter 2 of the fluid utilization device 300, is liable to produce increased output voltage errors, resulting in unstable driving in the low-rotation range. Therefore, applying the parallel drive device that uses the technique disclosed in Patent Literature 1 to the air conditioner 400 is problematic in that the drive operation range of the air conditioner 400 is narrowed. Thus, it is difficult for the parallel drive device that uses the technique disclosed in Patent Literature 1 to achieve both cost reduction and high cooling performance required for the cooling fans for the air conditioner 400.

The air conditioner 400 according to the seventh embodiment uses the parallel drive methods described in the first to fifth embodiments; thus, unstable driving in the low-speed range does not occur, and the drivable range can be expanded. Because the parallel drive methods described in the first to fifth embodiments are based on position sensorless control, the manufacturing cost of the air conditioner 400 can be reduced as compared with the case of using a position sensor. Therefore, the drive devices 100, 100A, 100B, 100C, and 100D according to the first to fifth embodiments can achieve both cost reduction and high cooling performance required for the cooling fans for the air conditioner 400.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

1*a* main-side synchronous motor; 1*b* sub-side synchronous motor; 1*c* synchronous motor; 2 power converter; 3 DC voltage source; 4*a*, 4*b* current detection unit; 5*a*, 5*b*, 5*d* magnetic pole position identification unit; 6 current control unit; 7, 7A, 7B, 7C sub-side torque current pulsation component extraction unit; 8, 8*a*, 512 subtractor; 9 magnetic flux current command determination unit; 10, 10C, 10D magnetic flux current command compensation unit; 11 sub-side active power pulsation component extraction unit; 12 main-side torque current pulsation component extraction unit; 13 main-side active power pulsation component extraction unit; 21 speed detection unit; 22 position detection unit; 50 position detector; 51 model deviation computation unit; 52 angular velocity estimator; 53 primary angular frequency calculator; 54 integrator; 60*a*, 60*b*, 60*c* magnetic pole position estimation unit; 70, 70A, 70B pulsation component extraction unit; 71 pulsation frequency measurement unit; 72 cosine wave generator; 73 sine wave generator; 74 Fourier cosine coefficient computation unit; 75 Fourier sine coefficient computation unit; 76 AC restorer; 91 gain multiplication unit; 92 phase adjustment unit; 100, 100A, 100B, 100C, 100D drive device; 101 compensation value generation unit; 102, 107 multiplier; 103 limiter; 104 differentiator; 105 compensation value adjustment unit; 106 adjustment value generation unit; 200 power converter drive device; 201 processor; 202 memory; 300 fluid utilization device; 300*a*, 300*b* propeller fan; 400 air conditioner; 401 refrigerant compressor; 403 condenser; 404 liquid receiver; 405 expansion valve; 406 evaporator; 511 current estimator; 513 deviation calculator.

The invention claimed is:

1. A drive device comprising:
a power converter to supply power to a first synchronous motor and a second synchronous motor connected in parallel;
a first current detector to detect a first current flowing through the first synchronous motor;
a second current detector to detect a second current flowing through the second synchronous motor;
a first magnetic pole position identifier to identify a first magnetic pole position of a rotor of the first synchronous motor;
a second magnetic pole position identifier to identify a second magnetic pole position of a rotor of the second synchronous motor;
a subtractor to obtain an angular difference using the first magnetic pole position and the second magnetic pole position, the angular difference being a difference between the magnetic pole positions of the rotors of the first synchronous motor and the second synchronous motor;
a magnetic flux current command determiner to determine a magnetic flux current command based on the second current detected by the second current detector;
a magnetic flux current command compensator to adjust an absolute value of the magnetic flux current command based on the angular difference; and
a controller to control the power converter using a torque current command, the magnetic flux current command with the absolute value adjusted by the magnetic flux current command compensator, the first current, and the first magnetic pole position.

2. The drive device according to claim 1, comprising
a pulsation component extractor to extract at least one of a torque current pulsation component or an active power pulsation component, the torque current pulsation component being a pulsation component included in a torque current flowing through the second synchronous motor, the active power pulsation component being a pulsation component included in an active power consumed by the second synchronous motor, wherein
the magnetic flux current command determiner determines the magnetic flux current command based on the pulsation component extracted by the pulsation component extractor.

3. The drive device according to claim 1, comprising
a pulsation component extractor to obtain a difference between a torque current pulsation component that is a pulsation component included in a torque current flowing through the first synchronous motor and a torque current pulsation component that is a pulsation component included in a torque current flowing through the second synchronous motor, and output the difference as a pulsation component, wherein
the magnetic flux current command determiner determines the magnetic flux current command based on the pulsation component output by the pulsation component extractor.

4. The drive device according to claim 1, comprising
a pulsation component extractor to obtain a difference between an active power pulsation component that is a pulsation component included in an active power consumed by the first synchronous motor and an active power pulsation component that is a pulsation component included in an active power consumed by the second synchronous motor, and output the difference as a pulsation component, wherein
the magnetic flux current command determiner determines the magnetic flux current command based on the pulsation component output by the pulsation component extractor.

5. The drive device according to claim 1, wherein
the magnetic flux current command compensator reduces the absolute value of the magnetic flux current command when the angular difference is within a predetermined range.

6. The drive device according to claim 5, wherein
the magnetic flux current command compensator reduces the absolute value of the magnetic flux current command to a predetermined value or a value that depends on the magnetic flux current command when the angular difference is within the predetermined range.

7. The drive device according to claim 5, wherein
the predetermined range is set based on at least one of an error in identifying the first magnetic pole position by the first magnetic pole position identifier, an error in identifying the second magnetic pole position by the second magnetic pole position identifier, an error in detecting the first current by the first current detector, an error in detecting the second current by the second current detector, a torque compensation amount required for stably driving the second synchronous motor, noise of the first synchronous motor, noise of the second synchronous motor, or noise of a device including the first synchronous motor and the second synchronous motor.

8. The drive device according to claim 1, wherein
the magnetic flux current command compensator includes a limiter to limit the magnetic flux current command output from the magnetic flux current command determiner, and
the limiter reduces the absolute value of the magnetic flux current command when the magnetic flux current command is less than or equal to a predetermined value.

9. The drive device according to claim 1, wherein
the subtractor obtains the angular difference by subtracting the first magnetic pole position from the second magnetic pole position,
the magnetic flux current command compensator includes a differentiator to calculate a time derivative of an absolute value of the angular difference, and the magnetic flux current command compensator reduces the absolute value of the magnetic flux current command when the time derivative calculated by the differentiator is negative.

10. The drive device according to claim 9, wherein
the magnetic flux current command compensator includes:
a compensation value generator to generate a compensation value based on the angular difference; and
a compensation value adjuster to reduce the compensation value generated by the compensation value generator when the time derivative calculated by the differentiator is negative.

11. A fluid utilization device comprising the drive device according to claim 1.

12. An air conditioner comprising the fluid utilization device according to claim 11.

* * * * *